US006745172B1

(12) United States Patent
Mancisidor et al.

(10) Patent No.: US 6,745,172 B1
(45) Date of Patent: Jun. 1, 2004

(54) EXPERT SYSTEM ADAPTED DATA NETWORK GUIDANCE ENGINE

(75) Inventors: Rod Mancisidor, Round Rock, TX (US); Rob Norris, Austin, TX (US); Charles R. Erickson, Cedar Park, TX (US); Ahmed Gheith, Round Rock, TX (US)

(73) Assignee: Whisperwire, Inc., Austin, TX (US)

( * ) Notice: Subject to any disclaimer, the term of this patent is extended or adjusted under 35 U.S.C. 154(b) by 508 days.

(21) Appl. No.: 09/909,240

(22) Filed: Jul. 19, 2001

Related U.S. Application Data

(60) Provisional application No. 60/219,783, filed on Jul. 19, 2000.

(51) Int. Cl.[7] .............................................. G06F 17/00
(52) U.S. Cl. ....................................................... 706/60
(58) Field of Search ............................................ 706/60

(56) References Cited

U.S. PATENT DOCUMENTS

| | | | |
|---|---|---|---|
| 5,175,800 A | 12/1992 | Galis et al. .................... 706/45 |
| 5,377,196 A | * 12/1994 | Godlew et al. ................. 714/4 |
| 5,784,539 A | 7/1998 | Lenz | |
| 5,809,282 A | 9/1998 | Cooper et al. .............. 709/226 |
| 5,822,743 A | 10/1998 | Gupta et al. | |
| 5,970,482 A | 10/1999 | Pham et al. | |
| 6,145,002 A | 11/2000 | Srinivasan | |
| 6,243,754 B1 | 6/2001 | Guerin et al. | |
| 2001/0049632 A1 | 12/2001 | Rigole ......................... 705/26 |
| 2002/0036658 A1 | 3/2002 | Carolan et al. | |
| 2002/0052767 A1 | 5/2002 | Yano | |
| 2002/0107824 A1 | 8/2002 | Ahmed | |
| 2003/0191841 A1 | 10/2003 | DeFerranti et al. | |

OTHER PUBLICATIONS

Weiss, "The Seamless, Web-based Library: A Meta Site for the 21st Century," Proceedings of the 62nd ASIS Annual Meeting, vol. 36, Washington, D.C., Oct. 31–Nov. 4, 1999.
Brune et al., "A Resource Description Environment for Distributed Computing Systems," High Performance Distributed Computing, 1999 Proceedings, 8th International Symposium on Redo Beach, CA, Aug. 3–6, 1999, Los Alamitos, CA, pp. 276–286.

(List continued on next page.)

*Primary Examiner*—George B. Davis
(74) *Attorney, Agent, or Firm*—Gray Cary Ware & Freidenrich, LLP

(57) ABSTRACT

An expert system adapted data network guidance engine. The invention allows an agent to interact with a customer and to provide selection and recommendation of data network products and/or services for the customer. The invention allows for the use of agents of varying skill levels, including relatively low skill level, without suffering deleterious performance. The data network guidance engine is operable to perform generation and selection of configurations that are generated using various heuristics. If desired, numerous iterations are performed within each of the heuristic operations. The data network guidance engine is operable to select recommended configurations from among a number of potential options. In addition, compatible configurations may also be identified. The data network guidance engine is one of the underlying engines within the expert system that allows the agent to provide real time interaction with a customer and to provide a real time recommended solution to that customer.

20 Claims, 29 Drawing Sheets

OTHER PUBLICATIONS

Ferguson et al., "A Knowledg–based Sales Assistant for Data Communications Networks," IEEE Jun. 10, 1987, vol. 3, pp. 1634–1642.

Ishiwa et al., "An Expert system for Planning Private Networks," NEC Research and Development Nippon Electric Ltd., Tokyo, Japan, Jul. 1, 1994, vol. 35, No. 3, pp. 306–314.

Somers et al., "Intelligent Resource Dimensioning in ATM Networks," Proceedings of the International SWIT, Apr. 23, 1995, vol. 2, SYMP. 15, pp. 62–66.

Carchiolo, et al. "An Agent Based Platform for a Service Provider", NEC Research Index Online, 1998, Retrieved form the Internet: http://citeseer.nj.nec.com/91085.html, pp. 1–6, 1998.

Caswell et al., "Using Service Models for Managemetn of Internet Services", IEEE Journal on Selected Areas in Communications, May 2000, vol. 18, Issue 5, pp. 686–701.

McNnight, et al. "Pricing Internet services: Proposed Improvements", Computer, Mar. 2000, vol. 33, pp. 108–109.

Gibbens et al., "Internet Services Classes Under Competition," IEEE Journal on Selected Areas in Communications, Dec. 2000, vol. 18, No. 12.

Semret et al., "Pricing, Provisioning and Peering: Dynamic Markets for Differentiated Internet Services and Implications for Network Interconnections," IEEE Journal on Selected Areas in Communications, Dec. 2000, vol. 18, No. 12, pp. 2499–2513.

Bakos, Y., "The Emerging Role of Electronic Marketplaces on the Internet", Communications of the ACM, Aug. 1998, vol. 41, No. 8, pp. 35–42.

Johnson et al., "Consulting Without Consultants: Expert Systems Applications in User Services", Proceedings of the 17th Annual ACM SIGUCCS Conference on User Services, 1989, pp. 335–342.

* cited by examiner

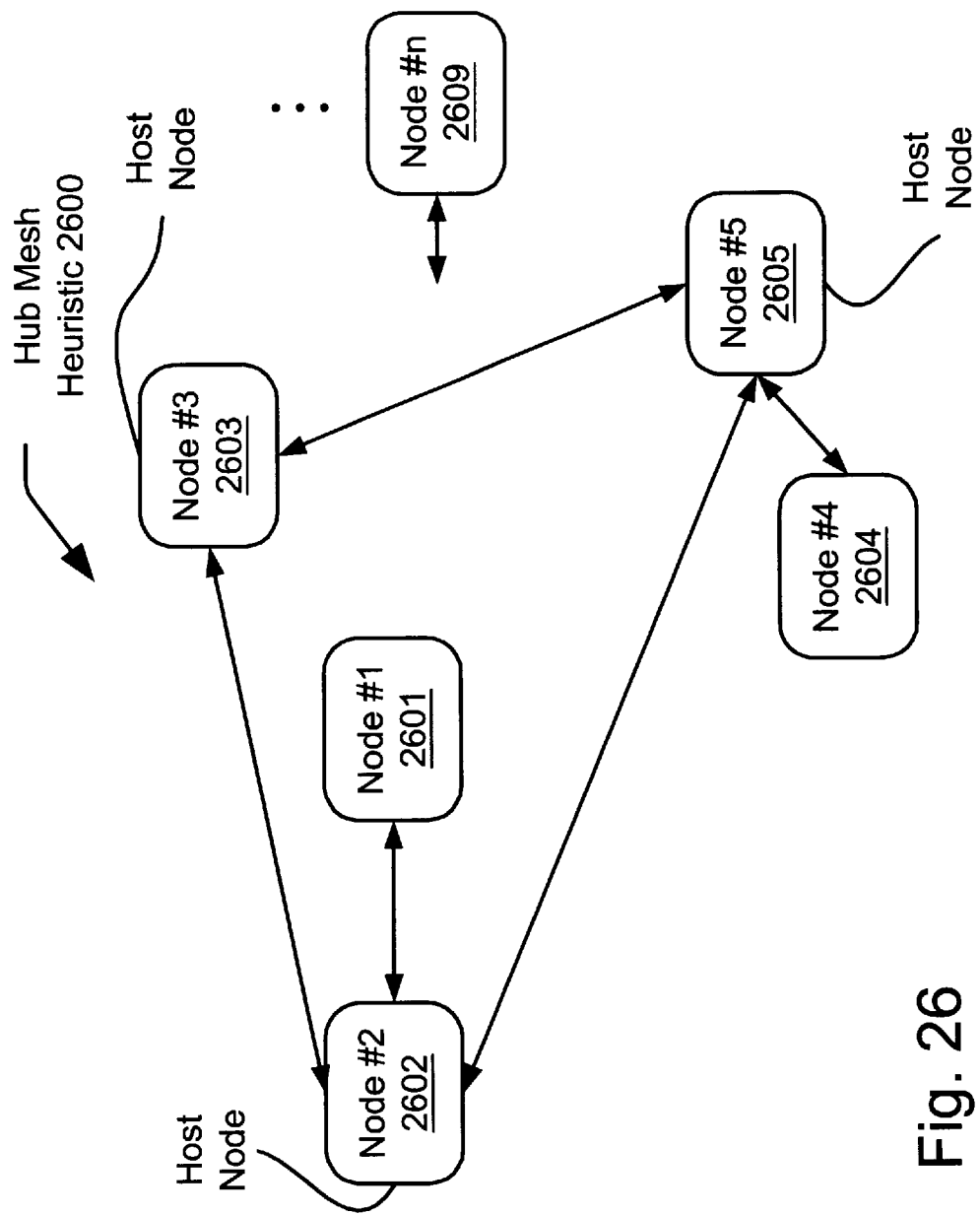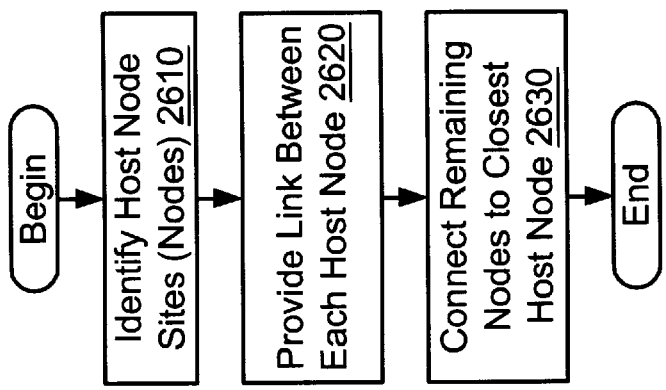
Fig. 26

EXPERT SYSTEM ADAPTED DATA NETWORK GUIDANCE ENGINE

CROSS REFERENCE TO RELATED APPLICATIONS

The present application claims priority pursuant to 35 U.S.C. Sec. 119(e) to U.S. Provisional Application Serial No. 60/219,783, filed Jul. 19, 2000, pending, which is hereby incorporated herein by reference in its entirety. The present application also claims priority pursuant to 35 U.S.C. Sec. 120 to U.S. application Ser. No. 09/764,662, filed Jan. 18, 2001, pending, which is hereby incorporated by reference in its entirety.

The following U.S. Patent Applications are hereby incorporated herein by reference in their entirety and made part of the present U.S. Patent Application for all purposes:

1) U.S. patent application Ser. No. 09/909,250 entitled "EXPERT SYSTEM SUPPORTED INTERACTIVE PRODUCT SELECTION AND RECOMMENDATION," filed on even date herewith.
2) U.S. patent application Ser. No. 09/909,241, entitled "EXPERT SYSTEM ADAPTED DEDICATED INTERNET ACCESS GUIDANCE ENGINE," filed on even date herewith.

BACKGROUND

1. Technical Field

The present invention relates generally to expert system processing; and, more particularly, it relates to an expert system adapted data network guidance engine.

2. Related Art

Within conventional systems and methods that are operable to perform product selection and recommendation, a key limiting factor is the skill level of the agent or user who performs the customer or client interaction is selling and marketing those products. Within the scope of products, services are also envisioned as well within the context of the generic label "product." Regardless of the industry, the skill level of the agent in communicating the available products to a customer and, as is oftentimes the case, educating the customer and helping him to quantify his needs, are limiting factors that govern the degree of effectiveness that a particular salesperson can achieve. Within technology areas that are more amorphous and complex, the limitations of salespeople is even further compromised.

There have been a number of technology areas where the availability of adequately skilled salespersons has been limiting to the full tapping of the market. As one example, the Internet has rapidly become an indispensable system that many businesses require simply to conduct their day to day affairs. During Internet access blackouts within such industries, when the access to the Internet has been temporarily interrupted, it is evident the degree to which businesses have grown dependent on the availability and reliability of such services. Yet, as is often the case, there are relatively few individuals within the company who are able to seek adequate Internet services to meet the needs of their business. While there is this sometimes great limitation of sufficiently skilled individuals within customer-businesses that seek such services, when there are not sufficiently skilled and trained salespeople, or agents, to sell those services, the problem becomes ever more complex. The likelihood of a sufficient solution that will adequately satisfy the needs of the customer is relatively low.

The conventional solutions have been geared towards training the salespeople in such situations to a level at which they can adequately communicate and understand the technology that they are seeking to sell. This approach, while being effective for a particular individual once that individual is sufficiently trained, is catastrophic for an industry that has a high degree of turnover. In the example used above to illustrate the deficiency of this traditional approach, the turnover rate of individuals, once they have acquired a high skill level, is oftentimes astronomical. There is such a high need for specifically trained individuals in these key technology areas that the lateral opportunities are sometimes to good to pass up. Moreover, the problem is further complicated by the fact that companies in the business of selling such goods and services, namely providers, are loathe to invest a high degree of money and effort to train up their work base in light of the radical degree of turnover within the industry.

Another limitation within conventional approaches is the turn around time simply to provide a prospective customer with a list of available and operable options that may meet his needs. In some industries, given the high degree of technical complexity, there may be a turn around time of several weeks before a customer even gets an estimate or recommendation of products that may serve his needs. This latency is oftentimes extremely costly in terms of getting work up and running.

The frustration of customers who seek such products and services, when forced to deal with the all too often poorly qualified salespeople within their given industry, leads to an interaction that is less than effective. Oftentimes, both parties leave an interaction with a high degree of frustration. The conventional solution of simply trying to train up the sales force to a sufficiently high level so as to accomplish this desired effectiveness has simply been deficiency in light of many of the intrinsic limitations of the high technology industries. Moreover, even within relatively low technology level industries, there is oftentimes a great deal of "expert knowledge" that must or should be acquired before making an effective salesperson. Within these industries as well, the limitations of the skill level, experience, and expertise of the agent (salesperson) is often the limiting factor in the overall effectiveness of the solution.

Further limitations and disadvantages of conventional and traditional systems will become apparent to one of skill in the art through comparison of such systems with the present invention as set forth in the remainder of the present application with reference to the drawings.

SUMMARY OF THE INVENTION

Various aspects of the present invention can be found in an expert system adapted data network guidance engine. The expert system adapted data network guidance engine includes a data network having a number of nodes. The expert system adapted data network guidance engine employs a number of heuristics to generate data network configurations based on the nodes within the data network. The expert system adapted data network guidance engine transforms one data network configuration into a transformed data network configuration. The expert system adapted data network guidance engine selects a recommended data network solution from among the network configurations and the transformed data network configuration.

In certain embodiments of the invention, the expert system adapted data network guidance engine provides the recommended data network solution to an agent using a graphical user interface. The expert system adapted data network guidance engine provides the recommended data network solution to the agent using the graphical user interface. The expert system adapted data network guidance engine generates a number of initial configurations. The expert system adapted data network guidance engine then applies the heuristics to the initial configuration to generate the data network configurations. The expert system adapted data network guidance engine then selectively applies the heuristics to the initial configuration. The heuristics include any number of heuristics including a distance tree heuristic, a maximal flow heuristic, a mesh of needs heuristic, a hub and spoke heuristic, a partitioned cluster heuristic, a gravity tree heuristic, and a hub mesh heuristic. The expert system adapted data network guidance engine performs any number of iteration, including as few as one, when employing the heuristics to generate the data network configurations based on the nodes within the data network. In addition, the iteration generates at least one data network configuration within the data network configurations. The expert system adapted data network guidance engine employs neural network processing to select a heuristic from the heuristics, the selected heuristic has a higher chance of success than the remaining heuristics. The expert system adapted data network guidance engine employs a mutation heuristic.

Other aspects of the present invention can be found in a data network guidance engine method used within an expert system. The method includes rating a first number of traits that are used to characterize a first data network configuration and rating a second number of traits that are used to characterize a second data network configuration. The method also includes increasing a trait within at least one of the first number of traits and the second number of traits. The increased trait results in the generation of a modified data network configuration; the modified data network configuration is generated from either the first data network configuration and the second data network configuration. The method also includes selecting a recommended data network configuration from among the first data network configuration, the second data network configuration, and the modified data network configuration. Any other number of data network configuration may also be employed when selecting the recommended data network configuration as well.

In certain embodiments of the invention, the method further includes performing a capacity transformation to at least one of the first data network configuration, the second data network configuration, and the modified data network configuration. The capacity transformation includes increasing a bandwidth capacity of a link that needs an increased capacity within at least one of the first data network configuration, the second data network configuration, and the modified data network configuration. The method also includes performing a topological transformation to at least one of the first data network configuration, the second data network configuration, and the modified data network configuration. The topological transformation includes adding a link to at least one of the first data network configuration, the second data network configuration, and the modified data network configuration.

Other aspects of the present invention can be found in a data network guidance engine method used within an expert system. The method includes obtaining a list of sites to be interconnected, obtaining bandwidth requirements between a pair of sites within the list of sites, obtaining information on a customer's relative importance of a plurality of selected parameters. The method also includes creating viable initial data network configurations and selecting at least one viable initial data network configuration. The method also includes generating data network configuration solutions and rating each of the data network configuration solutions. The method also includes identifying a recommended data network solution from among the data network configuration solutions based on the ratings of the data network configuration solutions.

In certain embodiments of the invention, the generating of the data network configuration solutions further includes transforming the at least one selected viable initial data network. The method also includes transforming the at least one selected viable initial data network configuration a number of times until a set of sufficient size if found; that is to say, a sufficient number of data network configurations are identified. The method may also be performed where the transforming of the at least one selected viable initial data network configuration is performed a number of times within a predetermined amount of time. The method may also involve presenting the recommended data network solution to an agent using a graphical user interface. The method may also involve presenting at least one additional recommended data network solution to an agent using a graphical user interface. The selected parameters on which the customer's relative importance is determined may include any number of parameters including a cost, a latency, a bandwidth fulfillment, a reliability, and a security.

Other aspects, advantages and novel features of the present invention will become apparent from the following detailed description of the invention when considered in conjunction with the accompanying drawings.

BRIEF DESCRIPTION OF THE DRAWINGS

A better understanding of the present invention can be obtained when the following detailed description of various exemplary embodiments is considered in conjunction with the following drawings.

FIG. 26 is a block diagram illustrating an embodiment of a hub mesh heuristic that is used by a data network guidance engine in accordance with certain aspects of the present invention.

DETAILED DESCRIPTION OF THE INVENTION

Figure 1:
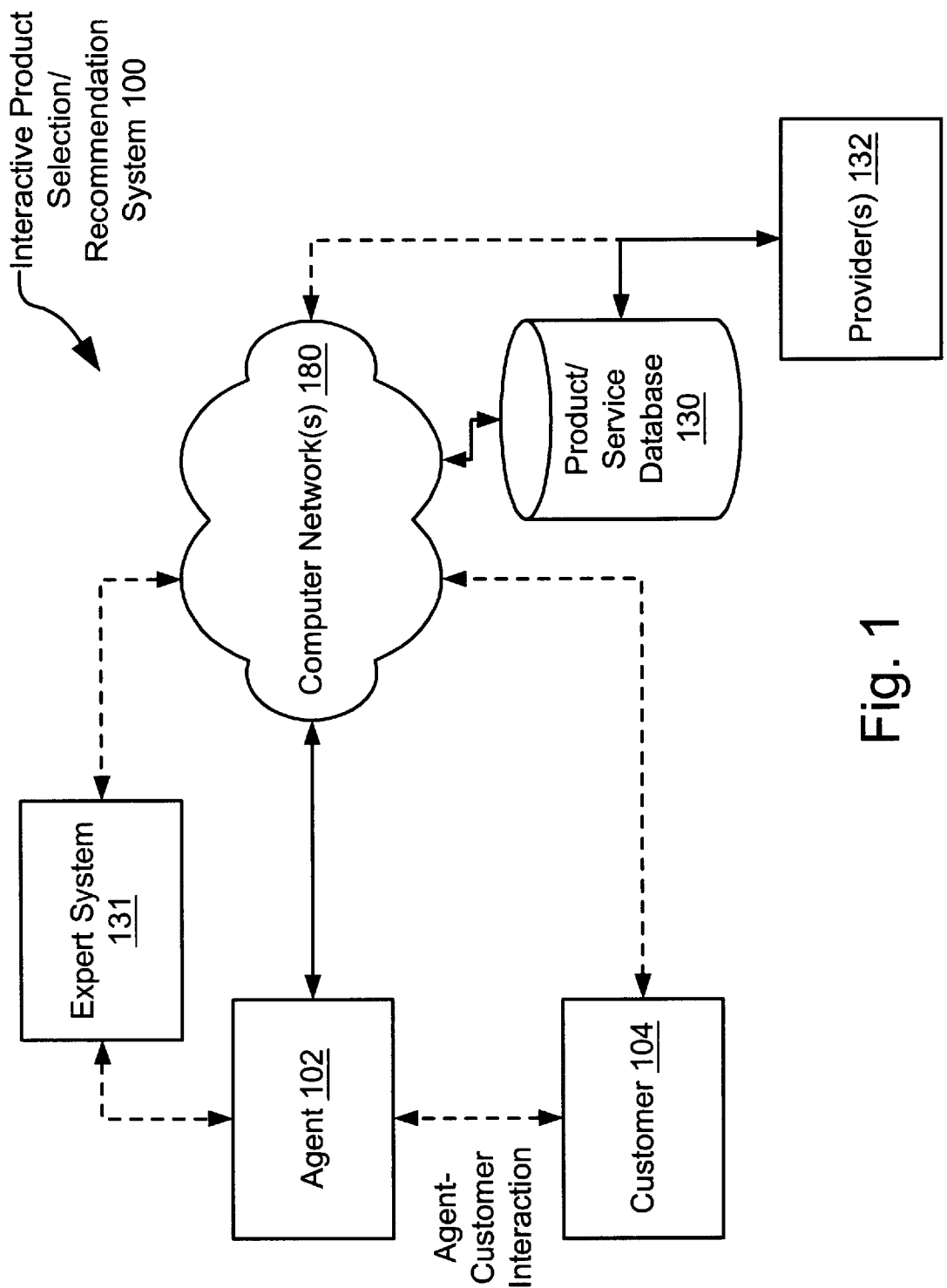
FIG. 1 is a system diagram illustrating an embodiment of an interactive product selection/recommendation system built in accordance with the present invention.

Within all of the various embodiments of the invention described below, the use of terminology of product or products is intended to include both services and products. The generic use of the term "products" or "product" is in no way to limit the operability of various aspects of the invention, as it is equally applicable within both industries selling and providing services, as well as those selling and providing products or combinations of services and/or products. For brevity, the term product is sometimes used instead of goods and/or services.

The invention is operable to allow and assist an agent to select certain solutions to meet the needs of a customer. In one embodiment, the invention is operable to help an agent select telecommunication technologies and products based on customer needs. In light of the comments made above regarding products and services, telecommunication technologies is also included within the scope and spirit of the terminology of "products and services" or simply, "products." The invention employs functionality offered within fuzzy logic expert systems. From certain perspectives, various aspects of the invention are based on fuzzy logic expert systems.

To assist an agent to select an amenable product for a customer, the problem domain must first be determined. The problem domain is the general area where the customer needs a solution. For example, Internet access would be one problem domain. Another one would be local data services. There are numerous problem domains where the functionality of the invention may assist an agent to find a customer solution. Once the problem domain is determined, the agent may then be presented with a set of questions relating to the needs of the customer with respect to that problem domain. The customer's answers are then transformed into values for each element of a set of product traits. In addition, the relative importance of each of the traits, from a customer's perspective, may also be considered.

A trait is a characteristic of a product of relevance to the user. These traits include any number of parameters and may include measurements such as cost, bandwidth, reliability, availability, etc. Each trait that is measurable in a continuum is represented as a fuzzy variable. Other traits are not measurable in a continuum, but are rather better represented as crisp values. One such example of a crisp value is the need for static IP addresses or the location of the site. These are represented with non-fuzzy values (crisp values). An expert system built in accordance with the invention then takes the collection of these values that represents the needs of the customer (one per trait, called needs) and attempts to match them against the corresponding collection of values provided by each product (called specs). Based on this, the expert system is operable to obtain a collection of ratings: one rating for each combination of product and trait. The expert system is also operable to summarize the ratings to give each product a summary rating. The summary rating of each product are used to sort them and classify them with respect to the level of recommendation assigned to each product. In the context of a data network guidance engine, the data network guidance engine is trying to configure a network.

In determining success of the operation of an expert system built in accordance with the invention, one consideration is that a customer belong to a set of "satisfied customers" once they deploy a solution suggested by an agent. In traditional set theory, an element either belongs to a set or does not. So, if customer satisfaction were treated in such a manner, then customers would either be "satisfied" or "dissatisfied." However, customers are rarely 100% satisfied or 100% dissatisfied. Their satisfaction usually falls somewhere in the middle.

The invention is operable using Fuzzy Sets. In Fuzzy Set Theory, an element does not have to belong to a set 0 or 100%. Instead, an element may belong to the set to a given degree. This type of model provides a lower semantic gap when working with sets that don't have precise mathematical definitions (as many don't). In fuzzy sets, each set has a corresponding membership function that maps all elements from the Universe of Discourse to a real number in the range [0, 1]. If the membership function maps an element to 1, then it completely belongs to the corresponding set. If it maps an element to 0, then it does not belong to the set at all. Other values provide a more fuzzy definition of whether the element belongs to the set. In the example of customer satisfaction, the membership function determines the level of satisfaction of a customer.

In many problems, the Universe of Discourse is a range of real numbers. As some examples: bandwidth, cost and reliability traits are all measurable and can be represented by real numbers. So, as an example, a fuzzy set may be created to represent the level of satisfaction of a customer who uses ISDN using the following membership functions as the spec of the ISDN product:

$P(x)=1$ for $x<=48$ $P(x)=2-x/48$ for $48<x$ and $x<96$ $P(x)=0$ for $x>=96$

Where x is measured in kbps. ISDN has a bandwidth of 64 kbps and in this case, the domain expert who came up with this membership function estimates that customers who need a bandwidth of 48 kbps or less will be completely satisfied with ISDN. Customers that need a bandwidth between 48 kbps and 96 kbps will have a linear reduction in their level of satisfaction. Finally customers who need 96 kbps or more will be completely dissatisfied with this solution. Presumably, we will be able to obtain this type of information from domain experts. This particular fuzzy set is meant only as an example.

On the other hand, the bandwidth requirements for a customer can rarely be estimated precisely. So, a fuzzy set can also be used to represent the bandwidth need of a customer:

$N(x)=0$ for $x<=50$ $N(x)=x/10-5$ for $x>50$ and $x<=60$ $N(x)=-x/10+7$ for $60<x$ and $x<=70$ $N(x)=0$ for $x>70$ This set represents a customer whose bandwidth need is estimated to be between 50 and 70 kbps. The set peaks at 60 kbps because it is the most likely bandwidth requirement. One assumption may be made: if the fuzzy set that represents a customer need is a subset of what is offered by a product, then it may be assumed that the customer will be perfectly satisfied. It may also be determined if there is no overlap, then the customer will be completely dissatisfied. If there is partial overlap there will be partial satisfaction. Fuzzy logic provides rules to determine the level of satisfaction.

There are at least three practical considerations that affect how fuzzy sets are represented.

First, since fuzzy sets deal with concepts that are difficult to pin down, it is rare to come up with complex membership functions. Second, in order to simplify calculations, fuzzy sets are commonly defined with a set of linear functions. Third, although it is relatively easy to come up with equations for line segments, it quickly becomes bothersome. So, a common notation for fuzzy sets is shown as follows:

FUZZY-SET::=[POINTS]

POINTS::=POINT|POINT POINTS

POINT::=Y/X

Y::=<a number in the interval 0.0 to 1.0 inclusive>

X::=<any number>

The first $y_0/x_0$ point delimits a horizontal line from (-infinity, $y_0$) to ($x_0$, $y_0$). The last $y_n/x_n$ point delimits a horizontal line from ($x_n$, $y_n$) to (infinity, $y_n$). All other consecutive points ($x_i$, $y_i$) ($x_{i+1}$, $y_{i+1}$) delimit straight lines.

As examples, the 2 membership functions defined above could be written as:

ISDN-BANDWIDTH-SATISFACTION=[1/48 0/96]

CUSTOMER-BANDWIDTH-NEEDS=[0/50 1/60 0/70]

Fuzzy sets defined with 2 coordinates are called Z Fuzzy Sets when $y_0>y_1$. They are called S-Fuzzy Sets when $y_0<y_1$. This is in reference to the shape of the membership function. There are also triangular, rectangular and trapezoidal fuzzy sets, where the name is assigned based on the shape of the membership function.

In an expert system built in accordance with the invention, the use of Z and S Fuzzy Sets to define each trait of each product may be employed. For example, for traits where higher numbers are preferable, such as bandwidth and reliability (measured as MTBF or mean time between failures), a Z Fuzzy Set is used. For traits where lower numbers are preferred, such as cost or MTTR (Mean Time To Repair), an S Fuzzy Set is used. To represent customer needs we generally use triangular fuzzy sets, although other shapes are allowed and the expert system will work with any arbitrary membership function for any fuzzy set. When the needs of the customer are known precisely or where there are no means to "fuzzify" the needs of the customer, it is valid to use a crisp value to represent its needs. A crisp value is just a special case of a fuzzy value where the membership function evaluates to one on the crisp value and to zero elsewhere.

A common notation in Fuzzy Set Theory is that for a given Fuzzy Set A its membership function is also called A and defined as $A: UOD \rightarrow [0, 1]$ Where UOD is the Universe of Discourse. Using this notation we define the following set operations:

$C = A \cap B$ iff $C(x) = \min(A(x), B(x)) \forall x$ in $UOD$ $C = A \cap B$ iff $C(x) = \max(A(x), B(x)) \forall x$ in $UOD$ $C = \bar{A}$ iff $C(x) = 1 - A(x) \forall x$ in $UOD$ The height of a set A is h(A) and is defined as the maximum value produced by its membership function.

When the spec of a product P is matched against the need N (where N is a crisp value), for a given trait, the fuzzy logic expert system produces P(N) as the matching measure.

When the spec of a product P is matched against the need N (where N is a fuzzy value), for a given trait, the fuzzy logic expert system proceeds as follows:

Good=$h(P \cap N)$

Bad=$h(P \cap \bar{N})$

Rating=Good/(Good+Bad)

Rating is the matching measure. The rating formula described above is not in the literature. The customary way of obtaining the level of matching of 2 fuzzy sets is:

$h(P \cap N)$

This is, however, overly optimistic.

The concept of a fuzzy variable is relevant and important as well, because not all fuzzy sets are comparable. For example, a fuzzy set defined to represent the bandwidth of a product and one defined to represent the cost cannot be usefully compared. For this reason there is another concept called fuzzy variable. A fuzzy variable defines a Universe of Discourse. Each fuzzy variable stipulates a name for the UOD as well as its valid range of values and the unit of measurement. Fuzzy variables in an expert system built in accordance with the invention are used to model traits. For example, to model bandwidth, a fuzzy variable with the domain [0, 100,000] is created where each unit represents one kbps.

A fuzzy value is a fuzzy set in the context of a fuzzy variable. This is what may be used in the expert system to represent a user need for a given trait or the spec of a product with respect to a given trait. A fuzzy set is like a number (e.g., 50); a fuzzy value is like a number with a unit of measurement and a meaning (e.g., $50 monthly cost.).

Various embodiments of the invention that employ an expert system operable according to the parameters described above are further fleshed out as shown in the various Figures and description below.

FIG. 1 is a system diagram illustrating an embodiment of an interactive product selection/recommendation system 100 built in accordance with the present invention. The interactive product selection/recommendation system 100 is operative using any number of computer network(s) 180. The computer network(s) 180 includes a single computer network or any number of computer networks that are communicatively coupled to one another.

A number of provider(s) 132 are able to provide any number of services and/or products to a customer 104. Each of the products that are furnished by the providers 132 is catalogued within a product/service database 130. The product/service database 130 is communicatively coupled to the computer network(s) 180. If desired, the providers 132 are also provided with communicative coupling to the computer network(s) 180 as well.

An agent 102 and the customer 104 interact via any number of communication means including telephone, Internet, or any other operable communication media. The agent 102 is able to access the various functionality of an expert system 131 while interacting with the customer 104. If desired, the agent 102 is able to perform accessing of expert system 131 while offline with respect to the customer 104. For example, the agent 102 is able to perform interaction with the customer 104 initially, then to use the expert system 131 to perform analysis and provide recommendations of what products should be provided to the customer 104. However, in one embodiment of the invention, the agent 102 is afforded the opportunity to perform real time interaction with the customer 104 and to use the various functionality of the expert system 131 to provide recommendation of products provided by the provider(s) 132 that would provide a suitable solution for the customer 104. It is also noted that the customer 104 himself may access all of the functionality of the various aspects of the present invention, in similar manner that the agent 102 access the functionality, in various embodiments as well. That is to say, the customer 104 may be given access to the same functionality that the agent 104 enjoys to the various aspects of the present invention.

The interactive product selection/recommendation system 100 allows for the ability of an agent 102 of relatively low skill level to provide recommendations to the customer 104 of the available products that proffered by the various provider(s) 132, borrowing on the various functionality of the expert system 131. The interactive product selection/recommendation system 100 is amenable to providing sales support for the providers 132 without requiring very highly skilled and trained salespersons within many niche industries that typically require an enormous amount of experience, expertise, and training.

Particularly within industries where there is a gross mismatch between availability of adequate and competent salespeople and the industry's customer demand, the interactive product selection/recommendation system 100 offers a system in which any one of the providers 132 is able to achieve significantly greater customer interaction and sales that that afforded using the conventional methods and systems that necessitate a great deal of training and expertise within a given industry before being able to provide adequate sales servicing. Whereas a conventional system is limited by the individual ability, expertise, and training of an agent operating within it, certain aspects of the invention provide for a system whose high end performance is not limited by the personal characteristics of the agents that operate it.

Figure 2:
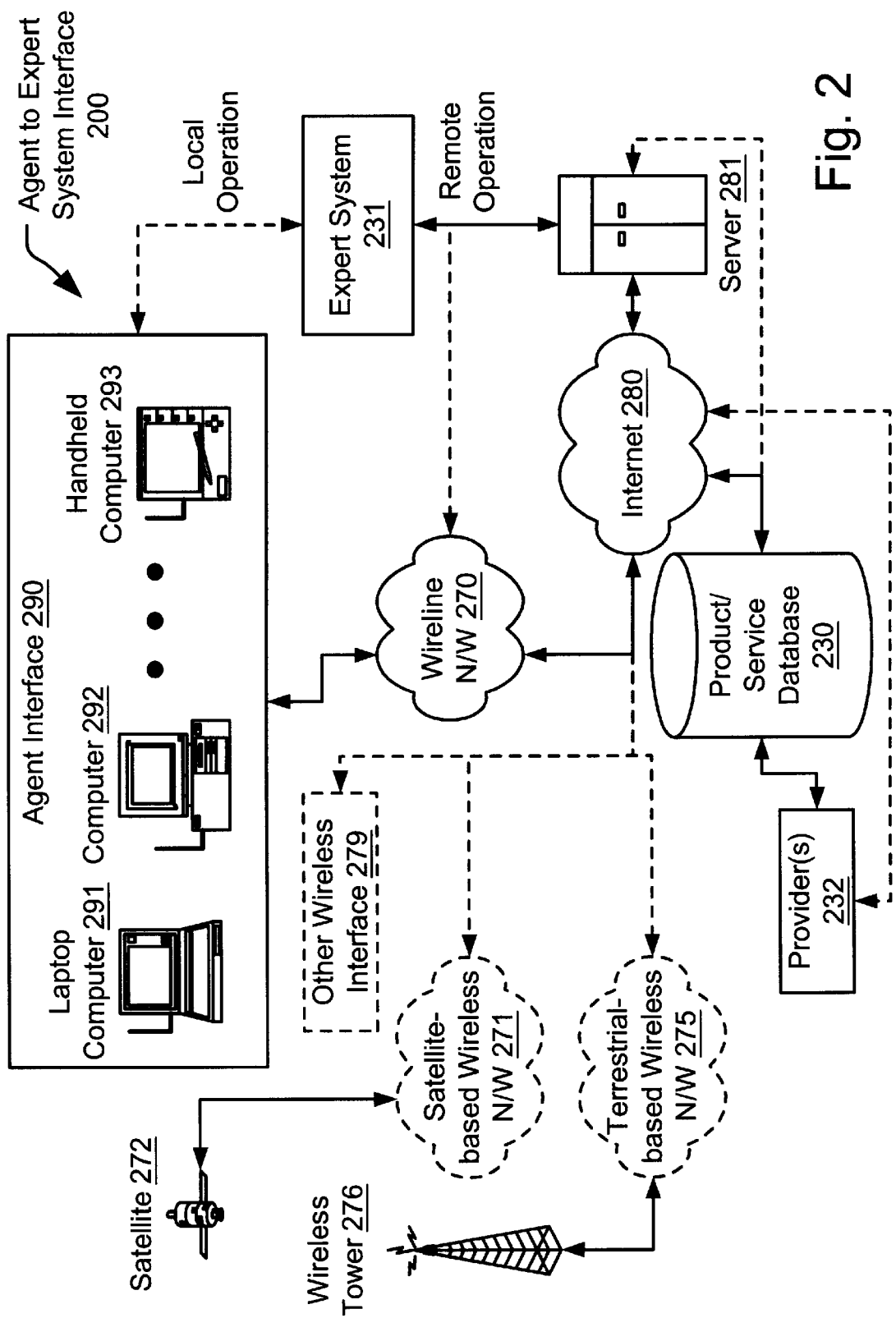
FIG. 2 is a system diagram illustrating an embodiment of an agent to expert system interface that is built in accordance with the present invention.

FIG. 2 is a system diagram illustrating an embodiment of an agent to expert system interface 200 that is built in accordance with the present invention. An agent is able to access an expert system 231 using an agent interface 290. The agent interface 290 includes any number of devices that allows for communicative coupling to the expert system 231. Examples of devices that are all operable as the agent interface include a laptop computer 291, a computer 292, ... and a handheld computer 293. In addition, any portable device that is operable to perform electronic interaction with the expert system 231 is also operable to serve the functionality of the agent interface 290.

The particular connection to the expert system 231 from the agent interface 290, that thereby allows agent interaction with the expert system 231, is achieved any number of ways without departing from the scope and spirit of the invention. For examples, it may be that the expert system 231 operates locally on the platform on which the agent is using as the agent interface 290. Alternatively, it is run remotely on a server 281 where the expert system 231 is accessed by the agent via any number of electronic connections. For example, the agent interface 290 is operable to access the expert system 231 (supported remotely by the server 281) via a wireline network 270 that communicatively couples the agent interface 231 to the expert system via the Internet. Also, the wireline network 270 may be operable to access the expert system 231 directly, without going through the Internet 280, if the wireline network 270 is operable to communicatively couple to the server 281 on which the expert system 231 is supported.

In even other embodiments, the agent interface 290 is operable to perform wireless connectivity to the wireline network 270 and/or the Internet 280. For example, each of the various platforms may be operable to perform the agent interface 280 may themselves be operable to perform wireless communication, as shown by the antennae on the laptop computer 291, the computer 292, . . . and the handheld computer 293. In such instances, the agent interface 280 is operable to connect to the wireline network 270 and/or the Internet 280. The wireless connectivity may be achieved using a satellite 272 that communicatively couples to a satellite-based wireless network 271, or alternatively using a wireless tower 276 that communicatively couples to a terrestrial-based wireless network 275. Generically, any other wireless interface 279 may be used to communicatively couple the agent interface to one of the wireline network 270 and/or the Internet 280 to allow interaction of the agent with the expert system 231 when the expert system 231 is operated remotely on the server 281. The term "server," for the server 281 is generically used to illustrate any number of computing platforms possessing sufficient processing resources to support the expert system 231.

The expert system 231 is operable also to access a product/service database 230. Again, as mentioned above and as will also be described in various embodiments of the invention below, the product/service database 230 is updated with the available products (including services) that may be sought by a customer. The listings of such available products may be provided via direct link by a number of provider(s) 232, or the providers 232 may provide the information to the product/service database 230 via the Internet 280. In addition, the server, on which the expert system 231 is supported for remote operation, may access the product/service database 230 directly via a dedicated link or via the Internet 280. It is understood that any number of dedicated wireline or wireless based connections, and/or networks, are also operable to perform the communicative coupling of the expert system 231 to the product/service database 230. The FIG. 2 illustrates a number of exemplary embodiments showing the connectivity and interaction of the agent interface 290 with the expert system 231 that allows for real time interaction of an agent with the expert system 231. The ability for real time interaction provides for a highly effective sales system as will be shown and described below in other of the various embodiments of the invention.

Figure 3:
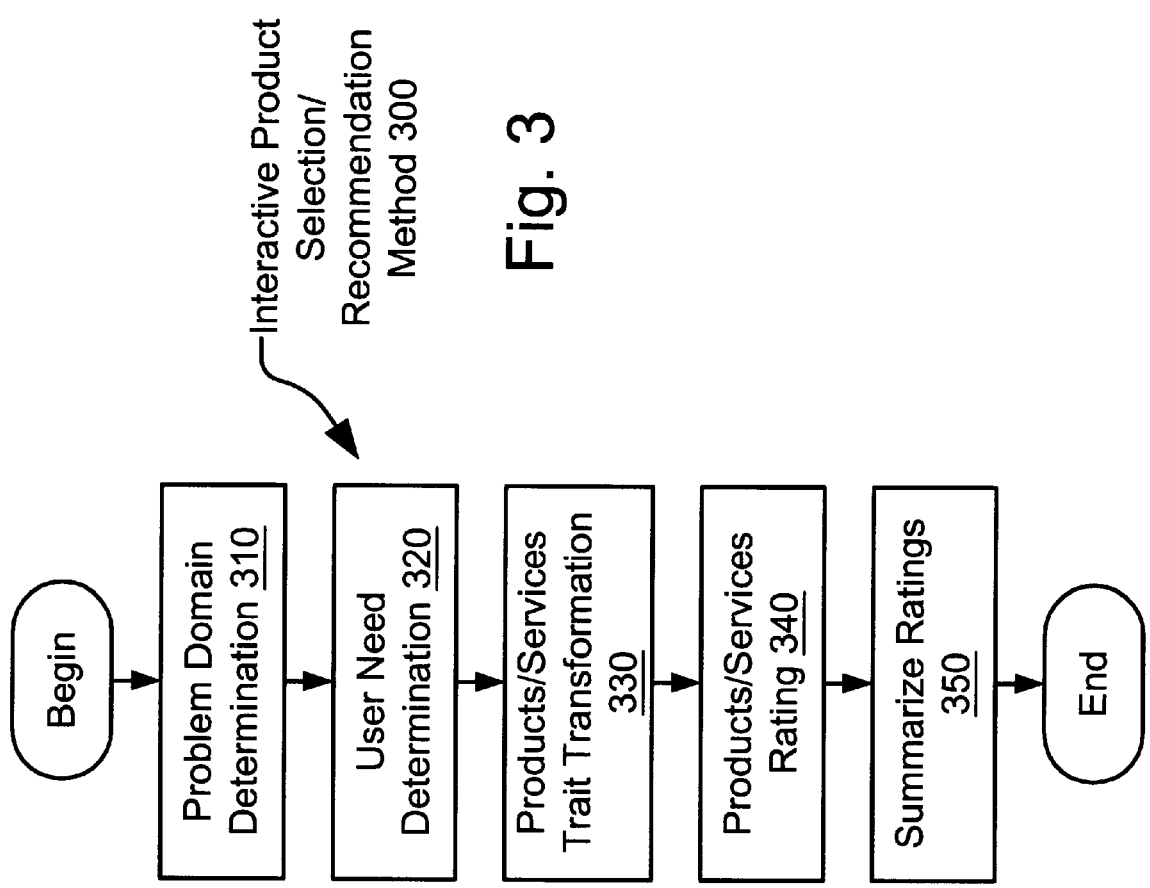
FIG. 3 is a functional block diagram illustrating an embodiment of an interactive product selection/recommendation method that is performed in accordance with the present invention.

FIG. 3 is a functional block diagram illustrating an embodiment of an interactive product selection/recommendation method 300 that is performed in accordance with the present invention. Initially, problem domain determination is performed as shown in a block 310. Subsequently, the user's, or customer's, need (or needs) are determined as shown in a block 320. Then, for proper processing within an expert system that is operable using various aspects of the invention, the available products/services and the user needs are used to perform trait transformation as shown in a block 330. During expert system processing, ratings for the available products/services are provide in a block 340. Ultimately, in a block 350, the ratings are then summarized for use by an agent.

The interactive product selection/recommendation method 300 is operable in real time where an agent may interact with a customer while inputting the customer's various needs and the agent can then provide recommendation to the customer. This recommendation is based on the customer's provided needs against the backdrop of the available products that are available to him. It may be that given the geographical location of the customer's site or sites that only a predetermined number of services are available to him. Such limitations are inherently provided for within the products/services rating that is performed in the block 340. As will also be shown in various embodiments of the invention below, the ratings summary provided for in the block 350 is able to also provide the underlying reasoning of why a particular solution is being recommended over other competing solutions. There is even greater detail provided, in certain embodiments, where compatible solutions are presented to the agent to provide for a more educated recommendation to a customer. In addition, detailed description of the available products is also available to a user of the interactive product selection/recommendation method 300 as well.

Figure 4:
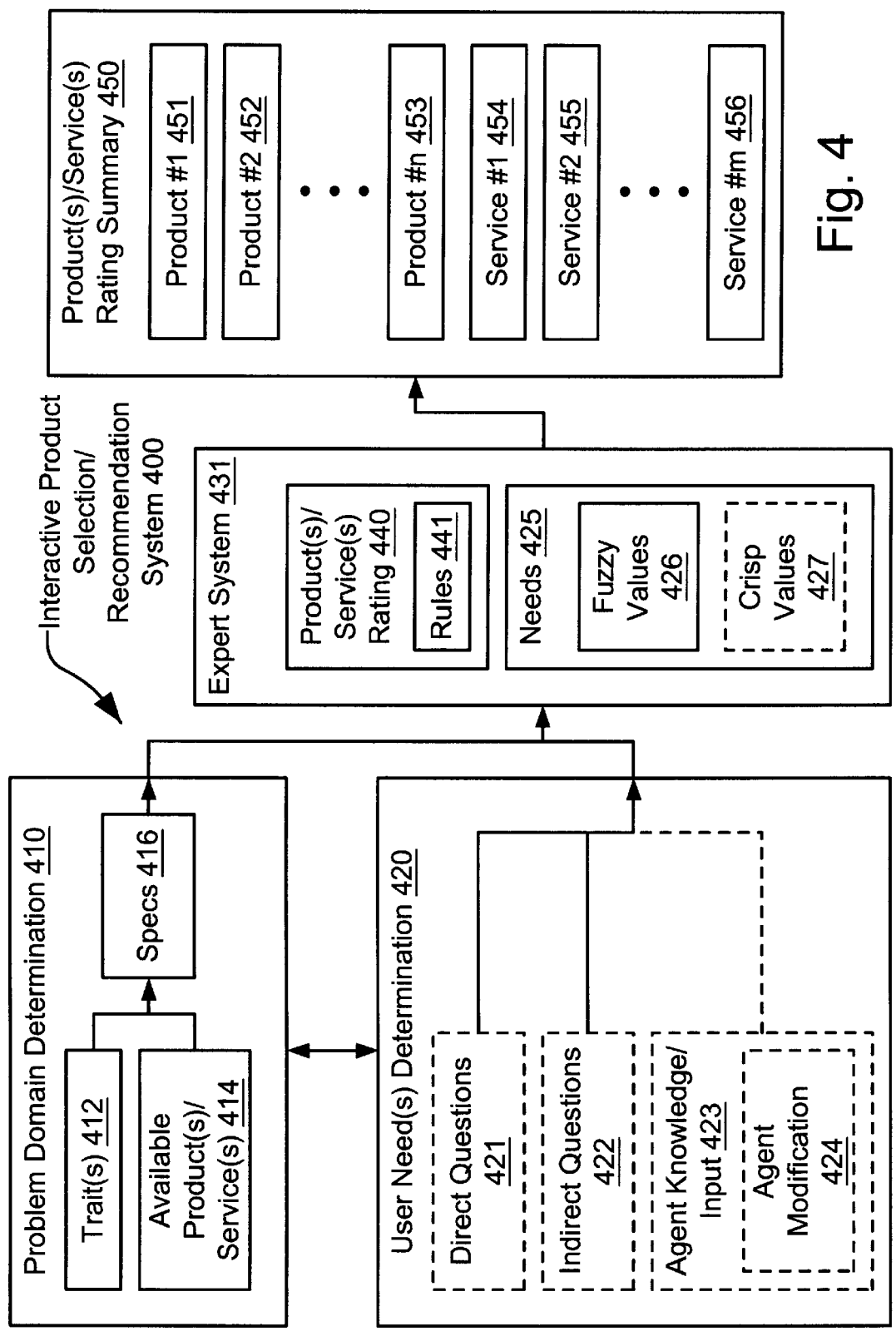
FIG. 4 is a system diagram illustrating another embodiment of an interactive product selection/recommendation system built in accordance with the present invention.

FIG. 4 is a system diagram illustrating another embodiment of an interactive product selection/recommendation system 400 built in accordance with the present invention. Within the interactive product selection/recommendation system 400, problem domain determination is illustrated in a functional block 410. The problem domain determination 410 is performed cooperatively within the context of user need(s) determination as shown in a functional block 420. These two functional blocks operate cooperatively to provide input for an expert system 431 that is operable to provide for a product(s)/service(s) rating summary 450.

Within the problem domain determination functional block 410, an indefinite number of trait(s) 412 and available product(s)/service(s) 414 are used to generate specs 416 that are used as input to the expert system 431. The traits 412 is a characteristic of a product and/or service that is relevant to a particular customer. The available product(s)/service(s) 414 also provide even greater detailed information of the various available product(s)/service(s) for the user of the interactive product selection/recommendation system 400. This greater detailed information may be accessed via a link, or selectable option, or in any manner known in the art.

This is correlated to the user need determination performed in the block 420. The user need determination 420 may be performed using a number of means including asking the customer direct questions 421 and indirect questions 422. In addition, the agent using the interactive product selection/recommendation system 400 is bound to posses some degree of knowledge, though it is understood that a novice or very inexperienced user (agent) may nevertheless use the interactive product selection/recommendation system 400 as well. In situations where the agent does posses a degree of knowledge, expertise, and skill, the agent's knowledge/input 423 may also be used to perform the user need determination 420. The agent may also make modifications of a number of default user needs as shown by a block 424. The agent may use the agent modification block 424 to override system input when his experience or skill level suggests doing so.

After using any of these various means to acquire knowledge, the user's needs determination block 420 provides input to the expert system 431 where the expert system 431 uses this information, along with information from the problem domain determination block 410, to generate user's needs as shown in a block 425. Within the context of expert systems, an indefinite number of fuzzy values 426 are generated. In certain instances, there are situations where a user need must be represented by a crisp value 427, or hard/rigid value. There are other instances are where no crisp values are used at all. An example of such an instance is where questions posed by an agent to a customer do not permit the user to convey a level of uncertainty. In such instances, that particular need or needs should be represented by crisp values 427. Another example of a situation that would best be represented by a crisp value 427 would be the actually availability of certain products in a given location. There may be a situation where only certain services are available in a particular city; such a situation is better represented using crisp values 427.

To state the concept of a crisp, or non-fuzzy value, in another way, some product traits are not measurable in a continuum. For those product traits that may not be represented or are not measurable using a continuum, a crisp value may be used. For example, the customer's physical location and the need for a static IP addresses have a bearing on the recommended product. These traits are not fuzzy. So, take support for static IP address, either a product supports it or not. If a product does not support it and the customer needs it, then, for this trait, the level of customer satisfaction is marked as zero. How this is summarized depends on the relative importance of this trait. The main difference with fuzzy traits is that for crisp traits traditional logic is used and in most cases it may be concluded that the customer is either 100% satisfied or 0% satisfied.

As mentioned briefly above, the specs 416 and the needs 425 are used as inputs to the expert system 431. The expert system 431 performs product(s)/service(s) rating 440 using an indefinite number of rules 441. The product(s)/service(s) rating summary 450 includes a ranking of an indefinite number of products and services, shown as a product #1 451, a product #2 452, . . . , and a product #n 453 and a service #1 454, a service #2 455, . . . , and a service #m 456. For a given problem, a sorted set of classified solutions is returned. The classification includes the level of customer satisfaction achieved by the product. There is a natural bifurcation of performing ratings of services in one instance, and performing ratings of products in another. However, there may be some instances where a product coupled with some services may also be rated. In addition, if the problem requires a product and a service, then the returned solutions will be configured with a specific set of products and a specific set of solutions.

There are many permutations in which the product(s)/service(s) rating summary 450 may be provided to an agent without departing from the scope and spirit of the invention. In one embodiment, the product(s)/service(s) rating summary 450 is provided in a document type of format that an agent may subsequently modify. One such example is the outputting of the product(s)/service(s) rating summary 450 into an MS WORD document that an agent may then edit before forwarding a report onto a customer.

Figure 5:
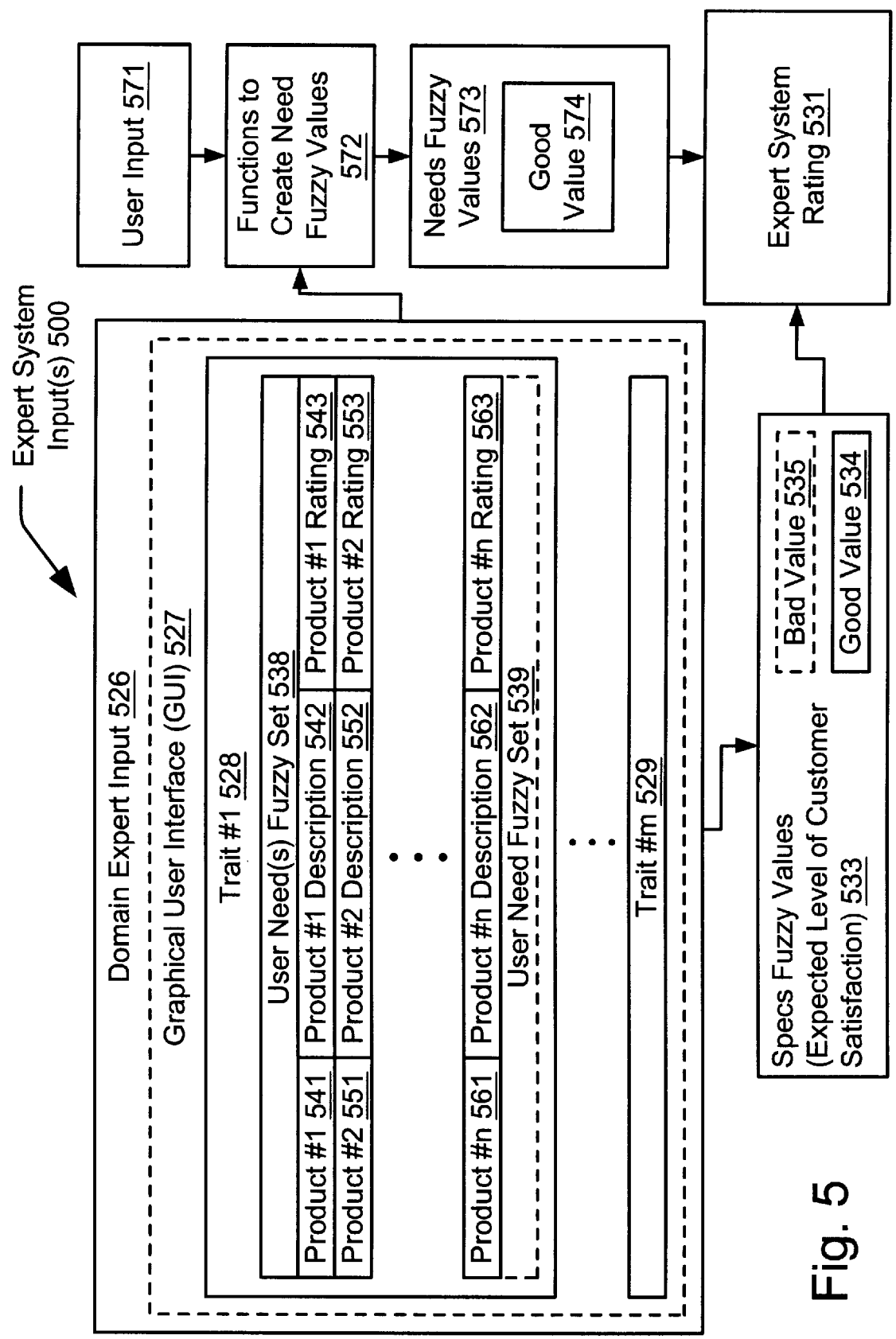
FIG. 5 is a block diagram illustrating an embodiment of some of the inputs that are usable within an expert system that is built in accordance with the present invention.

FIG. 5 is a block diagram illustrating an embodiment of some of the inputs 500 that are usable within an expert system that is built in accordance with the present invention. In this illustrated embodiment of expert system inputs 500, an optional graphical user interface 527 may be used to perform the expert system inputs 500. Alternatively, a file could be generated containing all of the information for use in an expert system. The GUI 527 is perhaps a more user-friendly manner to perform such inputs, especially in the context of lower skilled users of the expert system. The expert system takes in this information to perform expert system rating 531 using a number of inputs, including those that are provided by a user and by a domain expert. A user of the expert system is able to provide user input as shown in the functional block 571. In addition, the domain expert is able to provide his input via the functional block shown as domain expert input 526. Both the user input 527 and the domain expert input 526 are used to control and modify the functions used to create needs fuzzy values 573 for use within the expert system to perform expert system rating 531, as shown by the functional block 572. The needs fuzzy values 573 include a good value 574. These needs fuzzy values 573 are then provided to the expert system.

Similarly, the domain expert input 526 generates specs fuzzy values 533 that are also provided to perform the expert system rating 531. The specs fuzzy values 533 are representative of the expected level of customer satisfaction for the various information provided via the domain expert input 526. The specs fuzzy values 533 include a good value 534 and an optional bad value 535. The bad value may simply be the complement of the good value 534 in certain embodiments of the invention. These specs fuzzy values 533 are then provided to the expert system to perform expert system rating 531.

As mentioned above, the GUI 527 illustrated in this embodiment is illustrative of one manner in which the domain expert input 526 may be input into the expert system to perform expert system rating 531 that is operated using various aspects of the invention.

The GUI 527 may be presented as a table that the domain expert input 527 may use. For any number of traits, shown as a trait #1 528, . . . and a trait #m 529, various information may be provided in the tabular format. For example, as illustrated for the trait #1 528, a user need(s) fuzzy set may be located at the top (user need(s) fuzzy set 538) or bottom (user need(s) fuzzy set 539) of the table, as desired in a given situation. The table may be arranged showing the available products, followed by their description, and subsequently by their rank. This is shown graphically as a table arranged from left to right and top to bottom as follows: ($1^{st}$ line) product #1 541 followed by a product #1 description 542, followed by a product #1 rating 543; ($2^{nd}$ line product #2 551 followed by a product #2 description 552, followed by a product #2 rating 553; . . . ($n^{th}$ line) product #n 561 followed by a product #n description 562, followed by a product #n rating 563. Other variations of the GUI 527 may be used without departing from the scope and spirit of the invention. The GUI 527 is exemplary one just one embodiment that is operable to achieve the domain expert input 526 in a user-friendly manner.

Figure 6:
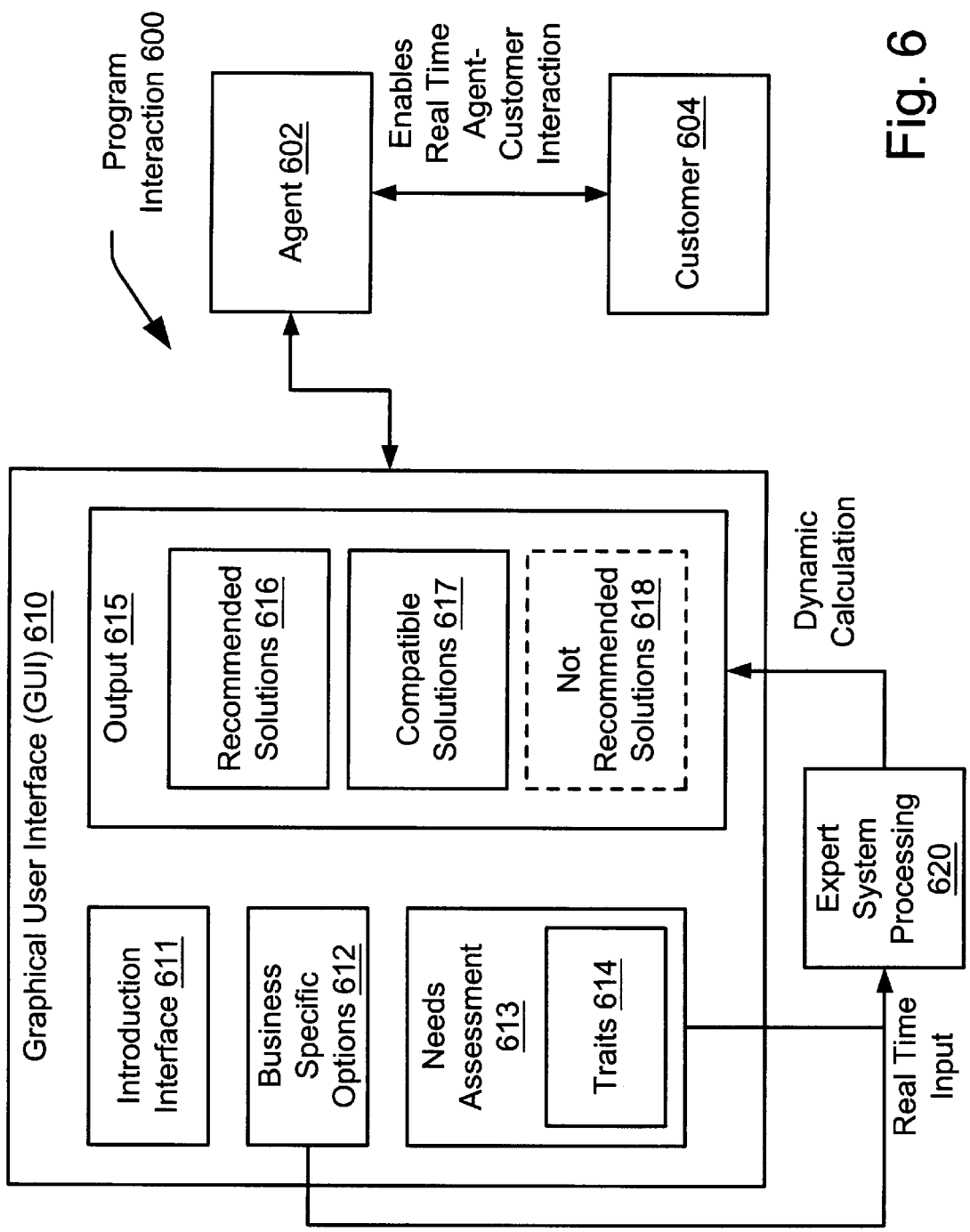
FIG. 6 is a block diagram illustrating an embodiment of program interaction with an expert system that is built in accordance with the present invention.

FIG. 6 is a block diagram illustrating an embodiment of program interaction 600 with an expert system that is built in accordance with the present invention. An agent 602 and a customer 604 are able to interact in real time while the agent 602 has access to the functionality of an expert system that is used to provide recommendations for the agent 602. The agent 602 is afforded access to the expert system via a GUI 610. The GUI 610 walks the agent 602 through a number of intuitively placed screens that assist him in providing effective recommendations to the customer 604. An introduction interface 611 is initially used when the agent 602 begins to invoke the functionality of the expert system that is accessed via the GUI 610.

The agent 602 is able to interact with the customer 604 in real time to perform input of business specific options 612 and to assess the needs of the customer 604, as shown by the needs assessment functional block 613. The business specific options 612 may include additional information regarding the various available products. As described above, any number of traits 614 may be used to perform the needs assessment. The expert system is able to receive these inputs from the business specific options 612 and the needs assessment functional block 613, including the traits 614, in real time. They are then provided to an expert system processing functional block 620. Then, the expert system provided output 615 is displayed via the GUI 610 after performing dynamic calculation. The limiting latency here is the latency of the connectivity between the GUI 610 and the expert system that is used to perform the expert system processing 620. The expert system processing is performed in nearly real time, having sub-second calculation time.

The output 615 includes recommended solutions 616, compatible solutions 617, and (if desired) not recommended solutions 618. In addition, within certain embodiments, an explanation is available for the agent 602 to describe even further the reasons why the particular solutions have been categorized into the various categories, namely, the recommended solutions 616, the compatible solutions 617, and the not recommended solutions 618. This can be most helpful during interaction with the customer, particularly when the customer desires a little more clarification of why a certain solution was recommended and why another was not. The real time input and dynamic calculation offered by the expert system built in accordance with the present invention allows the agent 602 to perform the entire fielding and servicing of a potential client during a single interaction. Compare this with the oftentimes multi-week-long turnaround in getting a customer a recommendation using conventional approaches. As an example, during a single telephone conversation between the agent 602 and the customer 604, the agent 602 is able to input all of the requisite information that the expert system requires. During the same telephone conversation, after the very short duration expert system processing 620, the agent 602 is able to provide virtually immediate recommendation to the customer 604.

The practically real time interaction that is afforded to the agent 602, as well as the explanation that is provided for the various options within the output 615, allow for a relatively inexperienced agent to perform recommendation for the customer 604. The agent 602 may lean on the offered functionality of the system to fill his deficiencies in terms of skill, expertise, and experience within the particular product area The invention is also very desirable for product providers because they are able to employ relatively low skill level personnel to perform the selling of their products and/or services. This can ensure a greater profitability. Particularly within areas where there is a high degree of turnover, the invention allows a solution where a consistent level of expertise if proffered to the customer 604. In addition, in contexts where a high degree of skill is required to perform the sale of such products and/or services, a provider need not invest such a large amount of up-front effort to get a prospective employee into a position where he may be an effective salesperson or agent.

Figure 7:
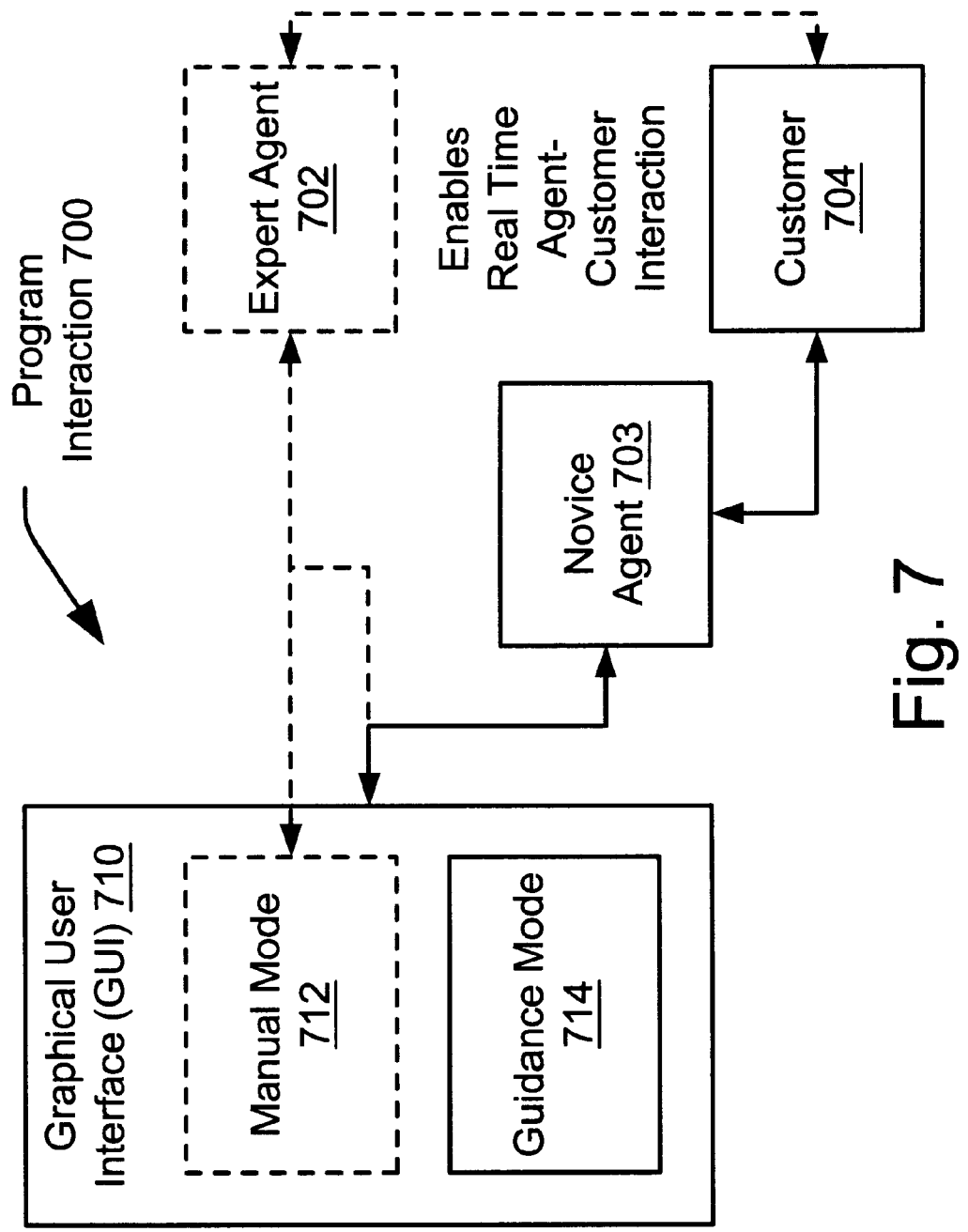
FIG. 7 is a block diagram illustrating another embodiment of program interaction with an expert system that is built in accordance with the present invention.

FIG. 7 is a block diagram illustrating another embodiment of program interaction with an expert system 700 that is built in accordance with the present invention. As described in the many variations of the invention shown above, and many that will be shown below as well, the invention is operable using agents of varying degrees without suffering deleterious effects from a customer perspective. As described above, the invention is operable without requiring a highly skilled or trained agent, as is typically required in solutions using conventional approaches.

The FIG. 7 shows a GUI 710 that allows operation for an agent in a number of multiple modes. Two exemplary modes are those of an (optional) manual mode 712 and a guidance mode 714. If desired, the invention is variable or adaptable depending on the skill level of an agent who desires to employ an expert system in accordance with certain aspects of the present invention. For example, a novice agent 703 may be allowed to access only the guidance mode 714 of the GUI 710 whereas an expert agent 702 may be allowed to access both the guidance mode 714 and a manual mode 712. A customer 704 is able to interact with any agent who employs the expert system, regardless of whether the agent be the novice agent 703 or the expert agent 702. As described above in various embodiments as well as within this embodiment, this interaction may be performed in real time agent-customer interaction.

The manual mode 712 allows for an agent to override any expert system processing. That is to say, the manual mode 712 allows an agent to operate using the GUI 710 in a manner analogous to that employed within conventional approaches, such as allowing the agent to perform the selection of products based on his own knowledge, expertise, and experience. Alternatively, the guidance mode 714 employs the expert system that is operable to perform guidance of the agent through the recommendation/selection process. Within either mode, the guidance mode 714 or the manual mode 712, the product description is made available to the agent to allow for further description of the various available products when interacting with the customer as also described above in various embodiments.

Figure 8:
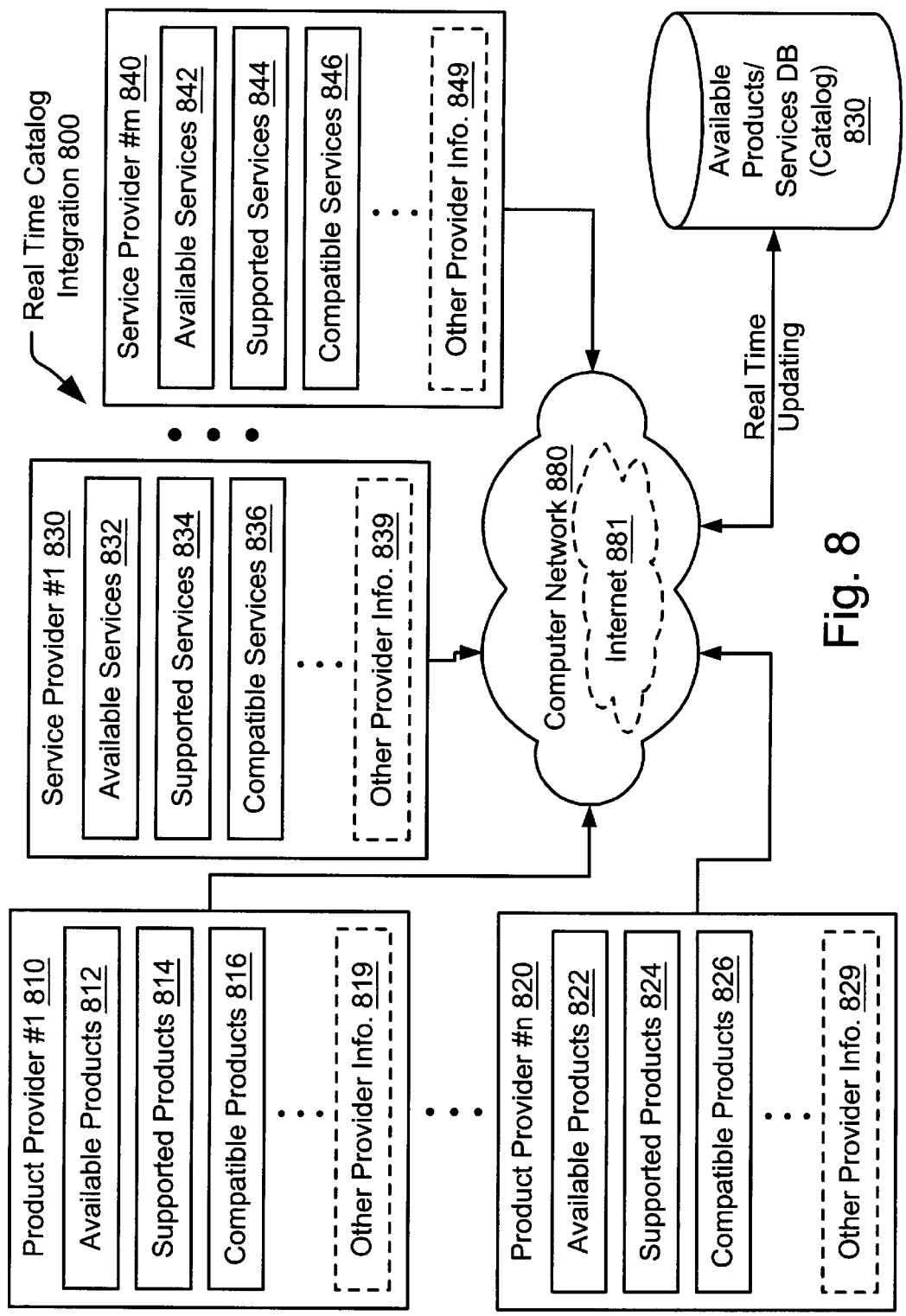
FIG. 8 is a block diagram illustrating an embodiment of real time catalog integration that is achieved in accordance using certain aspects of the present invention.

FIG. 8 is a block diagram illustrating an embodiment of real time catalog integration 800 that is achieved in accordance using certain aspects of the present invention. A computer network 880 is operable to perform real time updating of any number of various service and product providers into an available products/services database (catalog) 830. The available products/services database (catalog) 830 is also communicatively coupled to the computer network 880. The real time updating of the number of various service and product providers into the available products/services database (catalog) 830 ensures that the available products/services database (catalog) 830 is as up to date as the inventories listed for the various service and product providers' databases.

The computer network 880 may include the Internet 881 in certain embodiments of the invention. However, the computer network 880 may also be a dedicated network, such as a local area network (LAN) or other localized network, that is operable to communicatively couple the various service and product providers.

The databases of the various service and product providers are categorized in any number of manners. Exemplary information for the various databases are shown in the embodiment of the FIG. 8. For example, a database for a product provider #1 810 includes information such as a listing of available products 812, a listing of supported products 814, a listing of compatible products 816, . . . and a listing of any other provider information 819. Any number of other product providers may also be used as well without departing from the scope and spirit of the invention. For example, a database for a product provider #n 820 includes information such as a listing of available products 822, a listing of supported products 824, a listing of compatible products 826, . . . and a listing of any other provider information 829.

In addition, any number of service providers may also be integrated into the available products/services database (catalog) 830. For example, a database for a service provider #1 830 includes information such as a listing of available services 832, a listing of supported services 834, a listing of compatible services 836, . . . and a listing of any other provider information 839. Similarly, any number of other service providers may also be used as well without departing from the scope and spirit of the invention. For example, a database for a service provider #m 840 includes information such as a listing of available services 842, a listing of supported services 844, a listing of compatible services 846, . . . and a listing of any other provider information 849. Other information may also be included within the various databases for the various product and service providers without departing from the scope and spirit of the invention.

Figure 9:
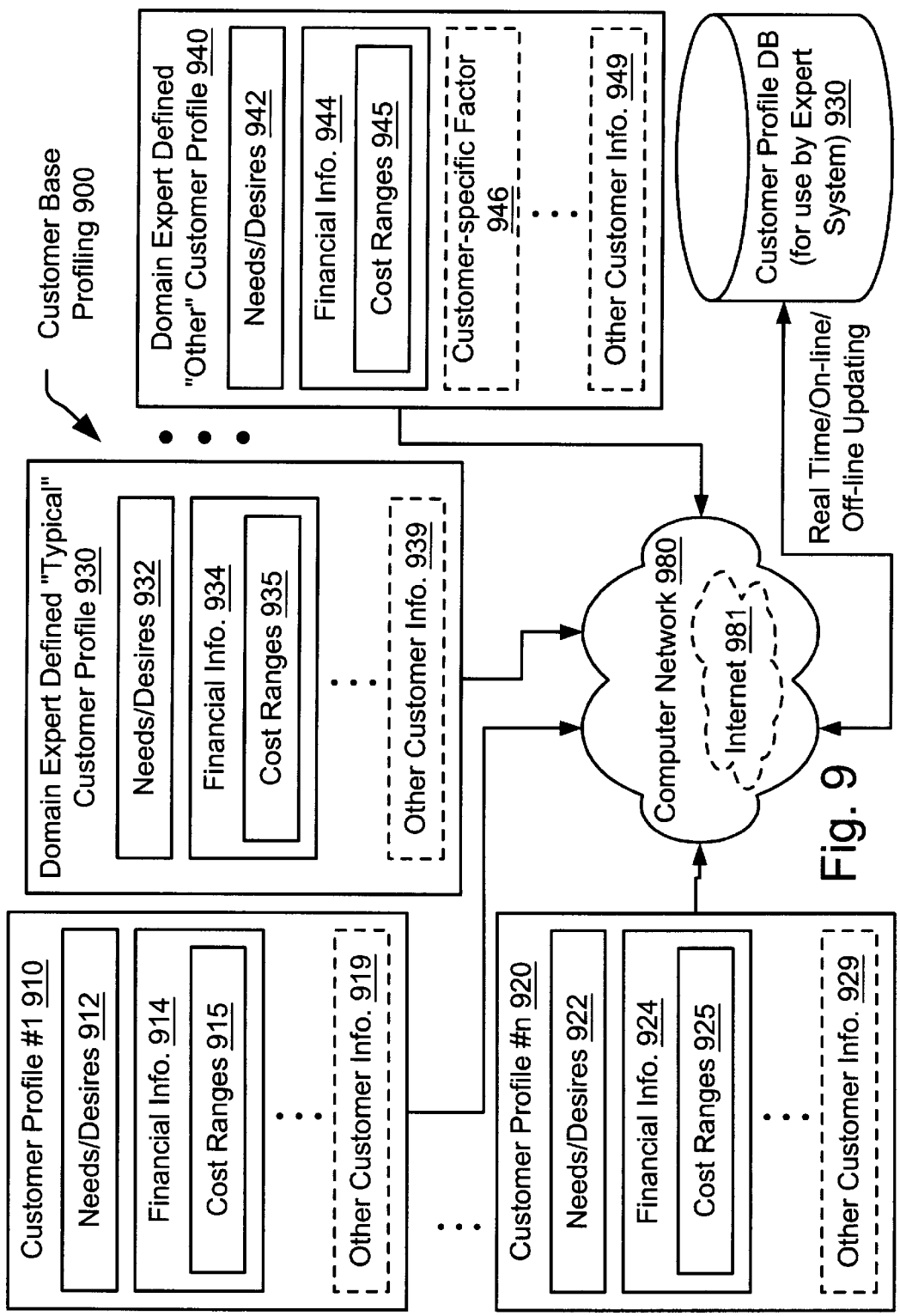
FIG. 9 is a system diagram illustrating an embodiment of customer base profiling that is achieved in accordance using certain aspects of the present invention.

FIG. 9 is a system diagram illustrating an embodiment of customer base profiling 900 that is achieved in accordance using certain aspects of the present invention. The customer base profiling 900 may be performed in an analogous manner in which the real time catalog integration 800 of the FIG. 8 is integrated and performed to generate the available products/services database (catalog) 830.

For example, a computer network 980 is operable to perform real time updating of any number of customer profiles into a customer profile database 930 that is used within an expert system. The customer profile database 930 is also communicatively coupled to the computer network 980. The updating of the number of various customer profiles is performed in any number of manners, including real time, on-line, and off-line, without departing from the scope and spirit of the invention.

The computer network 980 may include the Internet 981 in certain embodiments of the invention. However, the computer network 980 may also be a dedicated network, such as a local area network (LAN) or other localized network, that is operable to communicatively couple the various customer profiles.

The databases of the various customer profiles are categorized in any number of manners. Exemplary information for the various customer profile databases are shown in the embodiment of the FIG. 9. For example, a database for a customer profile #1 910 includes information such as needs/desires 912, financial information 914, . . . and any other customer information 919. If further desired, the financial information 914 may further include information concerning cost ranges 915. In some embodiments, the customer information may include the current services and products that a customer currently has at his disposal. The engines that the expert system employ to perform rating of products and/or services may also include taking this information into account when generating recommendations.

In addition, any number of other customer profiles may also be used as well without departing from the scope and spirit of the invention. For example, a database for a customer profile #n 920 includes information such as needs/desires 922, financial information 924, . . . and any other customer information 929 as well. Similarly, the financial information 924 may further include information concerning cost ranges 925.

In addition, the various customer profiles may also include any number of default or user defined profiles as well. For example, a "typical" customer profile, defined by a domain expert 930, may be used in certain embodiments of the invention. This domain expert defined "typical" customer profile 930 may include similar information as that provided by the customer profiles #1 910, . . . and the customer profiles #n 920. For example, the domain expert defined "typical" customer profile 930 may include information such as needs/desires 932, financial information 934, . . . and any other customer information 939. If further desired, the financial information 934 may further include information concerning cost ranges 935. However, the domain expert defined "typical" customer profile 930 may include different information as well as determined by the domain expert.

The domain expert may also define any number of "other" customer profiles, besides a simple "typical" customer profile. For example, a domain expert defined "other" customer profile 940 may include similar information as that provided by the customer profiles #1 910, . . . and the customer profiles #n 920. For example, the domain expert defined "other" customer profile 940 may include information such as needs/desires 942, financial information 944, . . . and any other customer information 949. If further desired, the financial information 944 may further include information concerning cost ranges 945. In addition, if desired by the domain expert, other factors may also be included as well. A customer-specific factor 946 is also included in certain embodiments of the invention, as determined by the domain expert.

Figure 10:
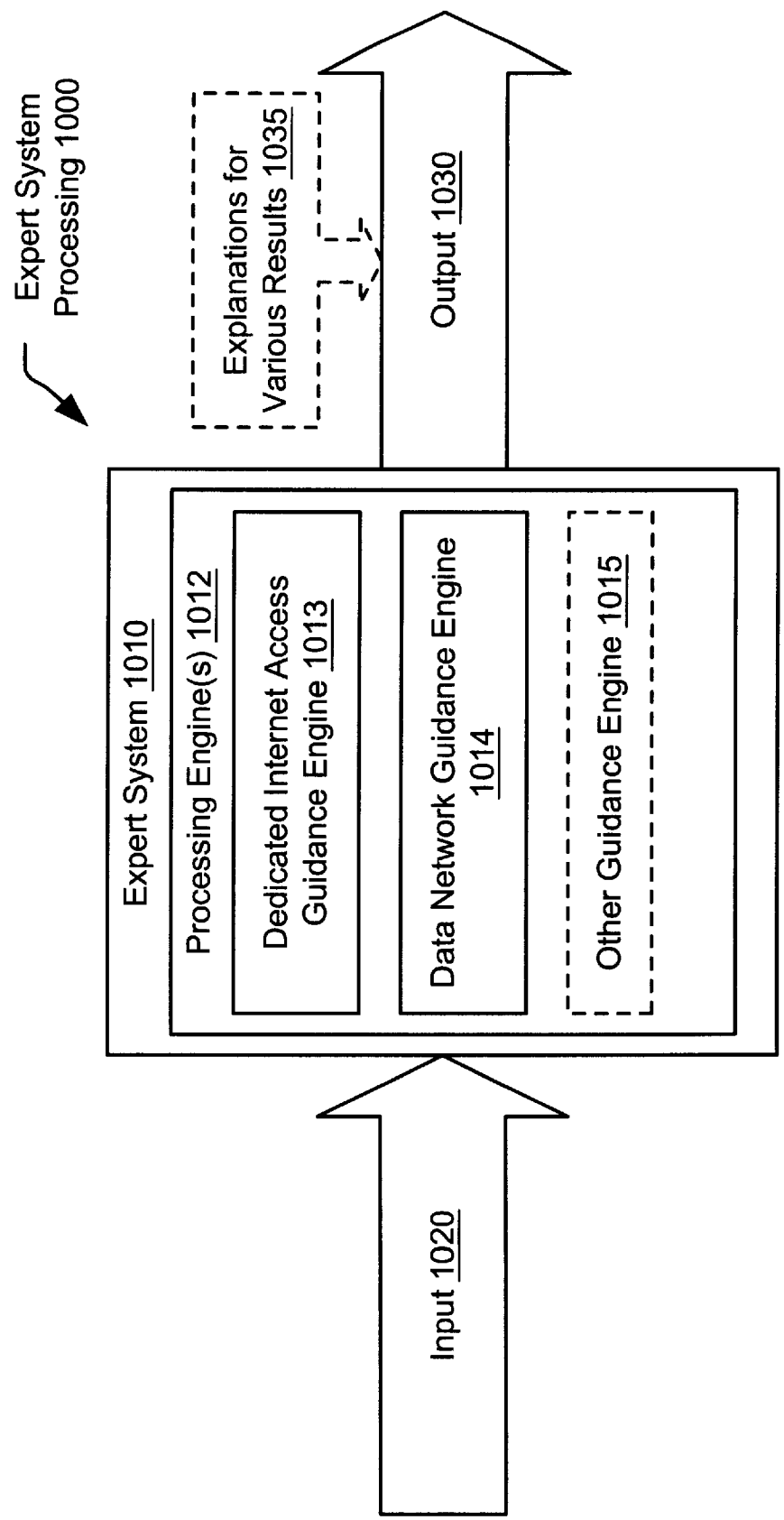
FIG. 10 is a system diagram illustrating an embodiment of expert system processing that s performed in accordance with the present invention.

FIG. 10 is a system diagram illustrating an embodiment of expert system processing 1000 that is performed in accordance with the present invention. Input is provided to an expert system 1010 to provide output 1030. In addition, the expert system 1010 employs a number of processing engine(s) 1012. The processing engine(s) 1012 include a dedicated Internet access guidance engine 1013 and a data network guidance engine 1014. In addition, any other number of guidance engines 1015 may also be employed without departing from the scope and spirit of the invention. If desired, the output 1030 includes explanations for the various results 1035.

Figure 11:
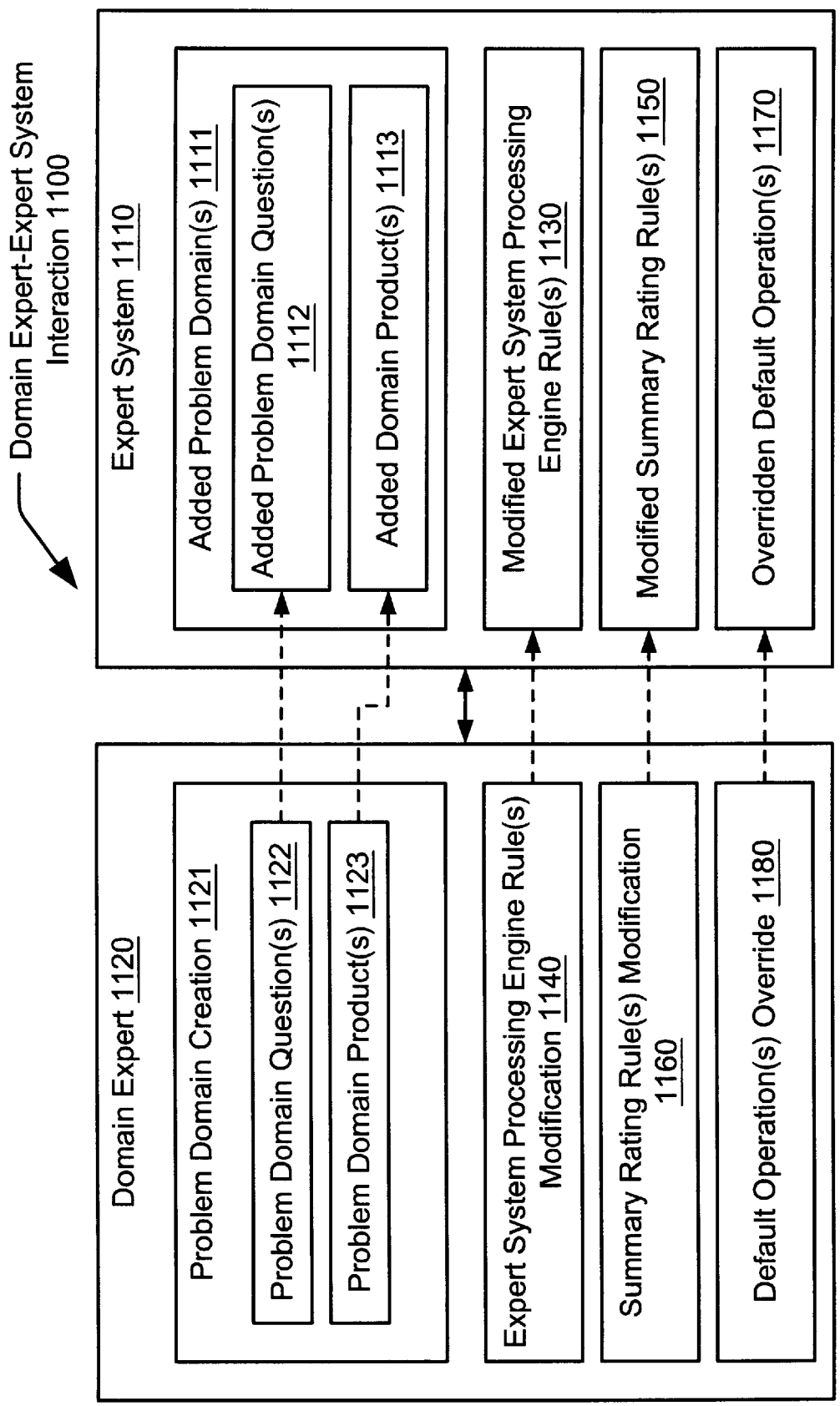
FIG. 11 is a system diagram illustrating an embodiment of interaction between a domain expert and an expert system in accordance with certain aspects of the present invention.

FIG. 11 is a system diagram illustrating an embodiment of interaction between a domain expert and an expert system 1100 in accordance with certain aspects of the present invention. A domain expert 1120 is authorized to identify, or create, the various problem domains for use within an expert system 1110. To perform problem domain creation 1121, the domain expert 1120 uses problem domain question(s) 1122 and can present those in light of the problem domain product(s) 1123 that are available that may provide a solution for the problem domain. In light of the creation of the problem domains 1121 by the domain expert, the expert system 1110 will accommodate the added problem domain(s) 1111. The problem domain question(s) 1122 and the problem domain product(s) 1123 results in added problem domain question(s) 1112 and added domain product(s) 1113 within the added problem domain(s) 1111 within the expert system 1110.

In this embodiment, the domain expert 1120 is also afforded the ability to perform expert system processing engine rule(s) modification 1140 for the processing engines employed by the expert system 1110. The modified processing engine rule(s) 1130 are then employed by the expert system 1110. Similarly, the domain expert 1120 is also afforded the ability to perform summary rating rule(s) modification 1160 for the summary rating operations within the expert system 1110. The modified summary rating rule(s) 1150 are then employed by the expert system 1110. Moreover, the domain expert 1120 is also afforded the ability to override default operation(s) 1180 for the default operations to be performed by the expert system 1110. The overridden default operation(s) 1170 are then employed within the default operations of the expert system 1110.

In addition to the robustness, variability, and adaptability of an expert system that is built in accordance with the invention, such an expert system has been generated in light of a number of goals as well. The expert system is operable to change its recommendations smoothly as the inputs change. For example, adding one more employee to a site should not lead to drastic changes to the recommendations. The expert system is operable to accommodate minor changes and deviations of inputs without catastrophically failing, or by producing radically different output.

Moreover, a domain expert of relatively low skill level, or minimal computer training, is also to perform a number of tasks, some of which are enumerated in the FIG. 11. For example, the domain expert may easily add new problem domains, as shown in the problem domain creation functional block 1121. The domain expert is also able to add new traits to each problem domain. For example, this may include adding new questions to a GUI, such as a web page, and then transforming the answers into needs. The domain expert may also add new products to each of the problem domains, as desired. The domain expert may also modify the manner in which customer answers are converted into needs; this would also include deciding whether to employ fuzzy or non-fuzzy (crisp) values. The domain expert may also change the rule that creates summary ratings for a product based on its ratings for each trait, as illustrated in the summary rating rule modification functional block 1120 of the FIG. 11. The domain expert may also fine tune the rules to affect the recommendations made by the expert system as well.

As described above in many of the various embodiments, the expert system provided for sub-second response time in its own code (not counting network traffic) for any input-to-recommendation transaction. This enables real time interaction between agent and customer. In addition, the expert system is able to provide explanation for the reasons that lead to particular recommendations.

Figure 12:
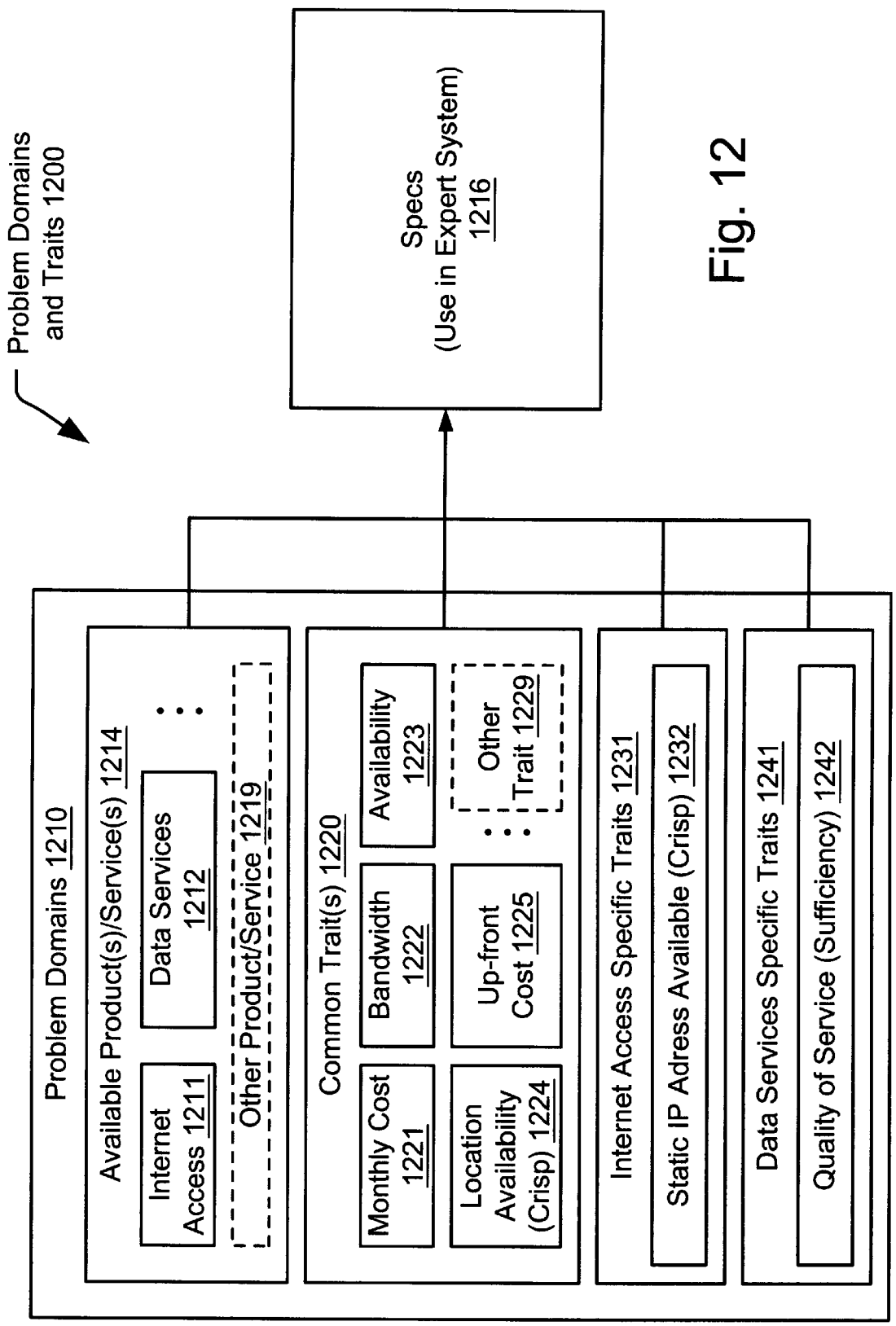
FIG. 12 is a block diagram illustrating an embodiment of definitions of problem domains and traits that are usable within an expert system that is built in accordance with certain aspects of the present invention.

FIG. 12 is a block diagram illustrating an embodiment of definitions of problem domains and traits 1200 that are usable within an expert system that is built in accordance with certain aspects of the present invention. In this embodiment, an example of problem domains 1210 is shown for any number of available product(s)/service(s) 1214. The available product(s)/service(s) 1214 includes Internet access 1211 and data services 1212. In addition, the available product(s)/service(s) 1214 may also include any other product/service 1219 as well.

For the Internet access 1211 and data services 1212 share a number of common trait(s) 1220, and each of the Internet access 1211 and data services 1212 has specific traits as well. Examples of common trait(s) 1220 shared between them include monthly cost 1221, bandwidth 1222, availability 1223, location availability (crisp) 1224, and up-front cost 1225. In addition, any other trait 1229 may also be included or adapted for a given situation or application. An example of Internet access specific traits 1231 includes whether a static Internet protocol address is available (crisp) 1232 for the customer. An example of data services specific traits 1241 includes whether a quality of service, or sufficiency of the quality of service, 1242 is appropriate for a given situation or application to meet a customer's needs or desires. All of the information within the problem domain 1210 is provided via specs 1216 for use in an expert system. The expert system is any expert system as described in any of the various embodiments of the invention.

Figure 13:
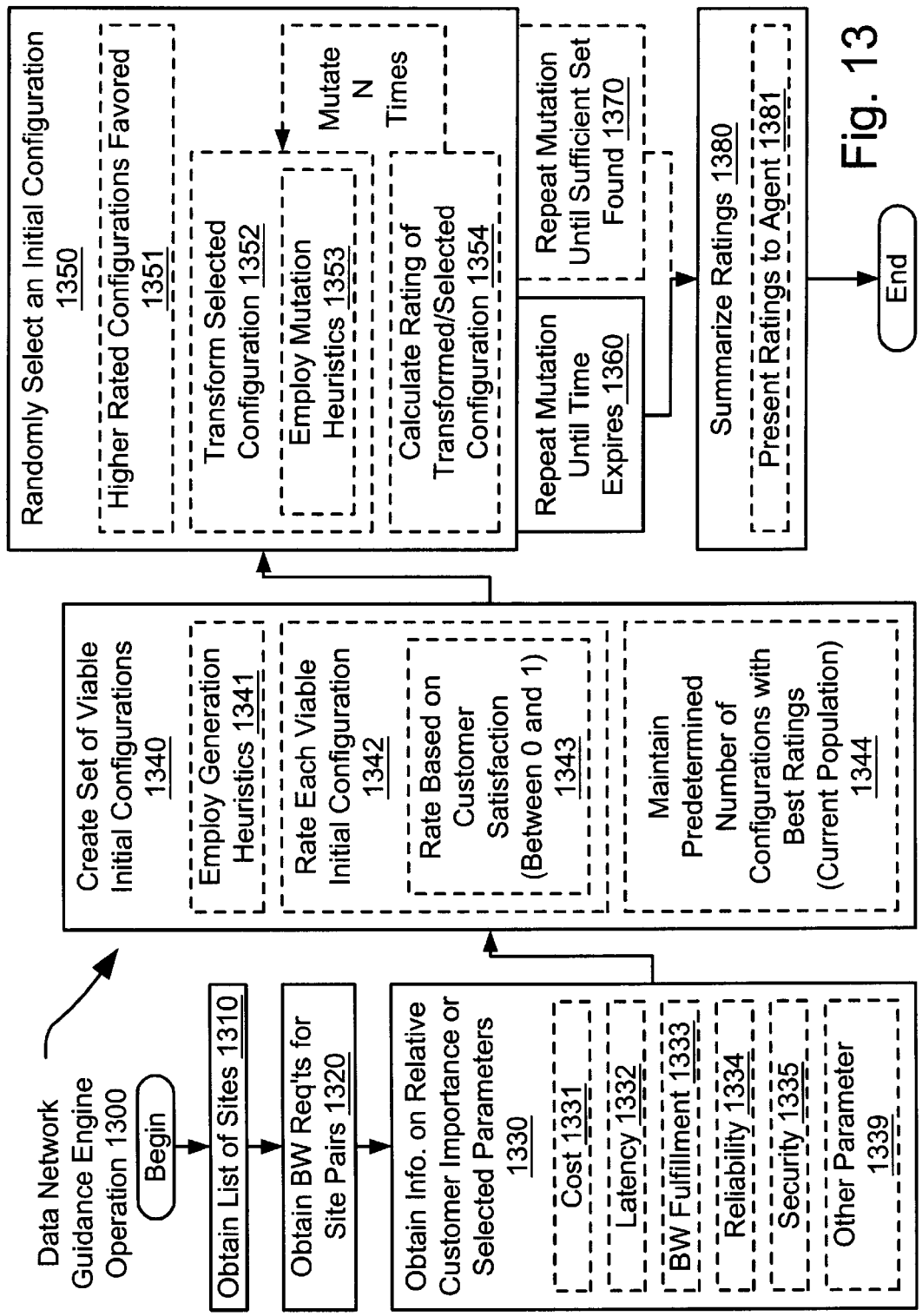
FIG. 13 is a block diagram illustrating an embodiment of data network guidance engine operation that is performed in accordance with certain aspects of the present invention.

FIG. 13 is a block diagram illustrating an embodiment of data network guidance engine operation 1300 that is performed in accordance with certain aspects of the present invention. In a block 1310, a list of sites to be interconnected is obtained. Their locations may also be included in this acquisition of information. If desired, an agent provides this information shown in the block 1310. Alternatively, a file that contains this information may be used to obtain this information as well. Then, in a block 1320, the bandwidth requirements for the site pairs is obtained. An agent may provide this information indirectly.

Subsequently, in a block 1330, information of the relative importance of any number of selected parameters is obtained. The selected parameters in the block 1330 may be any number of parameters including cost 1331, latency 1332, bandwidth fulfillment 1333, reliability 1334, security 1335, or any other parameter 1335 that may be agent or customer defined as desired in a given application. The relative importance of the selected parameters may be done when the server is configured on a per-carrier basis or may be provided interactively by the agent.

Using the information for the selected parameters obtained in the block 1330, a set of viable initial configuration are created in a block 1340. These viable initial configurations may be created using a number of various means. For example, the viable initial configurations may be created by employing generation heuristics 1341. Then, each of these viable initial configurations are rated in a block 1342. If desired, the rating is an estimate of customer satisfaction between 0 and 1, as shown in a block 1343. Then, the data network guidance engine maintains a predetermined number of configurations with the best ratings in a block 1344. This set of a specific number of configurations with the best ratings may aptly be called the "current population."

Then, as shown in a block 1350, the data network guidance engine operation 1300 randomly selects an initial configuration. If desired, this initial configuration, selected from the current population, is selected at random with configurations with better ratings having a better chance of being selected. That is to say, higher rated configurations are favored as shown in a block 1351. Then, in a block 1352, the data network guidance engine transforms the selected configuration. If desired, the data network guidance engine employs mutation heuristics, as shown in a block 1353, to perform the transformation of the selected configuration. For example, the data network guidance engine may use a set of mutation heuristics to transform the chosen configuration in some small way (for example, by creating a new link or taking some bandwidth from a link and assigning it to another link). Then, the data network guidance engine calculates a new rating of the transformed/selected configuration as shown in a block 1354. Then, the transformed/selected configuration may then be transformed again, for a total of N consecutive times to reach a desirable configuration.

The desirable configuration may be determined using a variety of means. For example, the repeated mutations may continually be performed until a predetermined amount of time has expired, as shown in a block 1360. However, the repeated mutations may continually be performed until a sufficiently sized set of network configurations may be found, as shown in a block 1370. In addition, other means that govern when to stop performing mutation iterations may be used without departing from the scope and spirit of the invention as well. The remaining configurations that remain in the population then are summarized as shown in a block 1380. If desired, these remaining configurations may then be presented to an agent as shown in a block 1381.

The data network guidance engine operation 1300 is, from certain perspectives, based on genetic methods. Using the terminology of genetic methods: the set of configurations with the best ratings is the current population. A link in a configuration represents a gene. The small change to one or more links in the configuration is a mutation.

The use of the word configuration is made to refer to a specific network topology with bandwidths associated with every link and site. More precisely: Let $S=\{S_i\}$ be the set of all sites under consideration. Then a configuration is a made up from a pair of sets C and D. $C=\{b_{x,y}\}$ Where $x \in S$ and $y \in S$ and $b_{x,y}$ represents the bandwidth of the direct link between x and y. If $b_{x,y}=0$, then x and y don't have a direct link. $D=\{b_x\}$ Where $x \in S$ and $b_x$ represents the bandwidth assigned to site x (e.g., to connect to the central office).

Figure 14:
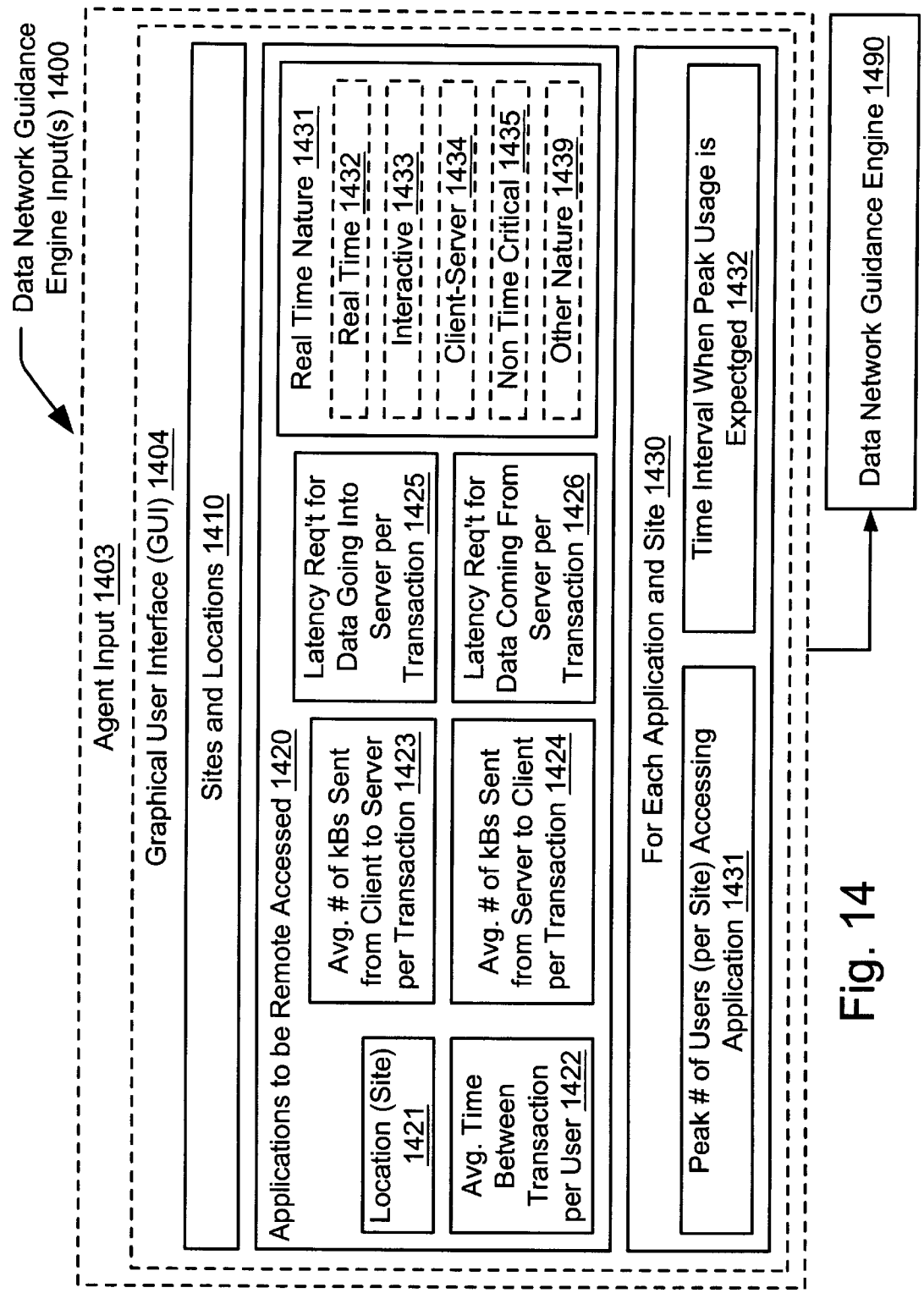
FIG. 14 is a system diagram illustrating an embodiment of some inputs used by data network guidance engine that is built in accordance with certain aspects of the present invention.

FIG. 14 is a system diagram illustrating an embodiment of some inputs 1400 used by data network guidance engine 1490 that is built in accordance with certain aspects of the present invention. In certain embodiments of the invention, the data network guidance engine assumes that these inputs 1400 are provided before operation of the data network guidance engine 1490 commences. If desired, these inputs 1400 may be input by an agent as agent input 1403. Moreover, the manner of input may be performed via GUI 1404. Other means of inputting this information may be performed as well.

As shown in a block 1410, a set of sites with their locations is input for use by the data network guidance engine 1490. In addition, in a block 1420, a set of applications that need to be accessed remotely are provided for use by the data network guidance engine 1490. A variety of different information may be provided as shown in the block 1420. Additional information may also be provided as desired in a given application. For example, for any of the applications, the real time nature 1431 may be included. The various applications may be classified as described below. The real time nature 1431 of some applications is classified as being real time 1432 where the response time of the application is critical. For example, real-time voice or video are some applications that may be classified as real time 1432. Other applications are classified as being interactive 1433 where the person who is submits requests and expects replies. In such applications, small delays are tolerated. Moreover, some applications may be classified as being client-server 1434. These applications are such that a client (a program) uses some form of remote procedure call (RPC) to submit requests. There are also those applications that are non time-critical 1435. These applications may be referred to as batch applications. In such applications, the response time is typically not an important factor.

Other information may also be included in the information for the set of applications that need to be accessed remotely 1420. The location (site) 1420 is included in this information in certain embodiments of the invention. The average amount of time that elapses between transactions for a given user 1422 may be included. In addition, the average number of kilobytes sent from the client to the server for a given transaction 1423, and its converse, the average number of kilobytes sent from the server to the client for a given transaction 1424 may also be included. Latency issues often play a significant role in certain applications as well. For example, the latency required for data going into the server for a given transaction 1425, and the latency required for data coming from the server for a given transaction 1426 may both be provided within the information for the set of applications that need to be accessed remotely 1420.

For every application and every site, certain information must also be provided as shown in a block 1430. Two examples of such information include a peak number of users in that site accessing the application 1431 as well as the time interval when peak usage is expected 1432. Other application-site specific information may be used as well.

Figure 15:
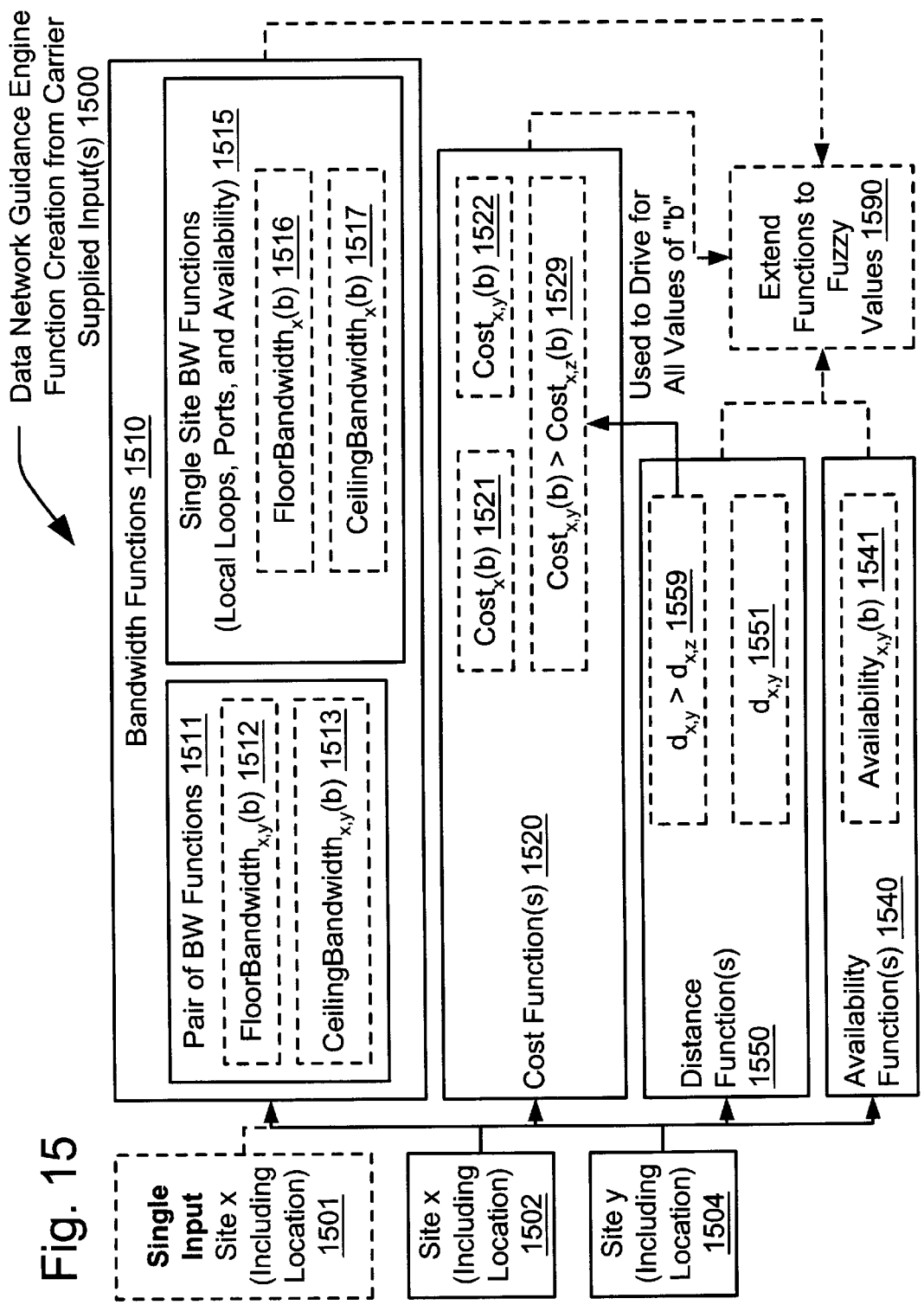
FIG. 15 is a block diagram illustrating an embodiment of creation of functions based on carrier supplied inputs that may be used in a data network guidance engine operation that is built in accordance with certain aspects of the present invention.

FIG. 15 is a block diagram illustrating an embodiment of creation of functions 1500 that are based on carrier supplied inputs that may be used in a data network guidance engine operation that is built in accordance with certain aspects of the present invention. There exist at least two ways in which to generate these functions 1500, as shown in the FIG. 15: using single input or dual input for the function generation. A data network guidance engine is operable assuming that the functions shown within the FIG. 15 may be created from information available from a telecommunications carrier. For many of the embodiments shown below, bandwidth "b" is shown as being in kbps, yet other methods of measuring bandwidth may be employed without departing from the scope and spirit of the invention.

For a given pair of sites x and y with their geographic locations (shown as a site x 1502 and a site y 1504), a pair of bandwidth functions 1511 may be created. This pair of bandwidth functions 1511 includes a FloorBandwidth$_{x,y}$(b) 1512 and a CeilingBandwidth$_{x,y}$(b) 1512. The bandwidth "b" is a bandwidth in kbps in certain embodiments of the invention other means of measuring bandwidth may also be performed as well. The FloorBandwidth$_{x,y}$(b) 1512 returns the maximum bandwidth that is available between sites x and y that is less than or equal to b. The CeilingBandwidth$_{x,y}$(b) 1513 returns the minimum bandwidth that is available between sites x and y that is greater than or equal to b. The CeilingBandwidth$_{x,y}$(b) 1513 returns the greatest capacity available between the site x 1502 and the site y 1504 if a link with a capacity greater than or equal to b can not be offered for those locations.

As mentioned above, functions generated from single inputs may also be generated in accordance with the invention. For example, given a single site x 1501 with its geographic location (single input shown in dotted lines), a pair of bandwidth functions, shown as single site bandwidth functions 1515 may be generated. The single site x 1501 is exactly the site x 1502 in certain embodiments of the invention; the use of two blocks 1501 and 1502 is used for illustrative purposes and simplicity in understanding certain aspects of the invention.

Examples of single site bandwidth functions include local loops, ports and their availability at any given location, among other types of single site bandwidth functions. A FloorBandwidth$_x$(b) 1516 and a CeilingBandwidth$_x$(b) 1517 may be constructed. Again, "b" is a bandwidth in kbps, yet other means of measuring bandwidth may be used without departing from the scope and spirit of the invention. The FloorBandwidth$_x$(b) 1516 returns the maximum bandwidth that is available for the site x 1501 that is less than or equal to b. The CeilingBandwidth$_x$(b) 1517 returns the minimum bandwidth that is available for the site x 1501 that is greater than or equal to b. The CeilingBandwidth$_x$(b) 1517 returns the greatest capacity available for the site x 1501 if a capacity greater than or equal to b can not be offered for its location.

Given 2 sites x 1502 and the site y 1504, with their geographic locations, any number of cost functions 1520 may be constructed. Examples of a cost function 1520 that is based on input from two sites is a Cost$_{x,y}$(b) 1522. Within the Cost$_{x,y}$(b) 1522, the "b" is again bandwidth in kbps. The Cost$_{x,y}$(b) 1522 returns the periodic cost in an arbitrary monetary unit associated with a link between the sites x 1502 and y 1504 that supports a bandwidth of b in kbps. The periodic cost may be in terms of monthly cost, yearly cost, or any other periodic unit. The arbitrary monetary unit may be in terms of U.S.D. or any other currency or financial measuring unit without departing from the scope and spirit of the invention. Similarly, the bandwidth "b" is measured in kbps, yet other measurements of bandwidth may also be used as understood in the art. The value b provided to the Cost function $Cost_{x,y}(b)$ 1522 is a value obtained from the floor or ceiling functions for the sites x 1502 and y 1504.

However, as with the bandwidth functions 1510, when given a single site x 1501 with its geographic location, a cost function $Cost_x(b)$ 1521 can be constructed, where b is a bandwidth in kbps. Again, the same comments regarding the sites x 1501 and 1502 are applicable here as well. The $Cost_x(b)$ 1521 returns the periodic cost in an arbitrary monetary unit associated with a capacity for the site x 1501 that supports a bandwidth of b kbps. Again, the periodic measurement, arbitrary monetary unit, and bandwidth may all be measured using various means without departing from the scope and spirit of the invention. The value b provided to the Cost function $Cost_x(b)$ 1521 is a value obtained from the floor or ceiling functions for site x. This function deals with local loops, ports and their cost at any given location.

Given 2 sites x and y with their geographic locations, any number of availability functions 1540 may also be constructed as well. One such availability function is an availability function $Availability_{x,y}(b)$ 1541 that may be constructed, where b is a bandwidth in kbps. The $Availability_{x,y}(b)$ 1541 returns the proportion of the time that a link between the sites x 1502 and y 1504 that supports a bandwidth of b kbps is available. This is usually measured as:

$$\frac{MTTR}{MTTR + MTBF}$$

Where MTTR is mean time to repair and MTBF is mean time between failures. These metrics depend on the technology used, which in turn may depend on the bandwidth required. As a special case, when the $Availability_{x,y}(b)$ 1541 is of a value of zero (0), it means that the sites x 1502 and y 1504 cannot be directly connected with a link that provides the requested bandwidth. There are certain instances where the availability functions 1540 may not be required. For example, some assumptions may be made to obviate the need for the availability functions 1540. One such assumption includes an assumption that the weakest link with respect to availability for frame relay and dedicated line is the local loop. Since the local loop is one per site, the rest of the topology of the network has little bearing on the overall availability. Other assumptions may be made to obviate the need for the availability functions 1540 as well without departing from the scope and spirit of the invention.

For each pair of sites x 1502 and y 1504, distance functions 1550 may also be used. The term "distance" is arbitrarily chosen as a function that may be used to affect the cost of bandwidth between those sites x 1502 and y 1504. For each pair of sites x 1502 and y 1504, the distance function between those sites $d_{x,y}$ 1551 is calculated for use to drive some of the heuristics. Some of the various embodiments of heuristics used in accordance with the invention are described below. The distance functions 1550 can have any unit of measurement. This unit of measurement may be any distance measurement without departing from the scope and spirit of the invention, e.g., miles, kilometers, etc. They may be used to drive the following implication within the data network guidance engine processing:

$$d_{x,y} > d_{y,z} \rightarrow Cost_{x,y}(b) > Cost_{x,z}(b)$$

For example, the relationship $d_{x,y} > d_{x,z}$ 1559 is used to drive and indicate the relationship $Cost_{x,y}(b) > Cost_{x,z}(b)$ 1529. Since this implication is used to drive heuristics (again, many embodiments of which will be further described below), it is just important that it holds most of the time. In certain embodiments of the invention, the mere physical distance between sites, which is calculated using the latitude and longitude of the central office for the NPA-NXX of the site, may simply be used in place of a distance function per se. Other implications may also be used to drive various heuristics used by the data network guidance engine without departing from the scope and spirit of the invention.

The cost, ceiling and floor functions for a given connection and for a given site are usually dependent on the telecommunications carrier and the technology used to construct the network. For example, for ATM, Frame Relay and Dedicated Line, it is expected that these functions will be different. Nevertheless, the creation of functions 1500 that are based on carrier supplied inputs as shown in the FIG. 15 is extendible for any number of technologies. A natural extension of the operation of the FIG. 15 allow the results of these various functions to be extended to fuzzy values, as shown in the block 1590.

Figure 16:
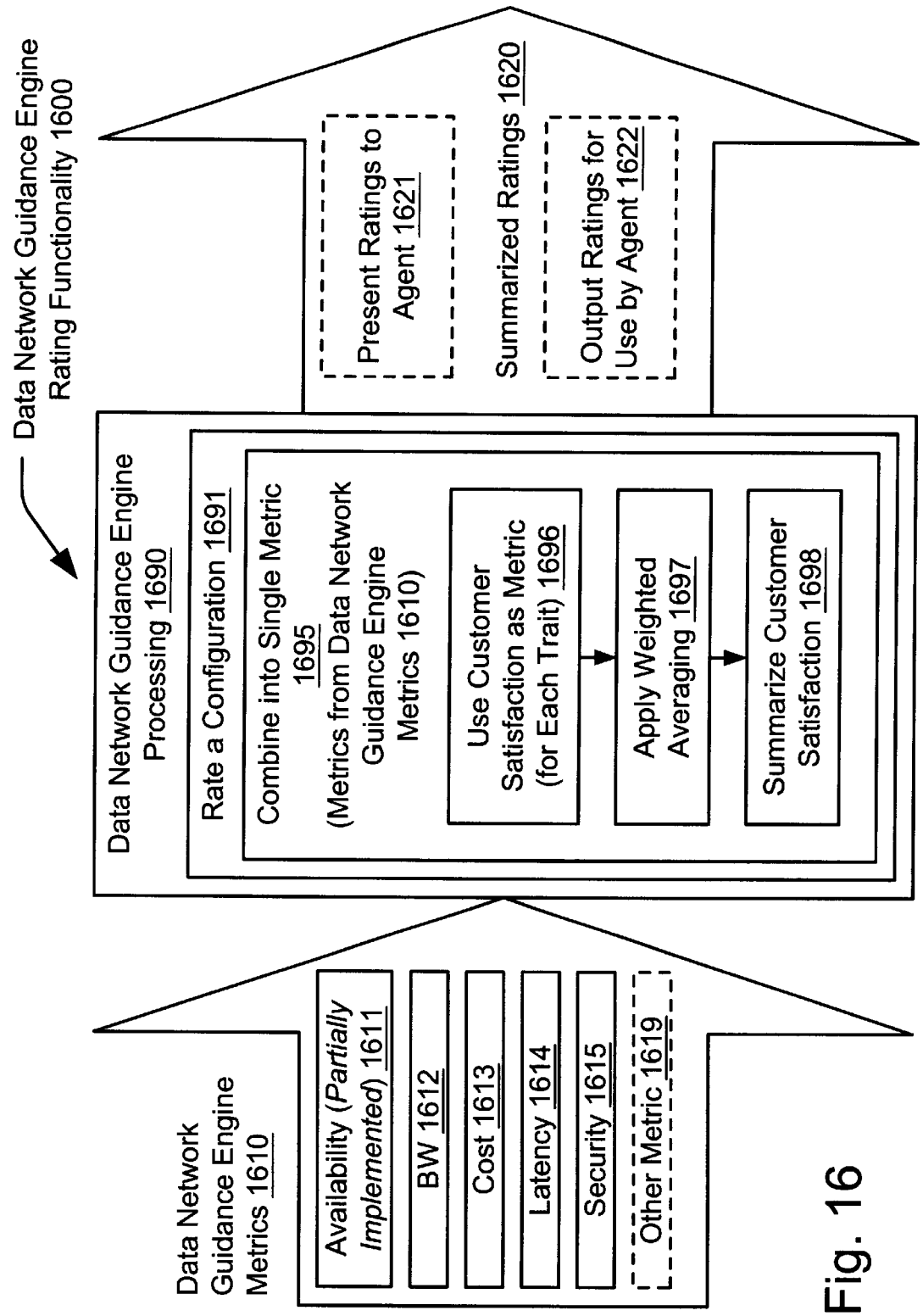
FIG. 16 is a block diagram illustrating an embodiment of data network guidance engine rating functionality that is performed in accordance with certain aspects of the present invention.

FIG. 16 is a block diagram illustrating an embodiment of data network guidance engine rating functionality 1600 that is performed in accordance with certain aspects of the present invention. The approach employed by the data network guidance engine generates multiple configurations during it search for a recommended configuration. Therefore, it is important, indeed crucial, to rate the applicability of these various configurations as closely as possible to the customer needs.

In one embodiment, the data network guidance engine employs data network guidance engine metrics 1610 to perform data network guidance engine processing 1690. As shown by the data network guidance engine metrics 1610, several metrics may be used. In some embodiments, 5 metrics are used. In addition, any other metric 1619 may also be used. Exemplary metrics are availability 1611, that may be only partially implemented in a given application, bandwidth 1612, cost 1613, latency 1614, and security 1615. Again, any other metric 1619 may be used as well for the data network guidance engine metrics 1610 without departing from the scope and spirit of the invention.

The data network guidance engine processing 1690 includes the rating of a configuration 1691. In performing the rating of the configuration 1691, the various metrics used are combined into a single metric 1695. That is to say, the data network guidance engine metrics 1610 are combined into a single metric as shown in the block 1695. In this embodiment, the configuration is rated using the five different criteria (availability 1611, bandwidth 1612, cost 1613, latency 1614, and security 1615), and there is a need to summarize these various metrics to obtain a single rating. It is also important to use a metric or metrics that is or are easy to combine.

One metric that is used in accordance with certain aspects of the invention is a level of customer satisfaction, shown as a metric in a block 1696. The level of customer satisfaction may be used as a metric for each of the traits employed within the expert system. As described in various other aspects of the invention, similar operations may be performed using a direct Internet access guidance engine. Then, weighted averaging is employed as one method in which to combine the various customer level of satisfaction metrics, as shown in a block 1697.

There are also many alternative means, including a generalized mean function, that may be employed to perform this combination without departing from the scope and spirit of the invention. The various means may be employed in a dedicated Internet access guidance engine and/or also within a data network guidance engine, among other guidance engines envisioned within the scope and spirit of the invention.

Given the input on a user needs, and any given product p, and also assuming there are levels of customer satisfaction h1, h2, . . . , hn for each of the n traits. Then, a generalized mean function may be used as follows:

$$(w1*h1**\text{alpha}+w2*h2**\text{alpha}+\ldots+wn*hn**\text{alpha})/(w1+w2+\ldots+wn)$$

This may be used to calculate the summary rating for that product with respect to the user needs. The notation is as follows:

wi is the weight assigned to trait i

\* means multiplication

\*\* means exponentiation alpha is a real number other than zero. Alpha is chosen with the following mathematical results in mind:

As alpha tends to infinity, the result of the generalized mean tends to max(h1, h2, . . . , hn)

If alpha=1, the generalized mean yields a normal weighted average.

In the limit where alpha tends to zero, the generalized mean tends to the geometric mean If alpha=−1, the generalized mean yields a harmonic mean As alpha tends to minus infinity, the result of the generalized mean tends to min(h1, h2, . . . , hn).

In one embodiment employed for a data network guidance engine, alpha=−2. Other values for alpha may be used in this and in other guidance engines as well.

Again, the resulting customer satisfaction levels for each trait may be summarized with weighted averages as in embodiments of the invention described in a direct Internet access guidance engine as well. Ultimately within the single metric combination of the block 1695, the customer satisfaction is then summarized as shown in a block 1698.

The data network guidance engine rating functionality 1600 then provides summarized ratings 1620 for use in various components of the data network guidance engine. These summarized ratings 1620 may include ratings that are presented to an agent 1621, and also ratings that are output for use by an agent as shown in a block 1622. For example, the summarized ratings 1620 may be provided into an editable document, such as an MS WORD document for use by the agent in report preparation.

As a reminder, a fuzzy value includes a membership function f that maps the corresponding metric, such as the availability 1611, the bandwidth 1612, or the cost 1613, to a real number between zero and one. The result of this mapping is then taken to be the level of satisfaction with respect to the metric. Where 0 is completely dissatisfied and 1 is completely satisfied.

Again, it may be assumed that fuzzy values are used to determine the level of customer satisfaction with respect to these traits. For example, if the fuzzy value for cost maps $40.00/month to 0.90, it means that the level of customer satisfaction with respect to cost would be 90% for a solution that costs $40.00/month.

The fuzzy value for cost may be difficult to provide since it may not be clear what are acceptable costs for a given set of network requirements. In certain embodiments of the invention, the following method is employed to calculate the fuzzy value for cost:

1: Calculate the initial configurations and their costs.

2: From those costs, obtain the minimum and maximum costs (min_cost and max_cost).

3: Use [1.0/min_cost*0.5, 0.9/min_cost, 0.0/max_cost*1.5] as the fuzzy value for cost satisfaction.

This means that at this point, it may be determined that a customer would be very happy (1.0) if a solution is found that costs one half of the minimum cost of all the initial configurations we obtained. The customer would be 90% happy if the best solution that may be achieved is the best initial configuration. The customer would be very unhappy (0.0) if he is given a solution that costs 50% more than the worst solution we found in our set of initial configurations.

Again, as shown in the various embodiments of the invention, a GUI may be employed to allow the user, or an agent, to set the range of acceptable costs. In other embodiments, the customer himself may access a GUI to input such information for subsequent use by the expert system employing the data network guidance engine.

It is also noted that cost may be treated as a global measure. For other parameters, such as bandwidth and availability, the connectivity between any two pair of sites may not be equally important. So, the model allows for the assignment of fuzzy values to each pair of sites to represent level of customer satisfaction given the bandwidth/availability available to each pair of sites.

Cost is measured by simply adding the $\text{Cost}_{x,y}(b)$ for each link in the configuration being rated between each pair of sites x and y. Then, the $\text{Cost}_x(b)$ for each site is added in the configuration. As with the other ratings, the corresponding membership function is then applied to the cost.

Bandwidth is measured as follows:

For a given configuration and for each pair of sites x and y let $rb_{x,y} \neq 0$ be the required bandwidth and let $b_{x,y}$ be the allocated bandwidth then $$eb_{x,y}=(b_{x,y}-rb_{x,y})/rb_{x,y}$$

$eb_{x,y}$ gives a measure of excess bandwidth. −1 means no allocated bandwidth. 0 means the allocated bandwidth matches the requested bandwidth. 1 means the allocated bandwidth is twice the requested bandwidth. The allocated bandwidth is not necessarily the same as the bandwidth of the direct link between x and y, as other indirect routes can usually be taken to send data between x and y. Then, the proper membership function is applied. This membership function (as all others) does not need to be linear, but other non-linear membership functions may also be employed.

In one embodiment, the following function is used: [0/−1 0.9/0 1/1]. Stated another way, this is equivalent to the following:

0 if $x<=-1$ $0.9x+0.9$ if $x>-1$ and $x<=0$ $0.1x+0.9$ if $x>0$ and $x<=1$ 1 if $x>1$ This gives a measure of customer satisfaction with the allocated bandwidth for sites x and y. 0 if no bandwidth was allocated; 0.9 if the allocated bandwidth matches the requested bandwidth; and 1 if the allocated bandwidth is twice the requested bandwidth. To obtain a global measure of bandwidth satisfaction for the entire network, a weighted average summary may be used. The default weight for $b_{x,y}$ is sqrt($rb_{x,y}$). That is, a link that has more required bandwidth has more weight. The weight is proportional to the square root of the required bandwidth.

Availability is measured as follows: for a given configuration, the data network guidance engine iterates over all the links and calculates the bandwidth rating function when the link does not exist. Using this reduced bandwidth, the data network guidance engine multiplies the value of the corresponding bandwidth rating function by the estimated proportion of the time the link will not be available: the results may then be summarized as a weighted average.

Latency is calculated as follows: each application defined for the network belongs to one of 4 different categories that relate to the real-time nature of the application: real time, interactive, client-server and non time-critical. Again, when more that the 4 different categories are used, then each application defined for the network belongs to one of that total number of different categories. For each of these categories of applications, a happiness function is used that maps the observed latency to a level of customer satisfaction. Given a configuration, the average latency between each pair of sites is calculated and uses to calculate the corresponding level of customer satisfaction for each of the applications in the network. Then, the average of the happiness for each application is taken and that number is averaged with the application for which the worst happiness number is obtained. This is the latency rating for the solution. Here as well as described above, a generalized mean function may be employed here; if desired, the generalized mean function described in detail above is one generalized mean function that may be employed.

Figure 17:
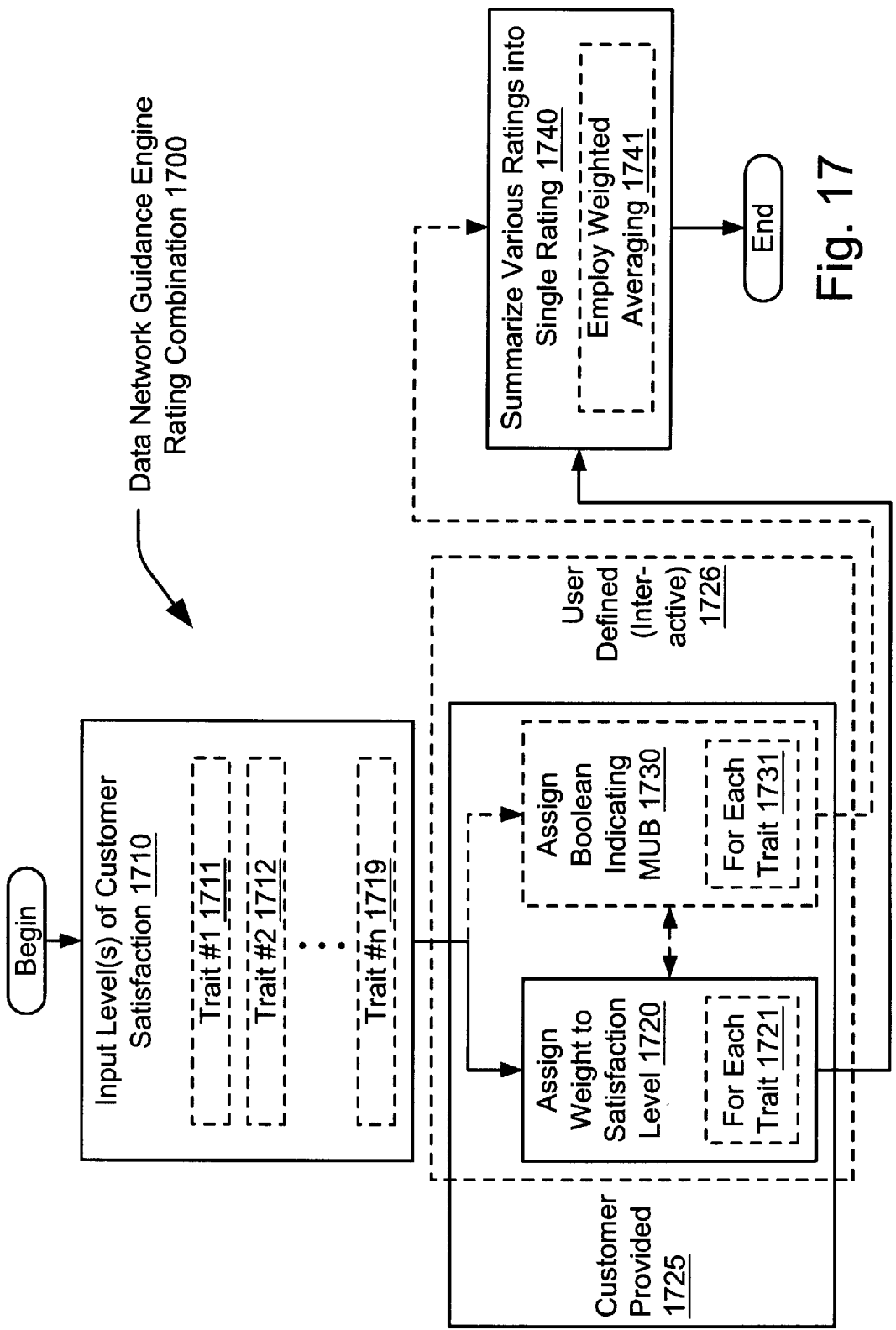
FIG. 17 is a block diagram illustrating an embodiment of data network guidance engine rating combination that is performed in accordance with certain aspects of the present invention.

FIG. 17 is a block diagram illustrating an embodiment of data network guidance engine rating combination 1700 that is performed in accordance with certain aspects of the present invention. In a block 1710, the level(s) of customer satisfaction are input. These levels of customer satisfaction may be provided in the block 1710 for any number of traits, shown as a trait #1 1711, a trait #2 1712, . . . , and a trait #n 1719. For the level(s) of customer satisfaction shown in the block 1710, a weight is assigned to the level(s) as shown in a block 1720. If desired, a Boolean is assigned to the level(s) indicating whether they are to be taken as a minimum upper bound, as shown in a block 1730. For both of the operations performed in the blocks 1720 and 1730, they may be performed on a per trait basis as shown in blocks 1721 and 1731, respectively.

The assignment of weights in the block 1720 and the alternative assigning of a Boolean in the block 1730 may be provided by a customer, or by a user, or agent, as shown in blocks 1725 and 1726. The input may be interactive for each, perhaps via a GUI in various embodiments of the invention. If desired, the user could be given the means to define these weights interactively for example by means of sliders in the page where the problem is submitted to the data network guidance engine.

Then, the various ratings are summarized into a single rating in a block 1740. If desired, weighted averaging is employed to generate the single rating as shown in a block 1741. If desired, the level of satisfaction for each trait is used and summarizes using a similar approach within the data network guidance engine case as in an Internet Access case.

Figure 18:
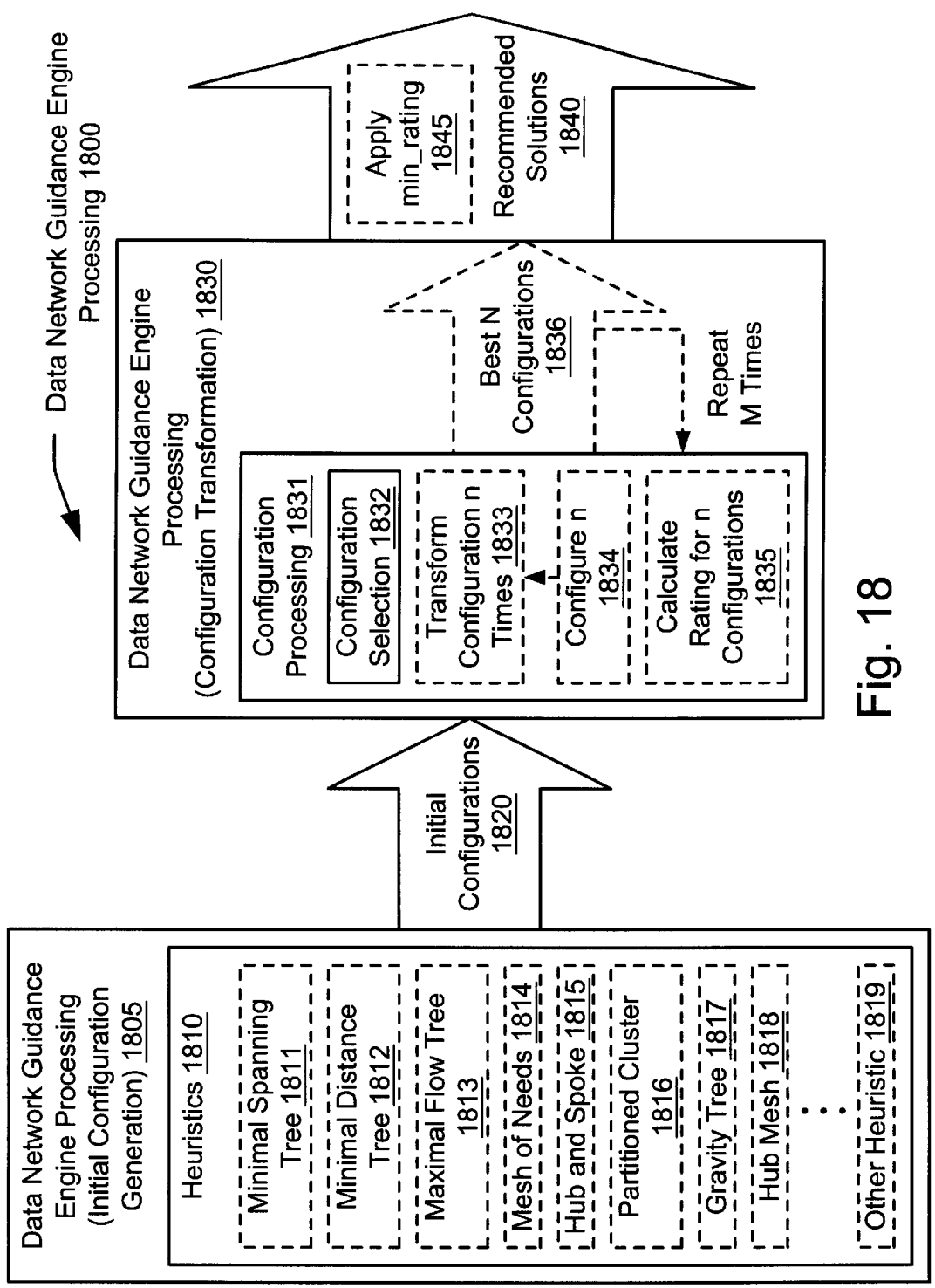
FIG. 18 is a block diagram illustrating an embodiment of data network guidance engine processing that is performed in accordance with certain aspects of the present invention.

FIG. 18 is a block diagram illustrating an embodiment of data network guidance engine processing 1800 that is performed in accordance with certain aspects of the present invention. The data network guidance engine processing 1800 is operable to generate a number of initial configurations 1820 using any number of different heuristics 1810, as shown by the initial configuration generation block 1805. Exemplary heuristics 1810 include a minimal spanning tree 1811, a minimal distance tree 1812, a maximal flow tree 1813, a mesh of needs 1814, a hub and spoke 1815, a partitioned cluster 1816, a gravity tree 1817, a hub mesh 1818, and any other heuristic 1819 that may be used to generate the initial configurations 1810. Greater detail concerning the operation of some of the exemplary heuristics 1810 are further described in the various embodiments of the invention shown below.

The data network guidance engine processing 1800 also includes transformation of the initial configurations 1810, as shown by the configuration transformation block 1830. Configuration transformation 1831 may include a number of different processing operations. At a minimum, the configuration transformation 1831 includes selection of a configuration as shown in a block 1832. However, as is often the case, an initial configuration is transformed a number of times to generate one or more mutated configurations, as shown in a block 1833. The number of transformations 'n' may be configured, as shown in a block 1834; alternatively, a default number may be used. The configuration processing 1831 selects a best 'N' number of configuration 1836 from the total number of initial configurations 1820. If desired, this selection process, that generates the best 'N' configuration 1836, are then fed back to the configuration processing 1831 and subsequent iterations are then performed as well. This total number of M iterations may also be configured as well; alternatively, a default number may be used.

Ultimately, after the configuration transformation 1830 has completed, one or more recommended solutions are provided as shown in a block 1840. If desired, a min_rating 1845 is further used to limit the total number of the recommended solutions 1840.

The data network guidance engine processing 1800 of the FIG. 18 may be described in another way. First, one of the best configurations is picked at random. That configuration is transformed n times (n is configurable). The rating of each of the resulting n configurations is then calculated. The best N configurations always kept as the current population (N is configurable). This process may also be repeated M times; M is configurable and may be set as a function of the number of sites in the network. At the end of the M repetitions, the configurations that are still part of the current population are the recommended solutions. In order to not show the user configurations that are not good enough, the data network guidance engine processing 1800 will not present configurations whose overall rating is less than min_rating; min_rating is configurable.

Figure 19:
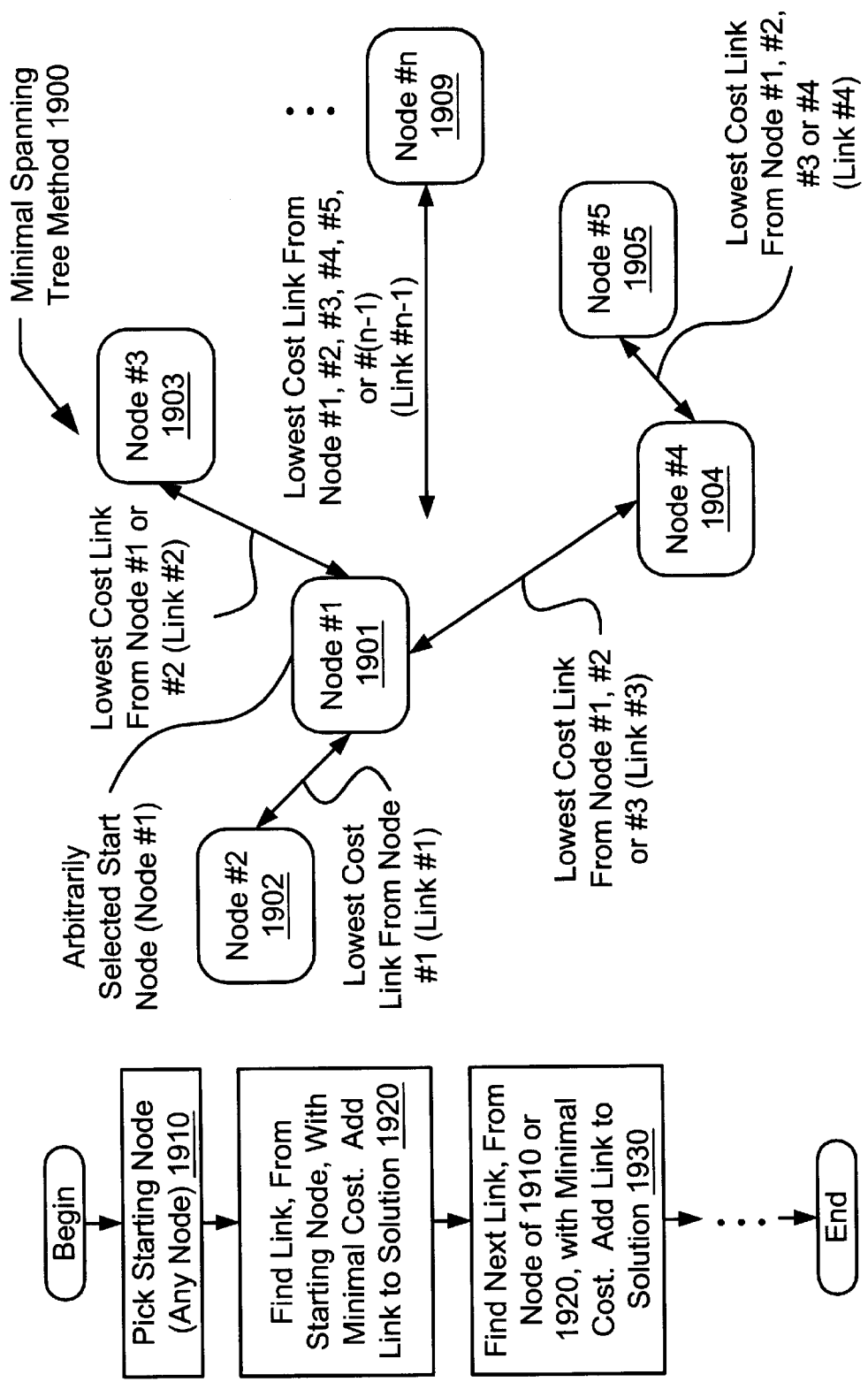
FIG. 19 is a block diagram illustrating an embodiment of a minimal spanning tree method that is used by a data network guidance engine in accordance with certain aspects of the present invention.

FIG. 19 is a block diagram illustrating an embodiment of a minimal spanning tree method 1900 that is used by a data network guidance engine in accordance with certain aspects of the present invention. In a block 1910, a starting node is picked. Any node within a network may arbitrarily be selected as the starting node. Then, in a block 1920, a link is found to a second node that is of the cheapest cost. This link is then added to the solution. Then, in a block 1930, a next link, from one of either of the first or the second node, is found to extend to a third node. This next link is selected as being the most cost inexpensive link that extends from one of either of the first or the second node to the third node.

The process may continue indefinitely until all of the nodes within the network are connected. It is also noted that each and every node is not necessarily connected to all of the other nodes in the network, but may only be connected to one of the other nodes in the system.

Stated another way, the operation of the minimal spanning tree method 1900 may be described as follows:

At step 1 a random node is chosen, call it node 1. Then the least expensive link connected to node 1 is selected, say it connects node 1 to node 2. In the next step, all links connected to node 1 or node 2 that lead to any node other than 1 or 2 are considered and the cheapest one is selected. Say this link leads to node 3. In the next step, all links connected to either node 1, 2 or 3 that lead to any node other than 1, 2 or 3 are considered and the cheapest one is selected, . . . , the minimal spanning tree method 1900 continues until all nodes are connected. For a network with N nodes, the minimal spanning tree method 1900 stops as soon as N−1 links have been selected.

Graphically shown within the FIG. 19, a node #1 1901 is chosen arbitrarily as the start node to form a configuration using the minimal spanning tree method 1900. The lowest cost link (link #1) extending from the node #1 1901 is found to be towards a node #2 1902. Then, the lowest cost link (link #2) extending from either of the node #1 1901 or the node #2 1902 is found to be from the node #1 1901 to a node #3 1903. Then, the lowest cost link (link #3) extending from either of the node #1 1901, the node #2 1902 or the node #3 1903 is found to be from the node #1 1901 to a node #4 1904. Then, the lowest cost link (link #4) extending from either of the node #1 1901, the node #2 1902, the node #3 1903, or the node #4 1904 is found to be from the node #4 1904 to a node #5 1905. This process continues indefinitely until the lowest cost link (link #n−1) extending from either of the node #1 1901, the node #2 1902, the node #3 1903, the node #4 1904, or the node #5 1905 is found to be from any one of the nodes within the network to a node #n 1909.

This way, all of the nodes within the network are interconnected. The driving consideration using the minimal spanning tree method 1900 is the cost of the link extending from the nodes within the configuration that are already connected to any of the nodes that are not yet part of the configuration.

The minimal spanning tree method 1900 described here may be used as a basis for several generational heuristics, but the minimal spanning tree method 1900 is not itself a generational heuristic.

Figure 20:
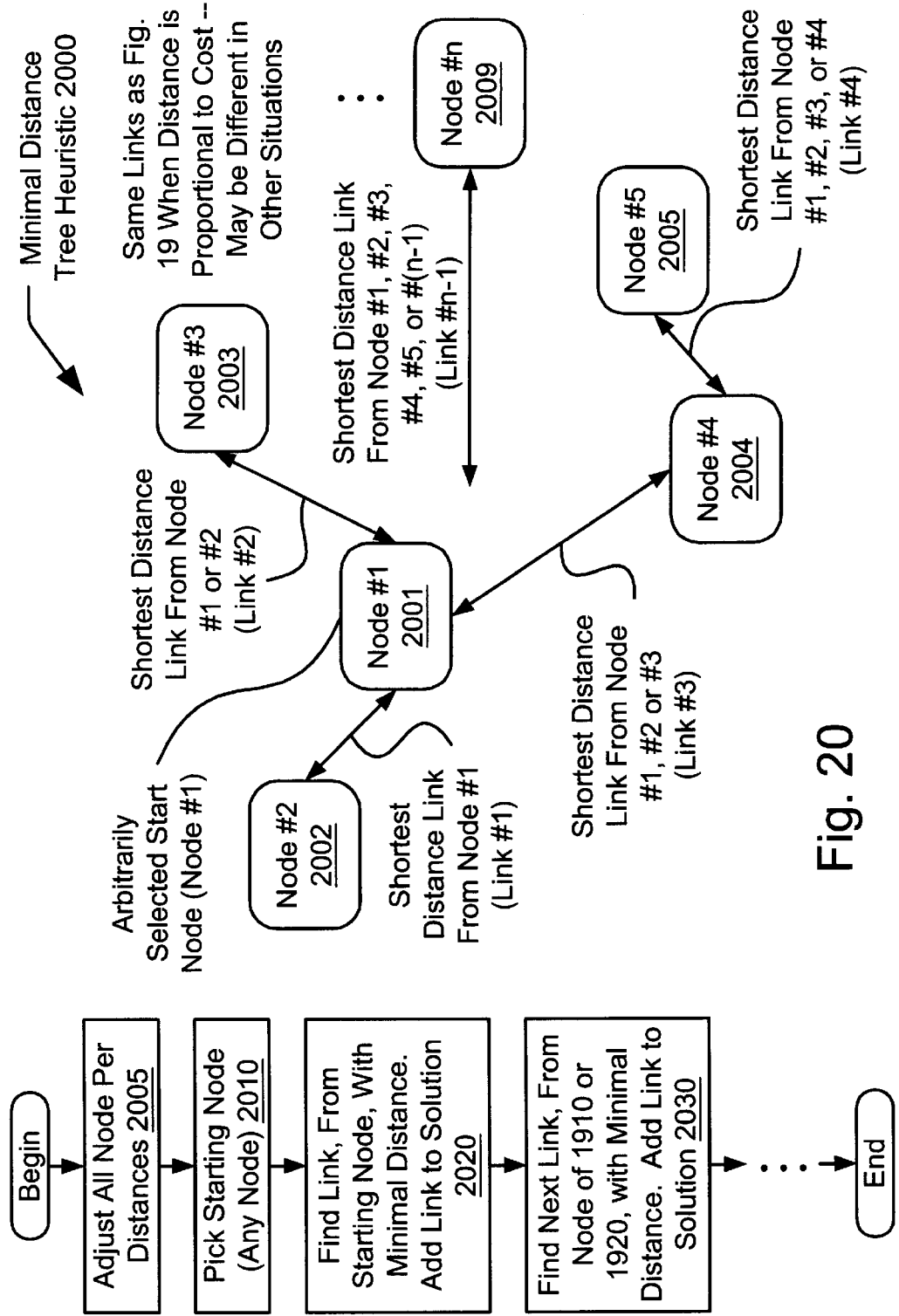
FIG. 20 is a block diagram illustrating an embodiment of a minimal distance tree heuristic that is used by a data network guidance engine in accordance with certain aspects of the present invention.

FIG. 20 is a block diagram illustrating an embodiment of a minimal distance tree heuristic 2000 that is used by a data network guidance engine in accordance with certain aspects of the present invention. In a block 2010, a starting node is picked. Any node within a network may arbitrarily be selected as the starting node. Then, in a block 2020, a link is found to a second node that is of the shortest distance. This link is then added to the solution. Then, in a block 2030, a next link is found to a third node. This next link is selected as being the shortest distance link extending to the third node from either of the first or the second node. The process continues indefinitely until all of the nodes within the network are connected. It is also noted that each and every node is not necessarily connected to all of the other nodes in the network, but may only be connected to one of the other nodes in the system.

Stated another way, the operation of the minimal distance tree heuristic 2000 may be described as follows:

At step 1 a random node is chosen, call it node 1. Then the least expensive link connected to node 1 is selected, say it connects node 1 to node 2. In the next step, all links connected to node 1 or node 2 that lead to any node other than 1 or 2 are considered and the cheapest one is selected. Say this link leads to node 3. In the next step, all links connected to either node 1, 2 or 3 that lead to any node other than 1, 2 or 3 are considered and the cheapest one is selected, . . . , the minimal distance tree heuristic 2000 continues until all nodes are connected. For a network with N nodes, the minimal distance tree heuristic 2000 stops as soon as N−1 links have been selected.

Graphically shown within the FIG. 20, a node #1 2001 is chosen arbitrarily as the start node to form a configuration using the minimal distance tree heuristic 2000. The shortest distance link (link #1) extending from the node #1 2001 is found to be towards a node #2 2002. Then, the shortest distance link (link #2) extending from either of the node #1 2001 or the node #2 2002 is found to be from the node #1 2001 to a node #3 2003. Then, the shortest distance link (link #3) extending from either of the node #1 2001, the node #2 2002 or the node #3 2003 is found to be from the node #1 2001 to a node #4 2004. Then, the shortest distance link (link #4) extending from either of the node #1 2001, the node #2 2002, the node #3 2003, or the node #4 2004 is found to be from the node #4 2004 to a node #5 2005. This process continues indefinitely until the shortest distance link (link #n−1) extending from either of the node #1 2001, the node #2 2002, the node #3 2003, the node #4 2004, or the node #5 2005 is found to be from any one of the nodes within the network to a node #n 2009.

This way, all of the nodes within the network are interconnected. The driving consideration using the minimal distance tree heuristic 2000 is the distance of the link extending from the nodes within the configuration that are already connected to any of the nodes that are not yet part of the configuration. In embodiments where the distance of a link is directly proportional to the cost of a link, then the resulting configurations for both of the embodiments shown in the FIGS. 19 and 20 are identical. However, those having skill in the art will recognize that the results may be different when the cost of a link is not proportional to the distance of the link, as may often be the case. It is again noted that the minimal spanning tree method 1900 of this FIG. 19 is a method, and not a heuristic per se.

Figure 21:
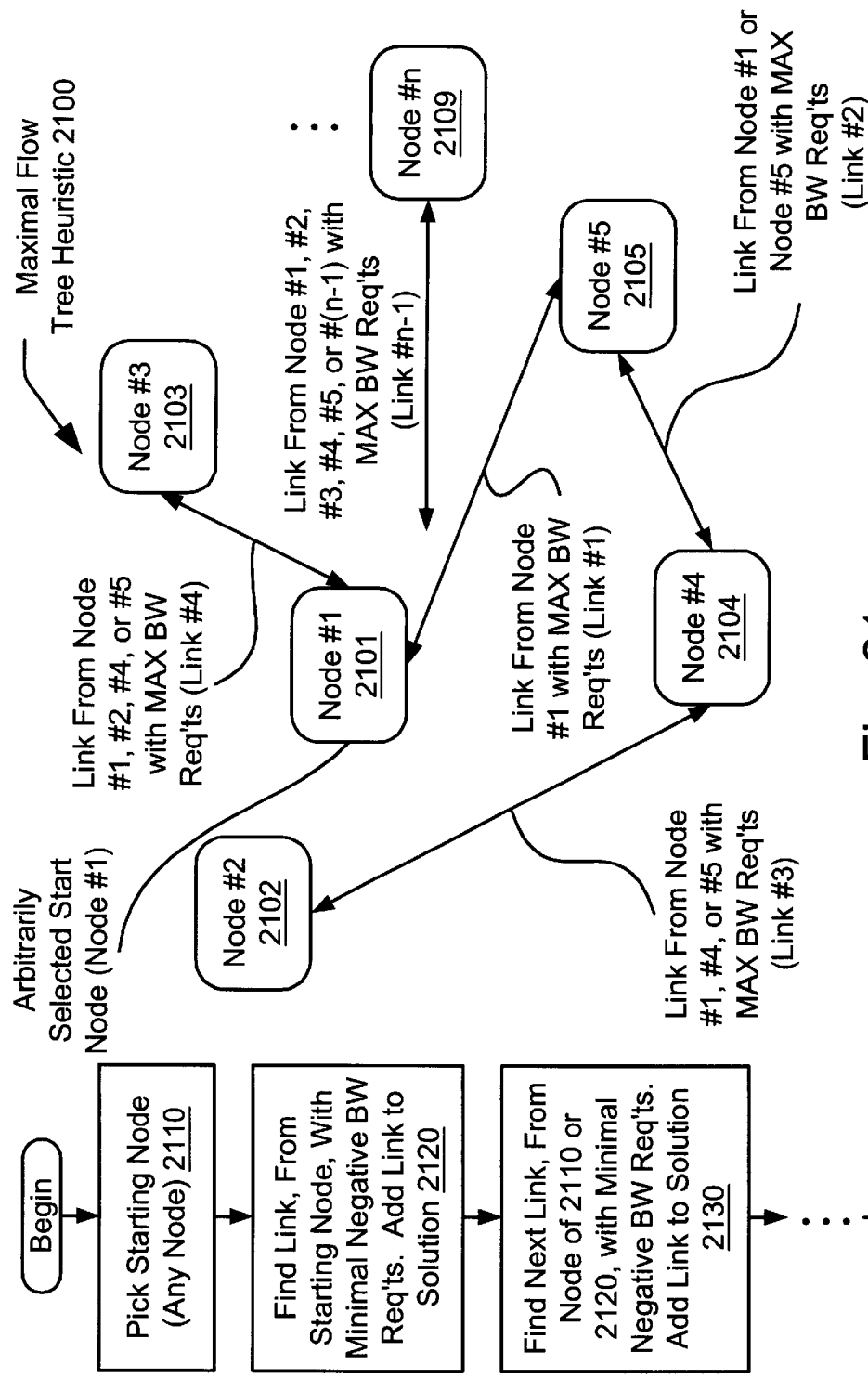
FIG. 21 is a block diagram illustrating an embodiment of a maximal flow tree heuristic that is used by a data network guidance engine in accordance with certain aspects of the present invention.

FIG. 21 is a block diagram illustrating an embodiment of a maximal flow tree heuristic 2100 that is used by a data network guidance engine in accordance with certain aspects of the present invention. The maximal flow tree heuristic uses an adapted version of the minimal spanning tree method 1900 where the negative bandwidth requirements between sites are the values to be minimized. That is, the bandwidth requirements are maximized. This is a good heuristic to create a topology that connects directly sites that have a lot of traffic between them. Once there is a minimal spanning tree for the negative bandwidth needs, the bandwidths assigned to each link may be adjusted to comply with the bandwidth requirements.

In a block 2110, a starting node is picked. Any node within a network may arbitrarily be selected as the starting node. Then, in a block 2120, a link is found to a second node such that the link has minimal negative bandwidth requirements between the nodes. This link is then added to the solution. Then, in a block 2130, a next link is found to a third node. This next link is selected such that the link has minimal negative bandwidth requirements between the third node from either of the first or the second node. The process continues indefinitely until all of the nodes within the network are connected.

Graphically shown within the FIG. 21, a node #1 2101 is chosen arbitrarily as the start node to form a configuration using the maximal flow tree heuristic 2100. The link (link #1) having minimal negative bandwidth requirements (maximum bandwidth requirements) between the nodes extending from the node #1 2101 is found to be towards a node #5 2105. Then, the link (link #2) having minimal negative bandwidth requirements (maximum bandwidth requirements) extending from either of the node #1 2101 or the node #5 2105 is found to be from the node #5 2105 to a node #4 2104. Then, the link (link #3) having minimal negative bandwidth requirements (maximum bandwidth requirements) extending from either of the node #1 2101, the node #4 2104 or the node #5 2105 is found to be from the node #4 2104 to a node #2 2102.

Then, the link (link #4) having minimal negative bandwidth requirements (maximum bandwidth requirements) extending from either of the node #1 2101, the node #2 2102, the node #4 2104, or the node #5 2105 is found to be from the node #1 2101 to a node #3 2103. This process continues indefinitely until the link (link #n−1) having minimal negative bandwidth requirements (maximum bandwidth requirements) extending from either of the node #1 2101, the node #2 2102, the node #3 2103, the node #4 2104, or the node #5 2105 is found to be from any one of the nodes within the network to a node #n 2109.

This way, all of the nodes within the network are interconnected. The driving consideration using the maximal flow tree heuristic 2100 is the bandwidth requirements of the link extending from the nodes within the configuration that are already connected to any of the nodes that are not yet part of the configuration.

Figure 22:
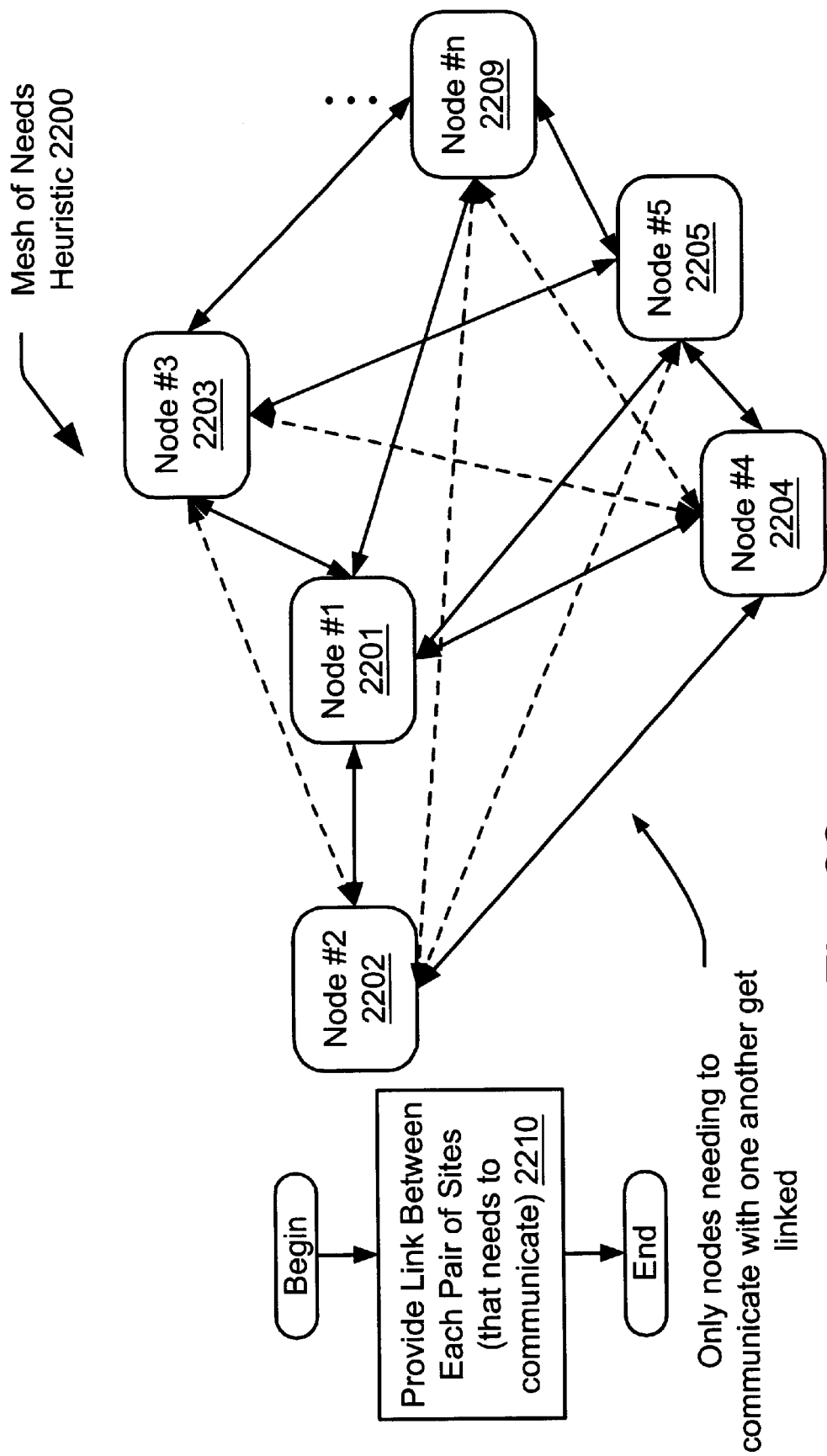
FIG. 22 is a block diagram illustrating an embodiment of a mesh of needs heuristic that is used by a data network guidance engine in accordance with certain aspects of the present invention.

FIG. 22 is a block diagram illustrating an embodiment of a mesh of needs heuristic 2200 that is used by a data network guidance engine in accordance with certain aspects of the present invention. The operation of the mesh of needs heuristic 2200 is rather simplistic. As shown in a block 2210, a link is provided to each of the other nodes within the system that need to communicate with one another. A link is provided between each pair of sites that needs to communicate. Stated another way, the mesh of needs heuristic 2200 creates a topology where each pair of sites, that needs to communicate with one another, has direct communications have a direct link between them.

Graphically shown within the FIG. 22, a node #1 2201 is interconnected to each of the other nodes in the system, namely, to a node #2 2202, to a node #3 2203, to a node #4 2204, to a node #5 2205, . . . , and to a node #n 2209. Each of the node #2 2202, the node #3 2203, the node #4 2204, the node #5 2205, . . . , and the node #n 2209. Again, the embodiment in the FIG. 22 is illustrative of a situation where each of the pair of sites may be configured performs direct communication between them. In embodiments where no direct communication is made between some sites, those particular sites are simply not provided with interconnection between them. These situations are illustrated in this example as dotted lines. That is to say, some of the nodes may not be connected to one another at all. In addition, the size of the particular links between those nodes that do need to communicate with one another is appropriately chosen to accommodate the needs of that particular link. Therefore, many of the links may very well have different capacities.

Figure 23:
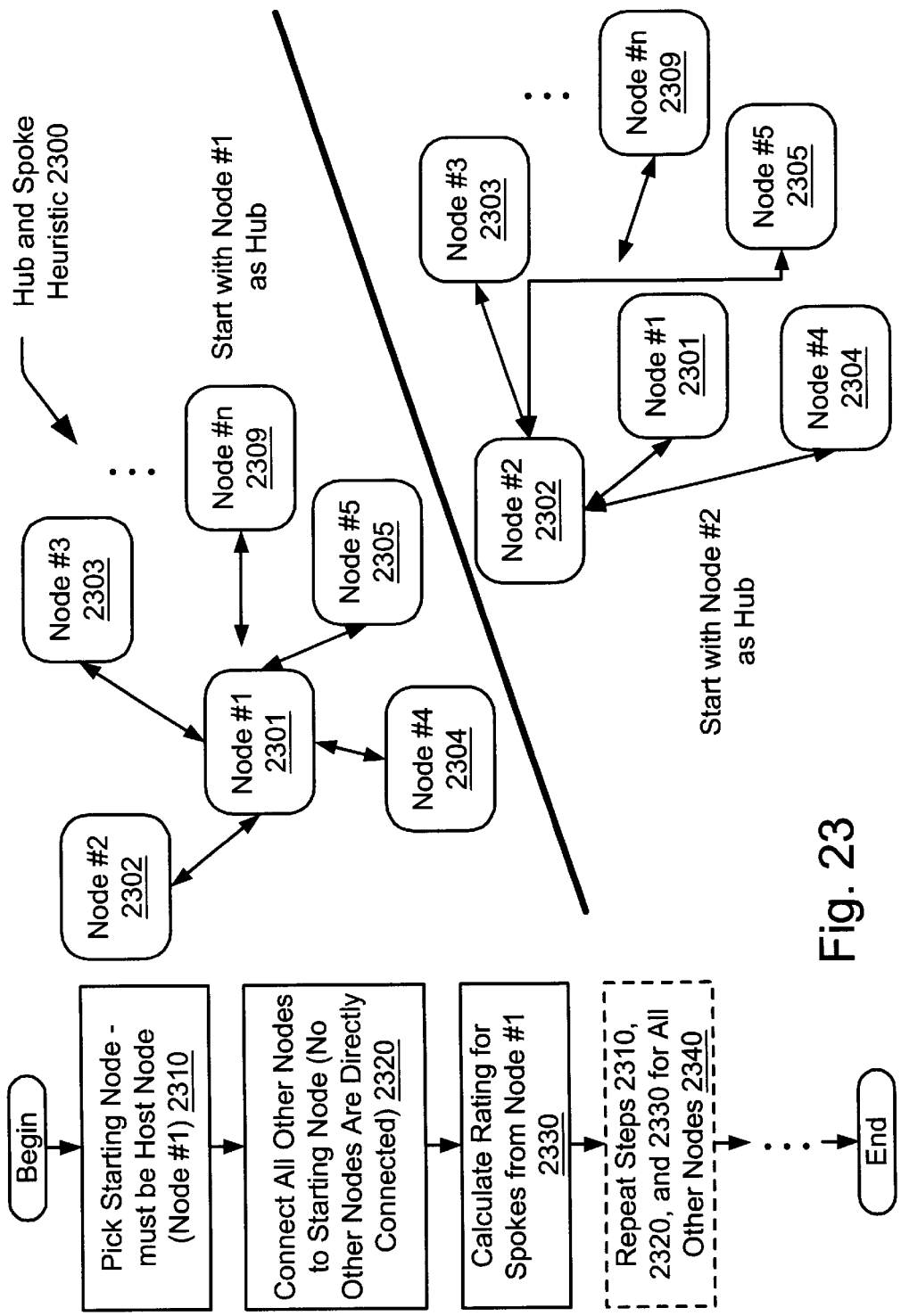
FIG. 23 is a block diagram illustrating an embodiment of a hub and spoke heuristic that is used by a data network guidance engine in accordance with certain aspects of the present invention.

FIG. 23 is a block diagram illustrating an embodiment of a hub and spoke heuristic 2300 that is used by a data network guidance engine in accordance with certain aspects of the present invention. In a block 2310, a starting node is picked. Any node within a network may arbitrarily be selected as the starting node, so long as that node is a host node. A host node may be defined as a node, or site, that hosts at least one application that needs to be accessed by other sites in the network. As will also be seen, during subsequent iterations of the hub and spoke heuristic 2300, other nodes may also be picked as the starting node. As an example, a node #1 2301 (that is a host node) is arbitrarily chosen as the starting node in the flow chart illustration. The starting node will serve as the hub for this iteration of the hub and spoke heuristic 2300; then, during subsequent iterations, other nodes will be used as the hub for those configurations generated by the hub and spoke heuristic 2300. Then, in a block 2320, all the other nodes are connected to the hub. None of the other nodes are directly connected as shown in the block 2320. Then, in a block 2330, a rating is calculated for the spokes from the node #1 2301. That is to say, a rating is calculated for the configuration generated when the node #1 2101 is chosen as the hub of this particular hub and spoke configuration generated by the hub and spoke heuristic 2300. If desired, the hub and spoke heuristic 2300 may terminate at this point where only one hub and spoke configuration is generated.

However, in certain embodiments of the invention as shown in an optional block 2340, the steps shown in the blocks 2310, 2320, and 2320 are repeated where one or more of the other nodes within the system are used as the starting node, or hub, for those particular hub and spoke configurations.

Stated another way from a different perspective, the hub and spoke (or star) topology employed using the hub and spoke heuristic 2300 has a site at the center connected to each of the other sites. None of the other sites are directly connected to each other. The bandwidth for each link is chosen so that the bandwidth requirements are met. This configuration can be generated with the following algorithm:

1. Create a solution with a start topology as follows: Let $S=\{s_i\}$ be the set of all sites where i is in $\{0, 1, \ldots n\}$. Let $s_0$ be the hub. Then the configuration is $C=\{b_{0,j} | j \in \{1, 2, \ldots n\}\}$. $b_{0,j}$ is the bandwidth of the direct link from $s_0$ to $s_j$. $b_{0,j}=\text{CeilingBandwidth}_{s,0\ sj}(\Sigma(rb_{si,sj}))$. The sum is for $i \in \{0, 1, \ldots n\}$.
2. After calculating the configuration, make the hub be the next site. Calculate its rating. Do this so every site that hosts at least one application has a chance to be the hub.

This heuristic generates as many starting solutions as there are data centers. A data center is a site that hosts at least one application that is accessed remotely.

Figure 24:
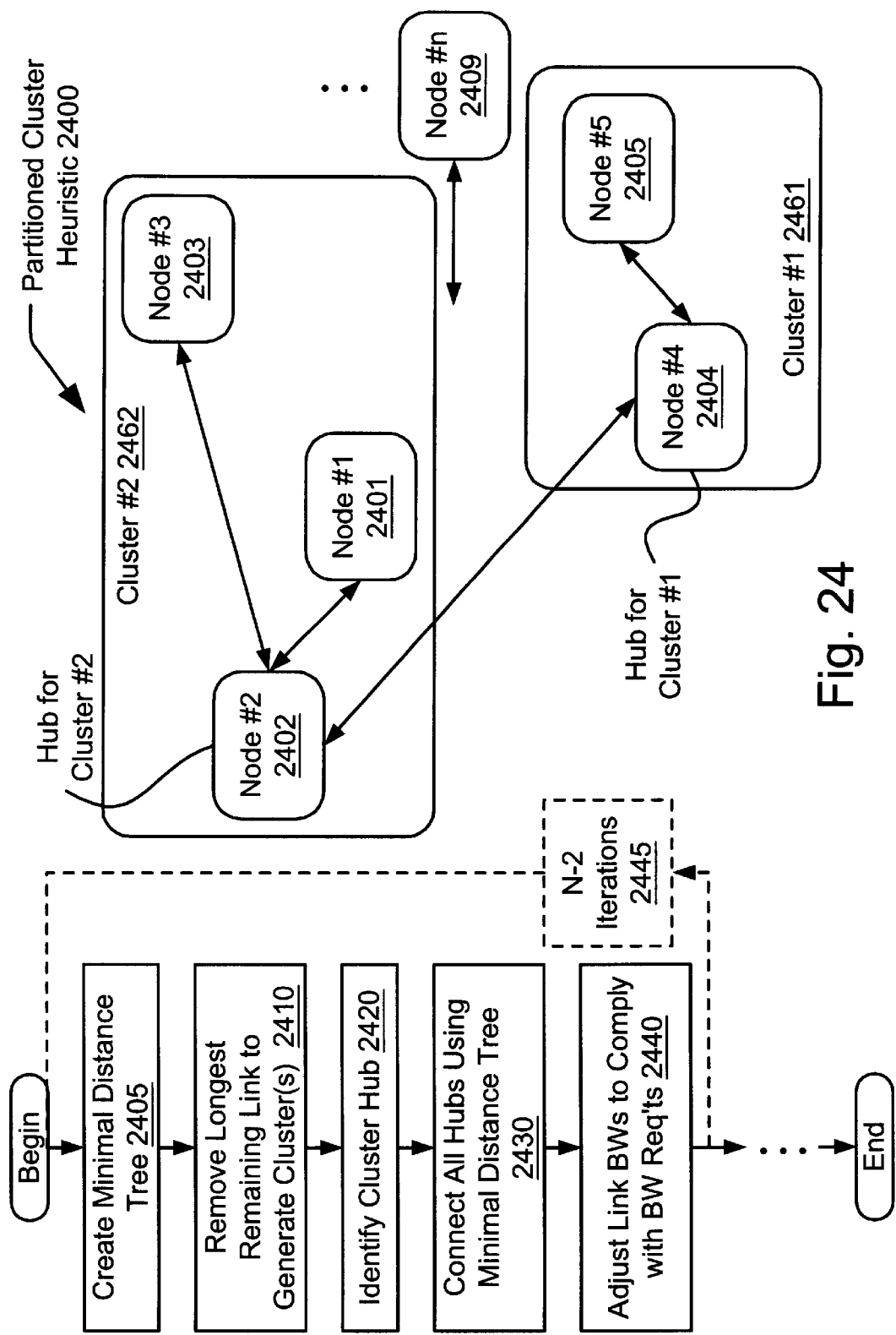
FIG. 24 is a block diagram illustrating an embodiment of a partitioned cluster heuristic that is used by a data network guidance engine in accordance with certain aspects of the present invention.

FIG. 24 is a block diagram illustrating an embodiment of a partitioned cluster heuristic 2400 that is used by a data network guidance engine in accordance with certain aspects of the present invention. In a block 2405, a minimal distance tree is created for the entire system. Then, in a block 2410, a longest remaining link within the system is removed to generate one or more clusters. Then, within a cluster, a hub for that cluster is identified in a block 2420; all of the other nodes within that cluster then are also connected directly to the hub for that cluster. If desired, the other nodes within the cluster may also be interconnected using some other heuristic as well without departing from the scope and spirit of the invention. Then, all of the hubs (of how many clusters remain in the given embodiment) are connected using a minimal distance tree as shown in a block 2430.

The minimal distance tree within the block 2430 is the minimal distance tree heuristic 2000 in certain embodiments of the invention. Alternatively, the minimal distance tree operation of the block 2430 may be the minimal spanning tree method 1900 in other embodiments. Other heuristics may be used in place of the minimal distance tree operation of the block 2430 without departing from the scope and spirit of the invention.

Then, in a block 2440, the links within the system are adjusted to comply with the bandwidth requirements and needs between the nodes. If desired, as shown in an optional block 2445, the operations within the partitioned cluster heuristic 2400 may be repeated a number of times as governed by the number of nodes, or sites, within the network. As an example, for a network with N sites, the minimal distance tree generated in step 2405 can have at most N−1 links, since a link may be removed on every iteration, the heuristic can at most be repeated N−1 times, but on the last iteration the same minimal distance tree is generated that was started with. Therefore, it makes sense to iterate for at most N−2 times.

Graphically shown within the FIG. 24, a node #2 2402 is identified as the hub for a cluster #2 2462. A node #4 2404 is identified as a hub for a cluster #1 2461. Those two hubs, within the two clusters 2461 and 2461, are then connected. The other nodes within the two clusters 2461 and 2461 are also connected to the hubs within those clusters. For example, a node #1 2401 and a node #3 2403 are both connected to the node #2 2602. Analogously, a node #5 2405 is connected to the node #4 2604.

Stated another way, the partitioned cluster heuristic 2400 operates as described below from another perspective. The partitioned cluster heuristic 2400 generates a set of solutions. It proceeds as follows:
1. Create the minimal distance tree.
2. The heuristic iterates N−2 times and generates a solution with each iteration (N=number of nodes in the network).
   a. Remove the longest remaining link in the minimal distance tree. So, on the first iteration we end up with 2 clusters, on the second iteration we end up with 3 clusters, etc.
   b. For each cluster calculate the site in that cluster that has more bandwidth requirements and make it the hub for that cluster. Connect all sites in a cluster to their hub.
   c. Connect all the hubs using a minimal distance tree.
   d. At this point we have a spanning tree. Adjust the bandwidths assigned to each link to comply with the bandwidth requirements. This creates a solution.

Figure 25:
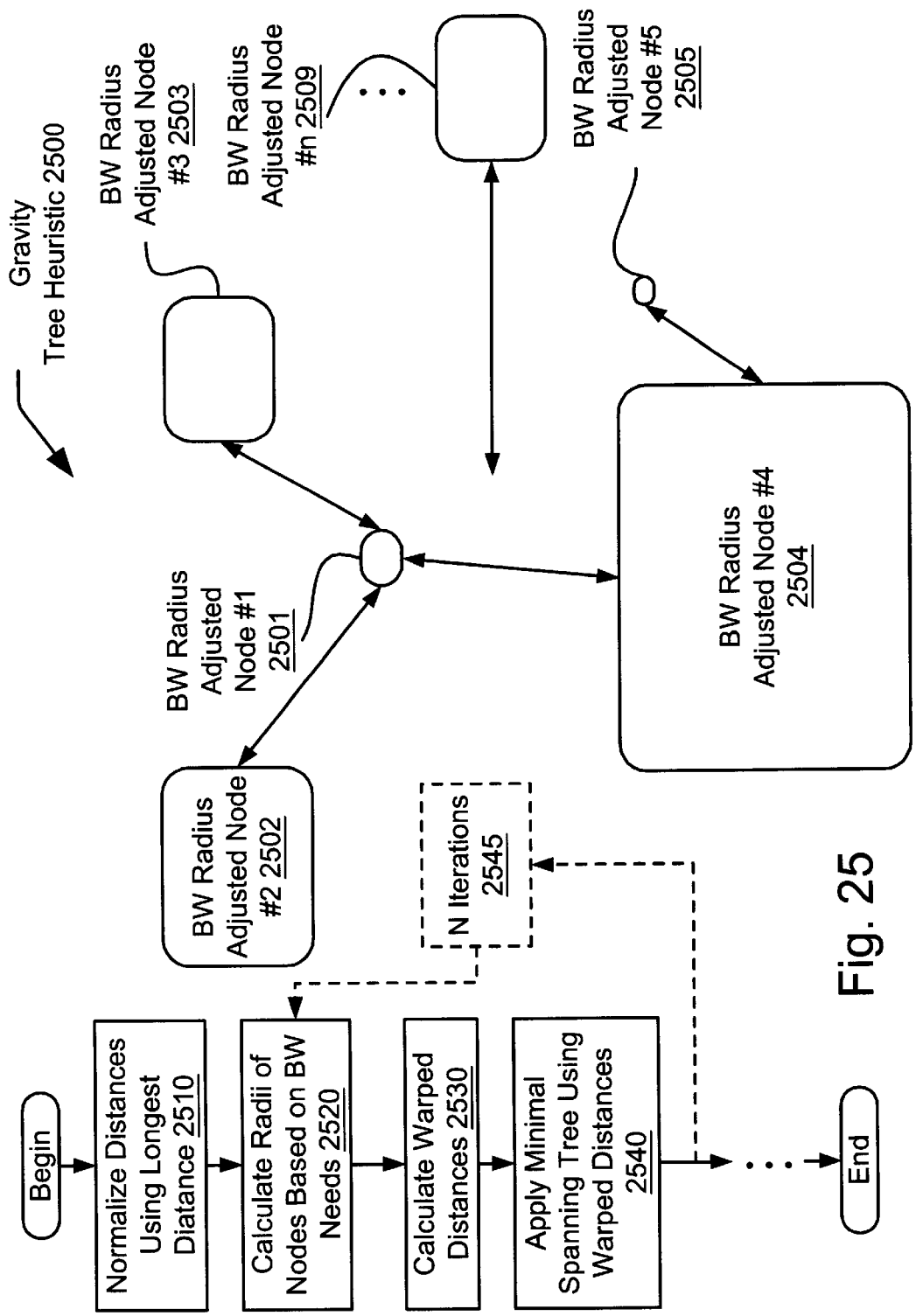
FIG. 25 is a block diagram illustrating an embodiment of a gravity tree heuristic that is used by a data network guidance engine in accordance with certain aspects of the present invention.

FIG. 25 is a block diagram illustrating an embodiment of a gravity tree heuristic 2500 that is used by a data network guidance engine in accordance with certain aspects of the present invention. In a block 2510, distances between the various nodes, or sites, within the system are normalized. Then, in a block 2520, the radii of the various nodes are calculated based on the bandwidth needs of the various nodes. Then, in a block 2530, the warped distances between the now adjusted nodes are calculated. Then, in a block 2540, a minimal spanning tree is applied using the warped distances.

The minimal distance tree within the block 2540 is the minimal distance tree heuristic 2000 in certain embodiments of the invention. Alternatively, the minimal distance tree operation of the block 2540 may be the minimal spanning tree method 1900 in other embodiments. Other heuristics may be used in place of the minimal distance tree operation of the block 2540 without departing from the scope and spirit of the invention.

If desired, the gravity tree heuristic 2500 may be performed using an indefinite number of iterations, as shown in a block 2545. Also, during these iterations, the various adjusted radii of the nodes within the system may be modified, either increased or decreased, during the various iterations to generate additional configurations for the system.

Graphically shown within the FIG. 25, the radii of the nodes #1, #2, #3, #4, #5, . . . , and #n are adjusted resulting in a bandwidth adjusted node #1 2501, a bandwidth adjusted node #2 2502, a bandwidth adjusted node #3 2503, a bandwidth adjusted node #4 2504, a bandwidth adjusted node #5 2505, . . . , and a bandwidth adjusted node #n 2509. Based on the now adjusted radii of the various nodes, they are interconnected using a minimal distance tree as shown within the block 2540. Again, other methods of interconnecting the now adjusted nodes may also be employed without departing from the scope and spirit of the invention. The adjusted radii of the nodes makes some of the nodes "appear" to be closer, and other nodes "appear" to be further apart.

Stated another way from another perspective using an alternative embodiment, the gravity tree heuristic 2500 is operable to use 2 sets as inputs. The sets of distances between sites and the set of bandwidth needs between sites. It proceeds as follows:
1. Normalize the distances by finding the 2 sites that have the longest distance between them. Divide all the distances by the longest distance. Once this is done, the distances are numbers between zero and one.
2. For each site, add all its bandwidth needs, once this is done, a mapping from each site to its bandwidth need is obtained. Get the max of all the bandwidth needs and use it to divide every bandwidth need for every site. Once this is done, the bandwidth needs are numbers between zero and one. These numbers are called the radius of the sites.
3. In this embodiment, the gravity tree heuristic 2500 iterates from 0.1 to 0.9 in increments of 0.1. The value used in the iteration is called the gravity. Each iteration generates a set of solutions. The values for the start, end and increment for the iteration are arbitrary.
   a. Using the gravity, a new set of warped distances (wp) is calculated as follows: the warped distance between sites x and y is $wp_{x,y} = dist_{x,y} - \text{gravity} X (radius_x + radius_y)$ b. Then, a minimal spanning tree method is applied to the set of warped distances, and the bandwidths assigned to each link are adjusted to comply with the bandwidth requirements. This creates a solution.

The solution created above may force capacity needed between two sites A and B to go through a third site C. When this happens, the bandwidth for C increases, therefore, the heuristic could be run again with a larger radius for C. If the heuristic is run again, if that generates a new solution, then that may again have changed the bandwidth requirements for the sites, and the heuristic is executed again. If desired, a threshold is employed to limit the total number of iterations to be performed and to prevent the possible occurrence of infinite loops. In one instance, a limit of 10 iterations is used. A new solution is created on each iteration.

FIG. 26 is a block diagram illustrating an embodiment of a hub mesh heuristic 2600 that is used by a data network guidance engine in accordance with certain aspects of the present invention. In a block 2610, the nodes within the system that are host nodes are identified. Then, in a block 2620, a link is provided between each of the host nodes. It is noted that throughout the various descriptions of the present invention, the terminology of link may be used interchangeably with connection. Finally, in a block 2630, the remaining nodes (that are not host nodes) are connected to the closest host node.

Graphically shown within the FIG. 26, a node #2 2502, a node #3 2503, and a node #5 2505 are identified as being host nodes. These host node nodes are then connected with direct links between them. Then, the remaining nodes within the system are connected to the nearest host node. Within the embodiment shown in the FIG. 26, a node #1 2601 is connected to the closest host node, namely, the node #2 2602. Similarly, a node #4 2604 is connected to the closest host node, namely, the node #5 2605.

Stated another way from another perspective using an alternative embodiment, the hub mesh heuristic 2600 differentiates between sites that are host nodes (those that host at least one application) and sites that are not. It creates a full mesh connecting the host nodes and then for each site that is not a host node, it connects it to the host node that is geographically closest to it. The generated topology offers a measure of redundancy.

Figure 27A:
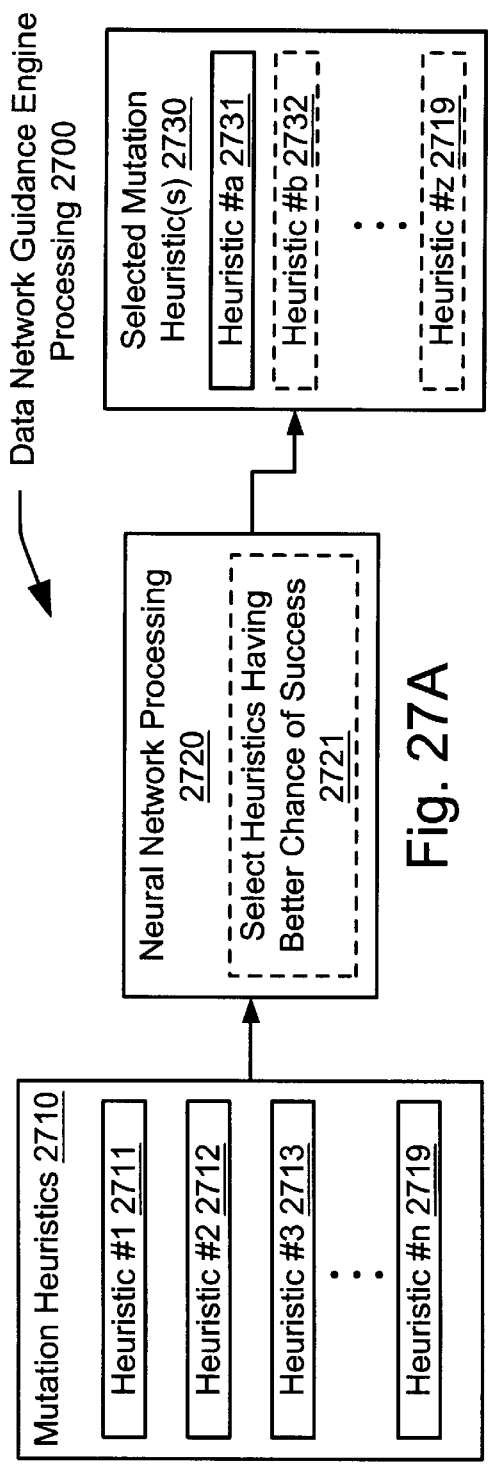
FIG. 27A is a block diagram illustrating another embodiment of data network guidance engine processing that is performed in accordance with certain aspects of the present invention.

FIG. 27A is a block diagram illustrating another embodiment of data network guidance engine processing 2700 that is performed in accordance with certain aspects of the present invention. Within this embodiment, neural network processing 2720 is performed within the data network guidance engine processing 2700. The neural network processing 2720 is used to select certain heuristics from among a group of heuristics. In certain embodiments of the invention, the selected heuristics are a sub-set of the group of heuristics. Alternatively, the selected heuristics are the entire group of heuristics. Moreover, additional heuristics may be added to the selected group of heuristics besides those available to be selected from the group of heuristics; there may be one or more default heuristics that are added to the selected group of heuristics in some situations.

Shown graphically within the FIG. 27A, a group of mutation heuristics 2710 is shown as having a heuristic #1 2712, a heuristic #2 2712, a heuristic #3 2713, . . . , and a heuristic #n 2719. The data network guidance engine processing 2700, specifically using the neural network processing 2720, selects one or more heuristics from the mutation heuristics 2710 to form the selected mutation heuristic(s) 2730. Again, the selected heuristics 2730 may include a single heuristic #a 2731. However, the selected mutation heuristics 2730 may also include more heuristics such as the heuristic #b 2732, . . . , and a heuristic #z 2719. If desired, the neural network processing 2720 operates by selecting the heuristics from among the mutation heuristics 2710 that have a better chance of success, as shown within the block 2721.

Figure 27B:
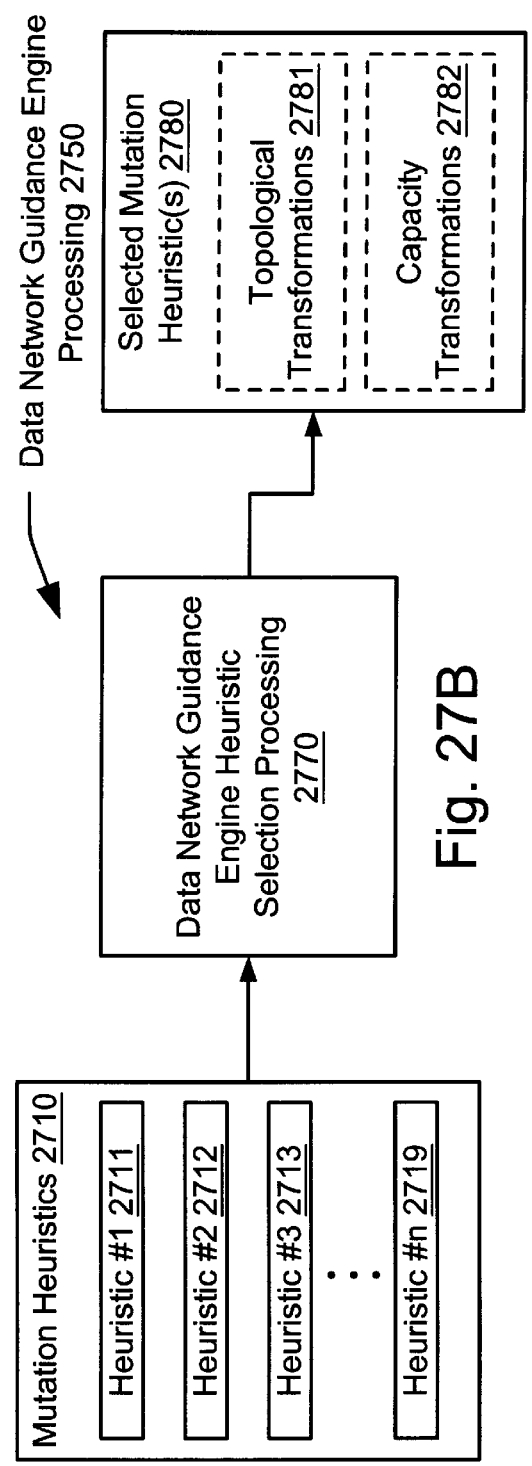
FIG. 27B is a block diagram illustrating another embodiment of data network guidance engine processing that is performed in accordance with certain aspects of the present invention.

FIG. 27B is a block diagram illustrating another embodiment of data network guidance engine 2750 processing that is performed in accordance with certain aspects of the present invention. Within this embodiment, the data network guidance engine processing 2750 employs data network guidance engine heuristic selection processing 2770 to select certain heuristics from among a group of heuristics. In certain embodiments of the invention, the selected heuristics are a sub-set of the group of heuristics. Alternatively, the selected heuristics are the entire group of heuristics. Moreover, additional heuristics may be added to the selected group of heuristics besides those available to be selected from the group of heuristics; there may be one or more default heuristics that are added to the selected group of heuristics in some situations.

Shown graphically within the FIG. 27B, a group of mutation heuristics 2710 is shown as having the heuristic #1 2712, the heuristic #2 2712, the heuristic #3 2713, . . . , and the heuristic #n 2719, similarly as shown within the FIG. 7B. However, those having skill in the art will recognize that any other heuristics may be used within the different embodiments shown within the FIGS. 27A and 27B as well. The data network guidance engine processing 2750, by employing the data network guidance engine heuristic selection processing 2770, selects one or more heuristics from the mutation heuristics 2710 to form the selected mutation heuristic(s) 2780. Within this embodiment, the selected mutation heuristic(s) 2780 may include topological transformations 2781 and capacity transformations 2782 among other heuristic transformations. The data network guidance engine processing 2750 shows one manner in which the heuristic transformations may be selected in accordance with the invention.

The transformation of a configuration, as shown within the embodiments of the FIGS. 27A and 27B (but that may be performed in other manners as well), is a crucial step. In one embodiment, this configuration transformation needs to be done using heuristics that have a reasonable chance at producing an enhanced configuration. Such a consideration is shown in the FIG. 27A. One possibility here would be to provide a bag of heuristics and then use neural networks to have the system itself learn to determine which heuristics have a better chance of success given a starting configuration, again shown within the FIG. 27A.

From some perspectives, the heuristics fall into 1 of 2 categories:

1. Topological transformations—those that add or remove links.
2. Capacity transformations—those that reduce or increase the bandwidth of a link These two categories of heuristics are those shown within the FIG. 27B within certain embodiments.

It is noted that a topological transformation may be seen as a special case of a capacity transformation that leads to the total depletion of the bandwidth of a link or increases the bandwidth of a link that had zero bandwidth.

In order for these transformations to succeed, there may be allowed either a pair of transformations per step (for example, decrease capacity in one link and increase it in another), or there may be allowed 2 more transformations before giving up on a possible path. This is because a single capacity or topological transformation has a low probability of increasing the rating. This is so because it is easy to reach a local maximum (among any number of local maxima) of the rating function. The initial configurations are good examples of this. If one starts with a well-formed star topology and delete any link or reduce its capacity there is a good chance the new configuration will not be better overall. If one increases any one bandwidth, then there is also a good chance the new configuration will not be better overall. One may allow either for several consecutive transformations or for a single transformation that changes more than one aspect of the configuration. One embodiment is operative by allowing for multiple consecutive transformations before giving up on a given lineage.

Figure 28:
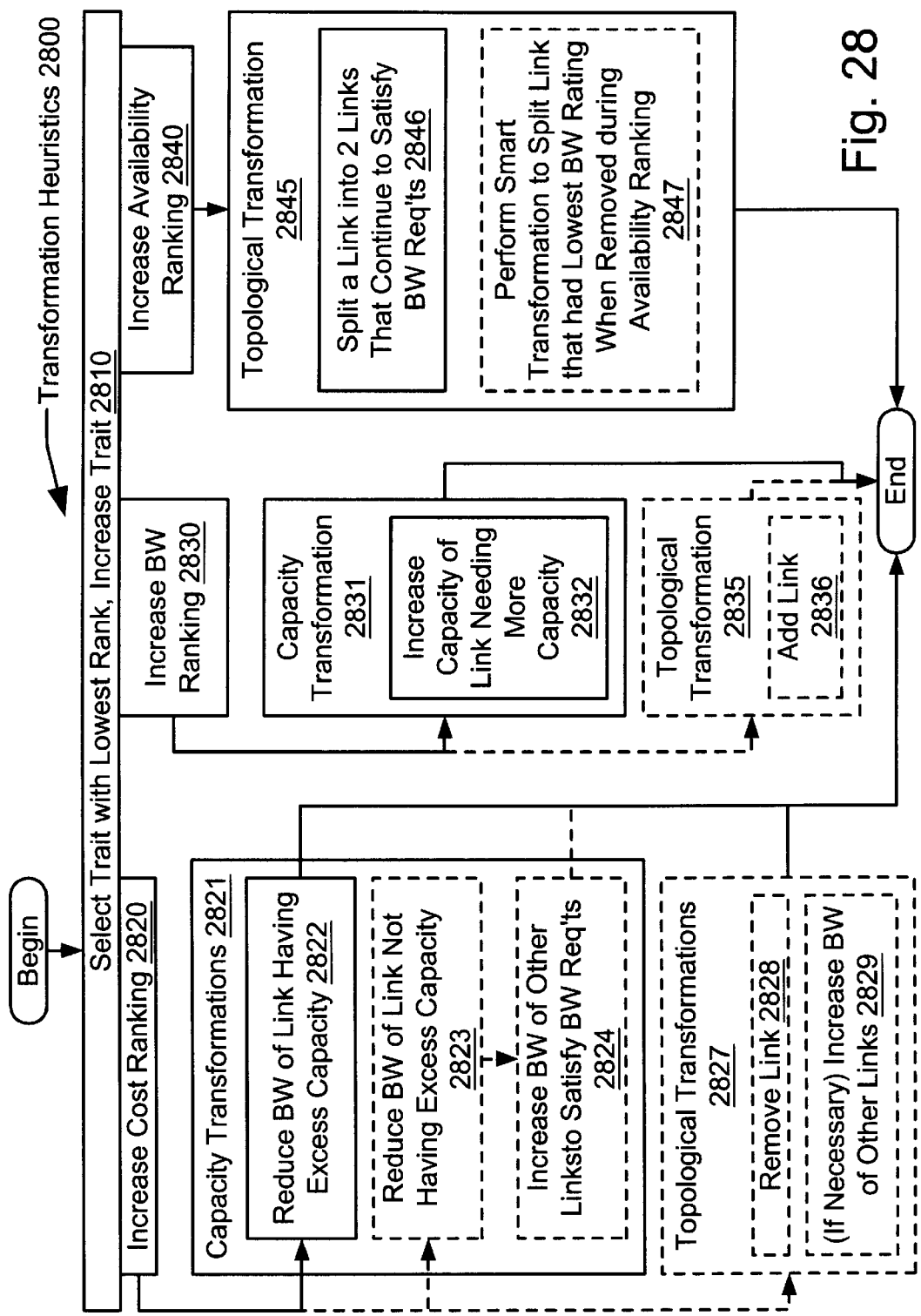
FIG. 28 is a block diagram illustrating an embodiment of transformation heuristics that are used by a data network guidance engine that is built in accordance with certain aspects of the present invention.

FIG. 28 is a block diagram illustrating an embodiment of transformation heuristics 2800 that are used by a data network guidance engine that is built in accordance with certain aspects of the present invention. From certain perspectives, the transformation heuristics 2800 are viewed as any number of different methods by which heuristics may be transformed to perform data network guidance engine processing in accordance with the invention.

In a block 2810, a trait is selected. This trait is the trait that has the lowest rank among a number of raked traits. A value for this trait is increased within the block 2810. Then, any number of options may be subsequently performed after the operation in the block 2810. Within the FIG. 28, the options are shown as being branch options stemming from the block 2810.

It is noted that the transformation heuristics may be viewed as being those operations that modify the heuristics to be used to perform data network guidance engine processing in some small way, and then performing another iteration of data network guidance engine processing to ensure that a sufficiently good solution has been reached.

In one situation, the cost ranking trait is the trait that is increased as shown in a block 2820. Then, one of either capacity transformations 2821 or topological transformations 2827 are subsequently performed after the increasing of the cost function in the block 2820. When capacity transformations 2821 are performed, in one instance, the bandwidth of a link that has excess capacity is reduced, as shown in a block 2822. Alternatively, when capacity transformations 2821 are performed, in another instance, the bandwidth of a link that does not have excess capacity is reduced, as shown in a block 2823. Then, in a block 2824, the capacity of other links is increased to satisfy the bandwidth requirements. When topological transformations 2825 are performed, a link is removed as shown in a block 2828. Then, if necessary, the bandwidth of other links are increased to satisfy bandwidth constraints as shown in a block 2829. For capacity transformations 2821 operations within the blocks 2823 and 2824, as well as the operations within the topological transformation 2827, a good heuristic is to reduce the capacity of a link with low capacity and increase the capacity of a link with high capacity. This is because higher capacity links may have better cost/kbps.

In another situation, the bandwidth ranking trait is the trait that is increased as shown in a block 2830. Then, one of either a capacity transformation 2831 or a topological transformations 2835 is subsequently performed after the increasing of the bandwidth function in the block 2830. When the capacity transformation 2831 is performed, the capacity of a link that needs more capacity is increased as shown in a block 2832. When the topological transformation 2835 is performed, a link is added as shown in a block 2836.

In yet another situation, the availability ranking trait is the trait that is increased as shown in a block 2840. A topological transformation 245 is subsequently performed. In a block 2846, a link is split into 2 links that continue to satisfy the bandwidth requirements. If desired, smart transformation is performed in a block 2847 that splits the link that had the lowest bandwidth rating when it was removed during the availability ranking computation. Splitting a link means to reduce its bandwidth and to create another link that can carry the rest of the bandwidth. In applying this transformation, it is important to understand that a link $b_{x,y}$ directly connects 2 sites x and y, but indirectly connects all sites that have direct or indirect connections with x to all the sites that have direct or indirect connections with y.

As illustrated within these various embodiments of heuristics, transformations that help cost hinder bandwidth and availability and vice versa. They are viewed as being opposing forces from certain perspectives.

It is also noted that any of the various traits described in the various embodiments of the invention may also be modified without departing from the scope and spirit of the invention. These traits within the FIG. 28 are exemplary of transformation heuristics that may be employed using various aspects of the invention.

Figure 29:
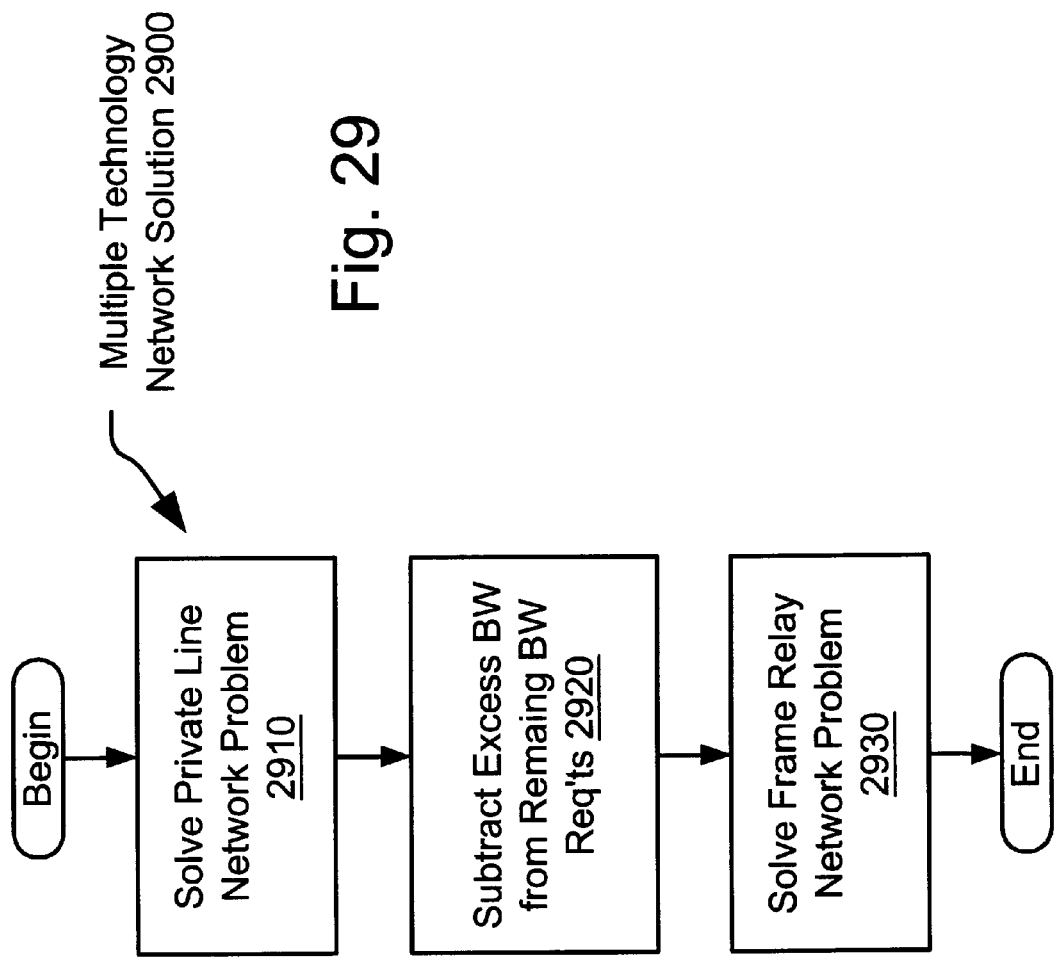
FIG. 29 is a block diagram illustrating an embodiment of a multiple technology network solution that is performed in accordance with certain aspects of the present invention.

FIG. 29 is a block diagram illustrating an embodiment of a multiple technology network solution 2900 that is performed in accordance with certain aspects of the present invention. In some situations, it is possible that a customer's needs require the use of multiple technologies. For example, some applications may require the use of private lines instead of frame relay. In this case, all applications that can work with frame relay will also work with private line. In this case, a private line network may be solved first as shown in a block 2910. Once this solution is achieved, the excess bandwidth is subtracted from the remaining bandwidth requirements as shown in a block 2920. Then, the frame relay network problem is solved in a block 2930.

If desired, the mixed technology configurations may not be shown to a user. Instead, we run the guidance engine with one technology to get a set of configurations. The data network guidance engine may be operated using a different technology to get another set of configurations. Then, both sets of solutions are combined using their rating. If desired, a maximum number of the best K solutions is shown to the user. K may also be configurable; it may also be fixed. If the K best solutions all use the same technology, then the best solution of an alternate technology are taken and the worst solution in the set of K solutions is replaced with it.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. An expert system adapted data network guidance engine, comprising:

a data network comprising a plurality of nodes;

the expert system adapted data network guidance engine employs a plurality of heuristics to generate a plurality of data network configurations based on the plurality of nodes within the data network;

the expert system adapted data network guidance engine transforms at least one data network configuration within the plurality of data network configurations into at least one transformed data network configuration; and the expert system adapted data network guidance engine selects a recommended data network solution from among the plurality of network configurations and the at least one transformed data network configuration.

2. The expert system adapted data network guidance engine of claim 1, wherein the expert system adapted data network guidance engine provides the recommended data network solution to an agent using a graphical user interface.

3. The expert system adapted data network guidance engine of claim 2, wherein the expert system adapted data network guidance engine provides the recommended data network solution to the agent using the graphical user interface.

4. The expert system adapted data network guidance engine of claim 1, wherein the expert system adapted data network guidance engine generates a plurality of initial configurations;

the expert system adapted data network guidance engine applies the plurality of heuristics to the initial configuration within the plurality of initial configurations to generate the plurality of data network configurations; and the expert system adapted data network guidance engine selectively applies the plurality of heuristics to the initial configuration.

5. The expert system adapted data network guidance engine of claim 1, wherein the plurality of heuristics comprises at least one of a distance tree heuristic, a maximal flow heuristic, a mesh of needs heuristic, a hub and spoke heuristic, a partitioned cluster heuristic, a gravity tree heuristic, and a hub mesh heuristic.

6. The expert system adapted data network guidance engine of claim 5, wherein the expert system adapted data network guidance engine performs an iteration when employing the plurality of heuristics to generate the plurality of data network configurations based on the plurality of nodes within the data network; and the iteration generates one data network configuration within the plurality of data network configurations.

7. The expert system adapted data network guidance engine of claim 1, wherein the expert system adapted data network guidance engine employs neural network processing to select a heuristic from the plurality of heuristics, the selected heuristic having a higher chance of success than the remaining heuristics within the plurality of heuristics.

8. The expert system adapted data network guidance engine of claim 1, wherein the expert system adapted data network guidance engine employs a mutation heuristic.

9. A data network guidance engine method used within an expert system, comprising:

rating a first plurality of traits that are used to characterize a first data network configuration;

rating a second plurality of traits that are used to characterize a second data network configuration;

increasing a trait within at least one of the first plurality of traits and the second plurality of traits, the increased trait is used to generate a modified data network configuration from at least one of the first data network configuration and the second data network configuration; and selecting a recommended data network configuration from among the first data network configuration, the second data network configuration, and the modified data network configuration.

10. The method of claim 9, further comprising performing a capacity transformation to at least one of the first data network configuration, the second data network configuration, and the modified data network configuration.

11. The method of claim 10, wherein the capacity transformation comprises increasing a bandwidth capacity of a link that needs an increased capacity within at least one of the first data network configuration, the second data network configuration, and the modified data network configuration.

12. The method of claim 9, further comprising performing a topological transformation to at least one of the first data network configuration, the second data network configuration, and the modified data network configuration.

13. The method of claim 12, wherein the topological transformation comprises adding a link to at least one of the first data network configuration, the second data network configuration, and the modified data network configuration.

14. A data network guidance engine method used within an expert system, comprising:

obtaining a list of sites to be interconnected;

obtaining bandwidth requirements between a pair of sites within the list of sites;

obtaining information on a customer's relative importance of a plurality of selected parameters;

creating a plurality of viable initial data network configurations;

selecting at least one viable initial data network configuration from the plurality of viable initial data network configurations;

generating a plurality of data network configuration solutions;

rating each of the plurality of data network configuration solutions; and identifying a recommended data network solution from among the plurality of data network configuration solutions based on the ratings of the plurality of data network configuration solutions.

15. The method of claim 14, wherein the generating a plurality of data network configuration solutions further comprises transforming the at least one selected viable initial data network.

16. The method of claim 15, further comprising transforming the at least one selected viable initial data network configuration a number of times until a plurality of sufficient data network configurations are identified.

17. The method of claim 15, further comprising transforming the at least one selected viable initial data network configuration a number of times within a predetermined amount of time.

18. The method of claim 14, further comprising presenting the recommended data network solution to an agent using a graphical user interface.

19. The method of claim 18, further comprising presenting at least one additional recommended data network solution to an agent using a graphical user interface.

20. The method of claim 14, wherein the plurality of selected parameters that comprises at least one of a cost, a latency, a bandwidth fulfillment, a reliability, and a security.

* * * * *